(12) United States Patent
Sauvageau et al.

(10) Patent No.: US 11,851,119 B2
(45) Date of Patent: Dec. 26, 2023

(54) TRACK SYSTEM

(71) Applicant: SOUCY INTERNATIONAL INC., Drummondville (CA)

(72) Inventors: Yves Sauvageau, Drummondville (CA); Pierre-Yves Pepin, Drummondville (CA); Marc Nadeau, Drummondville (CA); Branislav Nanac, Drummondville (CA); Genevieve Therrien, Drummondville (CA); Andre Todd, Mont St-Hilaire (CA); Cedric Alliguie, St-Hyacinthe (CA); Jonathan Lapalme, Drummondville (CA); Nicolas Dubuc, Mercier (CA); Philippe Jaillet-Gosselin, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 472 days.

(21) Appl. No.: 17/272,807

(22) PCT Filed: Sep. 6, 2019

(86) PCT No.: PCT/IB2019/057545
§ 371 (c)(1),
(2) Date: Mar. 2, 2021

(87) PCT Pub. No.: WO2020/049526
PCT Pub. Date: Mar. 12, 2020

(65) Prior Publication Data
US 2021/0309293 A1    Oct. 7, 2021

Related U.S. Application Data

(60) Provisional application No. 62/728,161, filed on Sep. 7, 2018, provisional application No. 62/728,697, filed
(Continued)

(51) Int. Cl.
*B62D 11/00* (2006.01)
*B62D 55/065* (2006.01)
(Continued)

(52) U.S. Cl.
CPC .......... *B62D 55/065* (2013.01); *B60C 23/005* (2013.01); *B60C 23/10* (2013.01);
(Continued)

(58) Field of Classification Search
CPC ............................ B62D 11/003; B62D 11/20
See application file for complete search history.

(56) References Cited

U.S. PATENT DOCUMENTS 3,340,790 A   9/1967 Simjian
3,430,790 A   3/1969 Beltrami
(Continued)

FOREIGN PATENT DOCUMENTS

EP    2727803 A2    5/2014
WO    2014121999 A1    8/2014
(Continued)

OTHER PUBLICATIONS

Supplementary European Search Report for EP 19853721 dated Jul. 30, 2022; Szaip, Andras.
(Continued)

*Primary Examiner* — Dale Moyer
(74) *Attorney, Agent, or Firm* — BCF LLP

(57) ABSTRACT

A track system includes an attachment assembly including at least one of a first pivot defining a roll pivot axis, a second pivot defining a pitch pivot axis, and a third pivot defining a yaw pivot axis of the track system. A frame assembly is disposed laterally outwardly from the attachment assembly and connected to the attachment assembly. The track system further includes at least one actuator for pivoting the frame assembly about at least one of the roll and yaw pivot axes,
(Continued)

and at least one monitoring for determining, at least indirectly, at least one of a state of the track system and a ground surface condition. The at least one monitoring sensor is communicating with a track system controller to control the operation of the at least one actuator based on the at least one of the state of the track system and the ground surface condition.

18 Claims, 31 Drawing Sheets

Related U.S. Application Data on Sep. 7, 2018, provisional application No. 62/728,662, filed on Sep. 7, 2018, provisional application No. 62/728,673, filed on Sep. 7, 2018, provisional application No. 62/728,669, filed on Sep. 7, 2018, provisional application No. 62/728,690, filed on Sep. 7, 2018.

(51) Int. Cl.

| | | |
|---|---|---|
| *B62D 55/14* | (2006.01) | |
| *B62D 55/084* | (2006.01) | |
| *B60C 23/16* | (2006.01) | |
| *B60C 23/00* | (2006.01) | |
| *B60C 23/10* | (2006.01) | |
| *B62D 55/15* | (2006.01) | |
| *B62D 55/24* | (2006.01) | |
| *B62D 11/20* | (2006.01) | |
| *G01L 5/1627* | (2020.01) | |
| *B62D 55/10* | (2006.01) | |
| *G01M 17/03* | (2006.01) | |
| *B62D 55/12* | (2006.01) | |
| *B62D 55/30* | (2006.01) | |

(52) U.S. Cl.
CPC ............ *B60C 23/16* (2013.01); *B62D 11/003* (2013.01); *B62D 11/20* (2013.01); *B62D 55/084* (2013.01); *B62D 55/10* (2013.01); *B62D 55/12* (2013.01); *B62D 55/14* (2013.01); *B62D 55/15* (2013.01); *B62D 55/24* (2013.01); *B62D 55/244* (2013.01); *B62D 55/305* (2013.01); *G01L 5/1627* (2020.01); *G01M 17/03* (2013.01); *B60C 2200/08* (2013.01)

(56) References Cited

U.S. PATENT DOCUMENTS

| | | |
|---|---|---|
| 6,158,539 A | 12/2000 | Isley |
| 7,017,688 B2 | 3/2006 | Bowers et al. |
| 7,690,738 B2 | 4/2010 | Wilt |
| 8,540,040 B2 | 9/2013 | Simula et al. |
| 8,985,250 B1 | 3/2015 | Lussier et al. |
| 9,096,264 B2 | 8/2015 | Connors et al. |
| 9,169,623 B2 | 10/2015 | Rebinsky |
| 9,415,818 B1 | 8/2016 | Tiede et al. |
| 9,682,736 B1 | 6/2017 | Prickel et al. |
| 9,688,322 B1 | 6/2017 | Prickel et al. |
| 9,855,843 B2 | 1/2018 | Vik et al. |
| 9,989,976 B2 | 6/2018 | Garvin et al. |
| 2016/0068205 A1 | 3/2016 | Hellholm et al. |
| 2016/0159414 A1 | 6/2016 | Hansen |
| 2017/0098987 A1 | 4/2017 | Gieras |
| 2017/0261450 A1 | 9/2017 | Baarman et al. |
| 2018/0190045 A1 | 7/2018 | Richard et al. |
| 2021/0173399 A1* | 6/2021 | Richard ............... B60W 40/12 |

FOREIGN PATENT DOCUMENTS

| | | |
|---|---|---|
| WO | 2017049393 A1 | 3/2017 |
| WO | 2019046929 A1 | 3/2019 |
| WO | 2020049530 A2 | 3/2020 |
| WO | 2020049533 A2 | 3/2020 |

OTHER PUBLICATIONS

Supplementary European Search Report for EP 19857372 dated Aug. 29, 2022; Szaip, Andras.
Supplementary European Search Report for EP 19858344.5 dated Aug. 29, 2022; Szaip, Andras.
International Search Report from PCT/IB2019/057553 dated Apr. 29, 2020, Lee Young.
International Search Report from PCT/IB2019/057545 dated Apr. 28, 2020, Lee Young.
International Search Report from PCT/IB2019/057552 dated Apr. 28, 2020, Lee Young.
International Search Report from PCT/IB2019/057550 dated Apr. 28, 2020, Lee Young.

* cited by examiner

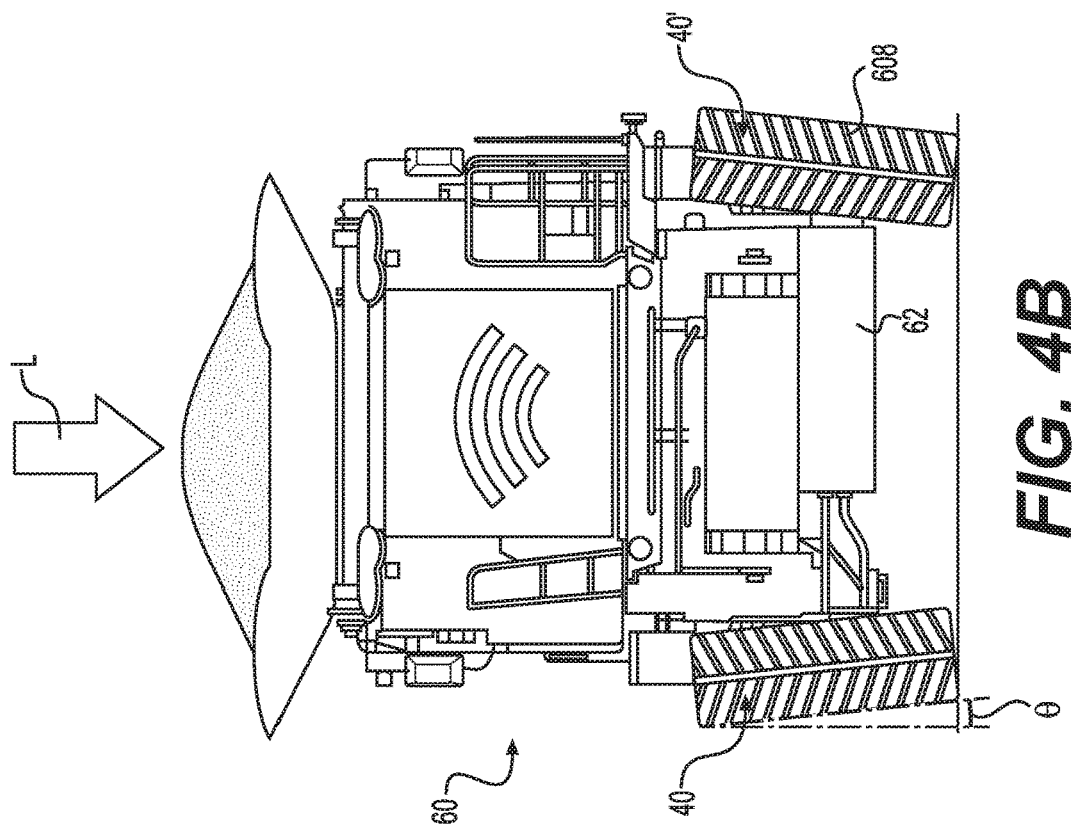
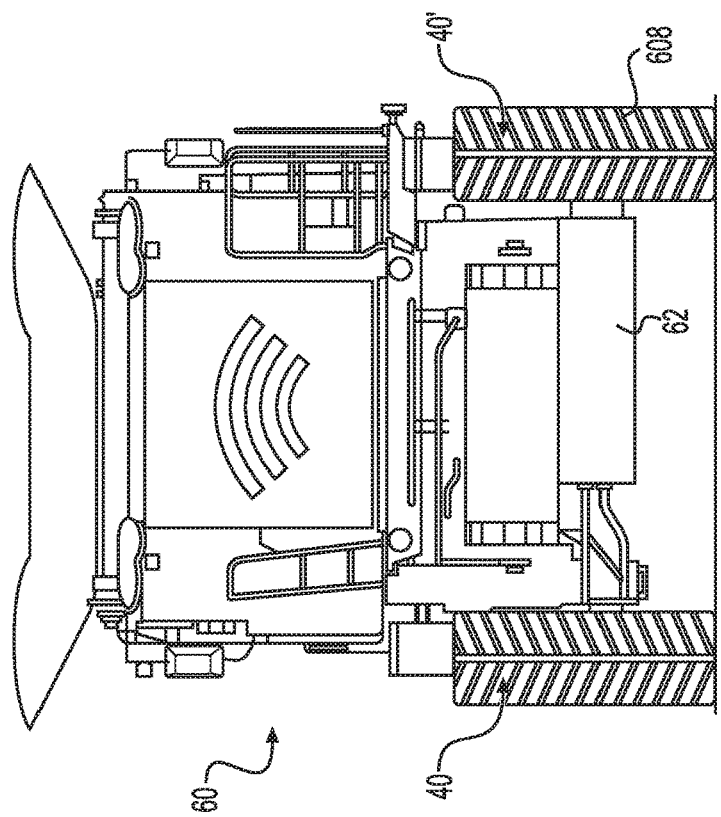

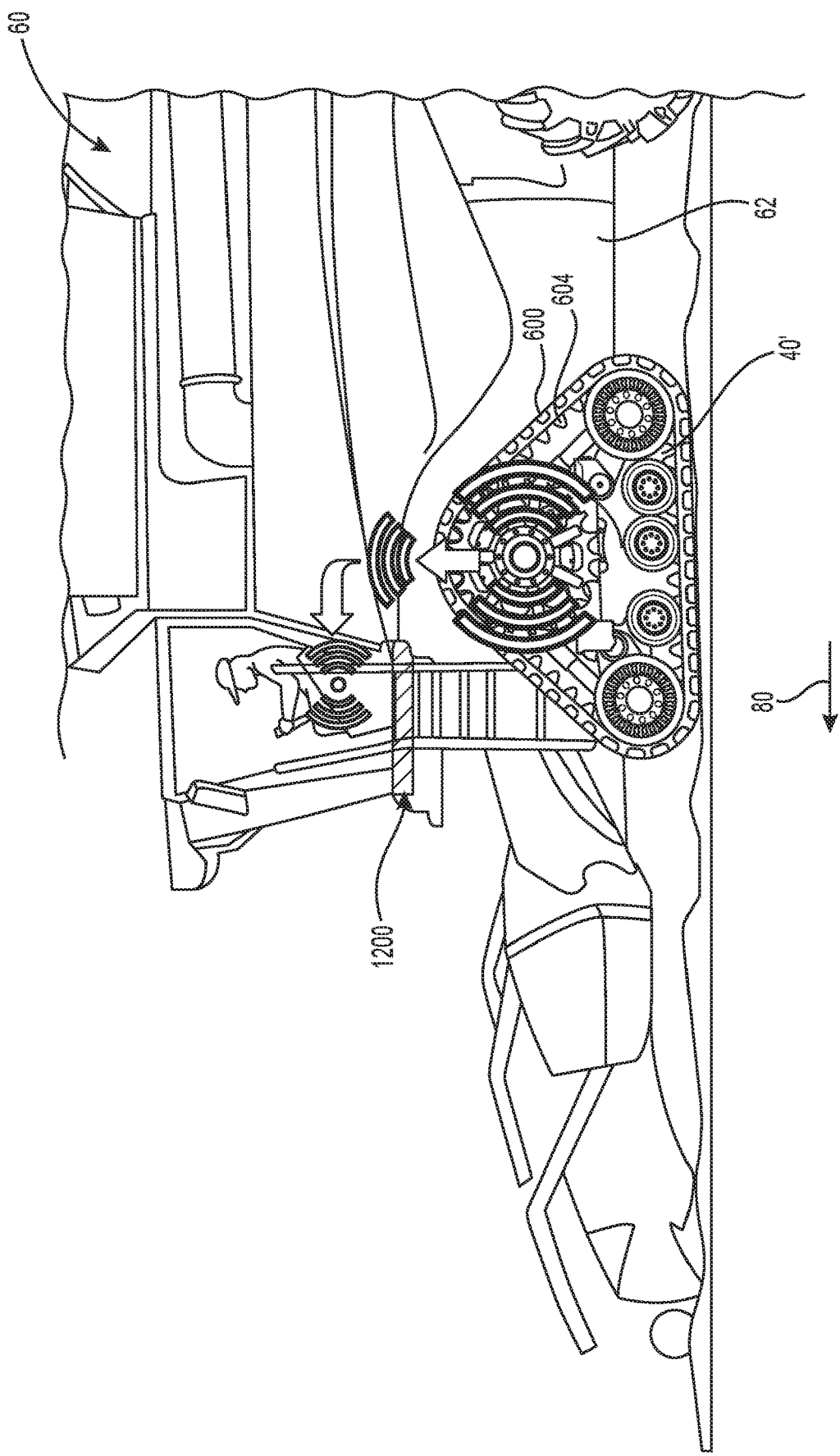

TRACK SYSTEM

CROSS-REFERENCE TO RELATED APPLICATIONS

The present application claims priority to U.S. Provisional Patent Application Ser. No. 62/728,161, filed Sep. 7, 2018, entitled "Track System", U.S. Provisional Patent Application Ser. No. 62/728,669, filed Sep. 7, 2018, entitled "Track System", U.S. Provisional Patent Application Ser. No. 62/728,662, filed Sep. 7, 2018, entitled "Track System", U.S. Provisional Patent Application Ser. No. 62/728,673, filed Sep. 7, 2018, entitled "Track System", U.S. Provisional Patent Application Ser. No. 62/728,690, filed Sep. 7, 2018, entitled "Vehicle", and U.S. Provisional Patent Application Ser. No. 62/728,697, filed Sep. 7, 2018, entitled "Track System". Each one of these patent applications is incorporated by reference herein in its entirety.

TECHNICAL FIELD

The present technology relates to track systems for vehicles.

BACKGROUND

Certain vehicles, such as, for example, agricultural vehicles (e.g., harvesters, combines, tractors, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kind of ground surfaces and, as these vehicles are generally heavy, the tires may compact the ground surface in an undesirable way due to the weight of the vehicle. As an example, when the vehicle is an agricultural vehicle, the tires may compact the soil in such a way as to undesirably inhibit the growth of crops.

In order to reduce the aforementioned drawbacks, to increase traction and to distribute the weight of the vehicle over a larger area on the ground surface, track systems were developed to replace at least some of the wheels and tires on the vehicles. For example, under certain conditions, track systems enable agricultural vehicles to be used in wet field conditions as opposed to its wheeled counterpart.

The use of track systems in place of wheels and tires, however, does present some inconveniences. One of the drawbacks of conventional track systems is that, under certain conditions, the endless track can be in contact with the ground while having an uneven load distribution across the ground contacting segment of the endless track, i.e. the portion of the endless track contacting the ground. As such, since the load is not evenly distributed across the ground contacting segment, areas of the ground contacting segment create high and low pressure spots on the ground surface. The high pressure spots cause undesirable soil compaction at different depth levels. In addition, the uneven distribution of the load across the ground contacting segment can lead to premature wear of some components of the track system. One factor that leads to the uneven distribution of the load across the ground contacting segment of an endless track under certain conditions is that the structural components of the track system do not always allow the endless track to conform to the ground surface like a tire filled with gas (air or nitrogen) does.

As such, there remains that there is a need for continued improvement in the design and configuration of track systems so that soil compaction issues and wear of some components of the track system be further reduced.

SUMMARY

It is therefore an object of the present technology to ameliorate the situation with respect to at least one of the inconveniences present in the prior art.

It is also an object of the present invention to provide an improved track system at least in some instances as compared with some of the prior art.

According to an aspect of the present technology, there is provided a track system for use with a vehicle having a chassis. The track system has an attachment assembly connectable to the chassis of the vehicle. The attachment assembly includes a multi-pivot assembly having a first pivot extending longitudinally and defining a roll pivot axis, a second pivot extending laterally and defining a pitch pivot axis, and a frame assembly disposed laterally outwardly from the attachment assembly and connected to the attachment assembly.

The frame assembly includes at least one wheel-bearing frame member, a roll actuator for pivoting the frame assembly about the roll pivot axis, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member, an endless track extending around the leading idler wheel assembly, the trailing idler wheel assembly, and the at least one support wheel assembly, and at least one actuator operatively connecting at least one of the leading idler wheel assembly, the trailing idler wheel assembly, and the at least one support wheel assembly to the attachment assembly.

The at least one actuator is operable to adjust a position of the at least one of the leading idler wheel assembly, the trailing idler wheel assembly, and the at least one support wheel assembly relative to the attachment assembly. At least one sensor is disposed in at least one wheel of at least one of the leading idler wheel assembly, the trailing idler wheel assembly, and the at least one support wheel assembly. A track system controller is in electronic communication with the at least one actuator and the at least one sensor. The track system controller includes a processor and a non-transient memory communicatively coupled to the processor. The non-transient memory stores processor-executable instructions thereon which, when executed by the processor, cause the track system controller to receive a signal from the at least one sensor and in response to determining that the signal meets a pre-determined condition, operating the actuator to adjust a position thereof.

According to one aspect of the present technology, in some embodiments thereof, the present technology helps reduce soil compaction under certain conditions. For example, improvement in reducing soil compaction issues might be perceived when the track system pivots about the roll pivot axis as it travels over a ground surface that is sensitive to soil compaction, such as an agricultural field. In some embodiments, when the frame assembly pivots about the roll pivot axis, the leading idler wheel assembly, the trailing idler wheel assembly, and the plurality of at least one support wheel assembly also pivot and can better conform to the profile of the ground surface such that the load applied by the wheel assemblies is more evenly distributed across the segment of the endless track engaging the ground on soil which is sensitive to compaction. In some embodiments, the roll actuator controls the pivot motion of the frame assembly relative to the attachment assembly and permits to adjust the camber angle of the track system relative to the chassis of the vehicle.

In some embodiments, the track system controller is in electronic communication with the roll actuator and the processor-executable instructions, when executed by the processor, cause the track system controller to operate the roll actuator to adjust a position thereof.

In some embodiments, the roll actuator is operable for pivoting the frame assembly about the roll and yaw pivot axes.

In some embodiments, the roll actuator is a first actuator, the track system further comprises a second actuator for pivoting the frame assembly about the yaw pivot axis, the track system controller is in electronic communication with the second actuator, and the processor-executable instructions, when executed by the processor, cause the track system controller to operate the second roll actuator to adjust a position thereof.

In some embodiments, the processor-executable instructions, when executed by the processor, cause the track system controller to operate the first and second actuator to adjust the pivotal positioning of the frame assembly relative to the chassis of the vehicle about the roll and yaw pivot axes respectively.

In some embodiments, the track system further comprises a tensioner operatively connected between the frame assembly and the leading idler wheel assembly, and wherein the track system controller is in electronic communication with the tensioner, and the processor-executable instructions, when executed by the processor, cause the track system controller to operate the tensioner to maintain a predetermined pressure in the endless track within a pre-determined range of tensions thereof.

In some embodiments, the track system further comprises a third actuator for adjusting the pivotal positioning of the leading idler wheel assembly relative to the frame assembly including raising the leading idler wheel assembly to reduce an amount of endless track in flat ground contact and lowering the leading idler wheel assembly to increase the amount of endless track in flat ground contact, and the track system controller is in electronic communication with the third actuator, and the processor-executable instructions, when executed by the processor, cause the track system controller to operate the third actuator to adjust a position thereof.

In some embodiments, the third actuator includes a leading idler actuator assembly connected between the frame assembly and the leading idler wheel assembly.

In some embodiments, the track system further comprises a fourth actuator for adjusting the pivotal positioning of the trailing idler wheel assembly relative to the frame assembly including raising the trailing idler wheel assembly to reduce an amount of endless track in flat ground contact and lowering the trailing idler wheel assembly to increase the amount of endless track in flat ground contact, and the track system controller is in electronic communication with the fourth actuator, and the processor-executable instructions, when executed by the processor, cause the track system controller to operate the fourth actuator to adjust a position thereof.

In some embodiments, the fourth actuator includes a trailing idler actuator assembly connected between the frame assembly and the trailing idler wheel assembly.

In some embodiments, the at least one sensor is a plurality of sensors, with at least one sensor of the plurality of sensors being disposed each wheel of the at least one of the leading idler wheel assembly, the trailing idler wheel assembly, and the at least one support wheel assembly.

In some embodiments, the at least one sensor of the plurality of sensors is disposed in each wheel of each of the leading idler wheel assembly, the trailing idler wheel assembly, and the at least one support wheel assembly.

In some embodiments, the plurality of sensors includes at least one of load sensors, torque sensors, temperature sensors, accelerometers, strain gauges, fluid property sensors, inclinometers, geographical location sensors, hygrometers, penetrometers, sonar, ultrasonic, microwave-based, radar, and lidar devices.

In accordance to another aspect of the present technology, there is provided a vehicle having first and second track systems as described above, the track system controller being mounted on the vehicle.

In some embodiments, the track system further comprises monitoring sensors mounted to the chassis of the vehicle, the monitoring sensors being in electronic communication with the track system controller.

In some embodiments, the second actuator includes a leading tracking actuator located forward of the second pivot, and a trailing tracking actuator located rearward of the second pivot.

In some embodiments, the multi-pivot assembly includes a yoke, a pivot arm pivotally connected to the yoke by the first pivot and pivoting about the roll pivot axis, a plate connected to the pivot arm by the third pivot and pivoting about the yaw pivot axis, the second pivot projecting from the plate, and the plate being pivotable about the roll and yaw pivot axes relative to the yoke.

In some embodiments, at least one of the first and second actuator includes an actuator operatively connected between the plate and the yoke.

In some embodiments, the plate has an aperture defined therein, and a stop projects from the frame assembly and extends within the aperture. The stop is structured and dimensioned to limit pivotal movement of the frame assembly relative to the plate.

In some embodiments, the endless track has leading, trailing and ground engaging segments. A first angle is formed between the trailing and ground engaging segments, and a second angle is formed between the leading and ground engaging segments. The first angle has a bisector, and the bisector of the first angle passes below the pitch pivot axis.

In some embodiments, the frame assembly is a multi-member frame assembly including a leading frame member pivotably connected to the attachment assembly via the second pivot for pivoting about the pitch pivot axis, a trailing frame member pivotably connected to the attachment assembly via the second pivot for pivoting about the pitch pivot axis, the trailing frame member pivoting independently from the leading frame member, the at least one wheel-bearing frame member is a leading wheel-bearing frame member and a trailing wheel-bearing frame member, the leading wheel-bearing frame member being at least indirectly pivotably connected to the leading frame member, the trailing wheel-bearing frame member being at least indirectly pivotably connected to the trailing frame member, and the track system further comprising a damper interconnecting the leading frame member and the trailing frame member.

In some embodiments, the endless track has an amount of ground contact area that increases as a load borne by the track system increases.

In some embodiments, the vehicle has a drive shaft extending laterally outwardly of the chassis, and the track system has a sprocket wheel operatively connected to the drive shaft for driving the endless track.

In some embodiments, the damper is located outwardly of the sprocket wheel.

In some embodiments, a load supported by the trailing wheel-bearing frame member is greater than a load supported by the leading wheel-bearing frame member.

In some embodiments, the track system controller operates at least one of the first, second and third actuators, and the tensioner in response to signals received from a manual override, a master control unit, a remote processing unit, and/or a remote master control unit.

According to another aspect of the present technology, there is provided a track system for use with a vehicle having a chassis. The track system includes an attachment assembly connectable to the chassis of the vehicle, and a frame assembly connected to the attachment assembly. The frame assembly includes at least one wheel-bearing frame member. The track system further has a monitoring sensor operatively connected to at least one of the attachment assembly, the frame assembly and the at least one wheel-bearing frame member. The monitoring sensor is configured to generate signals. A track system controller is operatively connected to the monitoring sensor. The track system controller is configured to receive the signals from the monitoring sensor. The track system further has at least one of a leading idler wheel assembly at least indirectly connected to the at least one wheel-bearing frame member, and a trailing idler wheel assembly at least indirectly connected to the at least one wheel-bearing frame member. The track system further has at least one support wheel assembly at least indirectly connected to the at least one wheel-bearing frame member, and an endless track extending around the leading idler wheel assembly, the trailing idler wheel assembly, and the at least one support wheel assembly.

In some embodiments of the track system of the present technology, the monitoring sensor is configured to generate first signals indicative of a load parameter supported by the at least one of the attachment assembly, the frame assembly and the at least one wheel-bearing frame member to which the monitoring sensor is operatively connected.

In some embodiments of the track system of the present technology, the monitoring sensor includes a strain gauge. In some embodiments of the track system of the present technology, the monitoring sensor includes an array of strain gauges. In some embodiments of the track system of the present technology, the monitoring sensor includes torque sensors.

In some embodiments of the track system of the present technology, the array of strain gauges includes strain gauges operatively connected to at least one of the inward and outward faces of the at least one of the attachment assembly, the frame assembly and the at least one wheel-bearing frame member to which the monitoring sensor is operatively connected.

In some embodiments of the track system of the present technology, the monitoring sensor is configured to generate second signals indicative of a vibration parameter supported by the at least one of the attachment assembly, the frame assembly and the at least one wheel-bearing frame member to which the monitoring sensor is operatively connected.

In some embodiments of the track system of the present technology, the monitoring sensor includes an accelerometer.

In some embodiments of the track system of the present technology, the monitoring sensor includes an inclinometer.

In some embodiments of the track system of the present technology, the monitoring sensor is configured to generate third signals indicative of a temperature parameter of a component of the at least one of the attachment assembly, the frame assembly and the at least one wheel-bearing frame member to which the monitoring sensor is operatively connected.

In some embodiments of the track system of the present technology, the monitoring sensor is configured to generate fourth signals indicative of a temperature parameter of another component of the attachment assembly, the frame assembly and the at least one wheel-bearing frame member to which the monitoring sensor is operatively connected.

In some embodiments of the track system of the present technology, the monitoring sensor is configured to generate fifth signals indicative of a temperature parameter of at least one of the leading idler wheel assembly, the trailing idler wheel assembly, the at least one support wheel assembly, and the endless track.

In some embodiments of the track system of the present technology, the monitoring sensor includes a thermal radiation thermometer.

In some embodiments of the track system of the present technology, the monitoring sensor is configured to generate sixth signals indicative of at least one property of a fluid contained in the track system.

In some embodiments of the track system of the present technology, the attachment assembly includes a multi-pivot assembly having a first pivot extending longitudinally and defining a roll pivot axis, the frame assembly being pivotable about the roll pivot axis, and a second pivot extending vertically and defining a yaw pivot axis, the frame assembly being also pivotable about the yaw pivot axis. The track system further includes an actuator for pivoting the frame assembly about the roll pivot axis and yaw pivot axes, and the track system controller operates the actuator in response to the signals received from the monitoring sensor.

In some embodiments of the track system of the present technology, the actuator is a first actuator, the track system further comprises a second actuator for adjusting the pivotal positioning of the leading idler wheel assembly relative to the frame assembly, the track system controller operating the second actuator in response to the signals received from the monitoring sensor.

In some embodiments of the track system of the present technology, the track system further includes a third actuator for adjusting the pivotal positioning of the trailing idler wheel assembly relative to the frame assembly, the track system controller operating the third actuator in response to the signals received from the monitoring sensor.

In some embodiments of the track system of the present technology, the track system further includes a tensioner operatively connected between the frame assembly and the leading idler wheel assembly, the track system controller operating the tensioner in response to the signals received from the monitoring sensor.

In some embodiments of the track system of the present technology, the monitoring sensor is configured to generate seventh signals indicative of a position of the first, second and third actuator and of the tensioner. The track system controller operates the first, second and third actuator and the tensioner in response to the signals received from the monitoring sensor.

According to another aspect of the present technology, there is provided a vehicle having first and second track systems as described above, and in which the track system controller of the first track system is operatively connected to the track system controller of the second track system.

In accordance with another aspect of the present technology, there is provided a track system for use with a vehicle having a chassis. The track system includes an attachment assembly connectable to the chassis of the vehicle. The attachment assembly includes a multi-pivot assembly having at least one of a first pivot extending longitudinally and defining a roll pivot axis of the track system, a second pivot extending laterally and defining a pitch pivot axis of the track system, and a third pivot extending vertically and defining a yaw pivot axis of the track system. The track system further has a frame assembly disposed laterally outwardly from the attachment assembly and connected to the attachment assembly, the frame assembly including at least one wheel-bearing frame member, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member and disposed between the leading idler wheel assembly and the trailing idler wheel assembly, an endless track extending around the leading idler wheel assembly, the trailing idler wheel assembly, and the at least one support wheel assembly. The track system further has at least one actuator connected between the attachment assembly and the frame assembly for pivoting the frame assembly about at least one of the roll pivot axis and the yaw pivot axis, at least one monitoring sensor for determining, at least indirectly, at least one of a state of the track system and a ground surface condition, and a track system controller communicating with the at least one monitoring sensor for receiving a signal indicative of the at least one of the state of the track system and the ground surface condition. The track system controller is configured to connect to and to control the operation of the at least one actuator based on the at least one of the state of the track system and the ground surface condition.

In some embodiments, the at least one actuator is a first actuator for pivoting the frame assembly about the roll pivot axis, and the track system controller is configured to connect to and to control the first actuator so as to adjust a positioning of the leading idler wheel assembly, the trailing idler wheel assembly, and the at least one support wheel assembly relative to the attachment assembly.

In some embodiments, the at least one actuator is a first, second and third actuators, the first actuator is operable for pivoting the frame assembly about the roll pivot axis, the second and third actuators are operable for pivoting the frame assembly about the yaw pivot axis, and the track system controller is configured to connect to and to control the first, second and third actuators so as to adjust a positioning of the leading idler wheel assembly, the trailing idler wheel assembly, and the at least one support wheel assembly relative to the attachment assembly.

In some embodiments, the second actuator is a leading tracking actuator located forward of the third pivot, and the third actuator is a trailing tracking actuator located rearward of the third pivot.

In some embodiments, the at least one monitoring sensor is disposed in at least one wheel of at least one of the leading idler wheel assembly, the trailing idler wheel assembly, and the at least one support wheel assembly.

In some embodiments, the at least one monitoring sensor is a plurality of monitoring sensors, and at least one monitoring sensor of the plurality of monitoring sensors is disposed in each wheel of the leading idler wheel assembly, the trailing idler wheel assembly, and the at least one support wheel assembly.

In some embodiments, the at least one monitoring sensor is a first plurality of monitoring sensors and a second plurality of monitoring sensors, the first plurality of monitoring sensors is disposed in an inner wheel of the at least one wheel of at least one of the leading idler wheel assembly, the trailing idler wheel assembly, and the at least one support wheel assembly, and the second plurality of monitoring sensors is disposed in an outer wheel of the at least one wheel of at least one of the leading idler wheel assembly, the trailing idler wheel assembly, and the at least one support wheel assembly.

In some embodiments, the track system controller controls the operation of the at least one actuator based on a difference between the at least one of the state of the track system and the ground surface condition determined by the first plurality of monitoring sensors, and the at least one of the state of the track system and the ground surface condition determined by the second plurality of monitoring sensors.

In some embodiments, there is provided a vehicle including first and second track systems as described above, and the track system controller of the first track system is at least indirectly connected to the track system controller of the second track system for receiving the at least one signal indicative of the at least one of the state of the track system and the ground surface condition determined by the at least one monitoring sensor of the second track system.

In some embodiments, the at least one monitoring sensor is operatively connected to at least one of the attachment assembly, the frame assembly and the at least one wheel-bearing frame member.

In some embodiments, the at least one monitoring sensor is a first plurality of monitoring sensors and a second plurality of monitoring sensors, the first plurality of monitoring sensors is operatively connected to an inward face of the at least one of the attachment assembly, the frame assembly and the at least one wheel-bearing frame member, and the second plurality of monitoring sensors is operatively connected to an outward face of the at least one of the attachment assembly, the frame assembly and the at least one wheel-bearing frame member.

In some embodiments, the at least one monitoring sensor further includes a third plurality of monitoring sensors, and the third plurality of monitoring sensors is operatively connected to a downward face of the at least one of the attachment assembly, the frame assembly and the at least one wheel-bearing frame member.

In some embodiments, the track system further includes at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact, and the track system controller is further configured to connect to and to control the operation of the at least one idler actuator based on the at least one of the state of the track system and the ground surface condition.

In some embodiments, the at least one monitoring sensor includes at least one of a load sensor, temperature sensor, accelerometer, strain gauge, fluid property sensor, inclinometer, geographical location sensor, hygrometer, penetrometer, sonar device, ultrasonic device, microwave-based device, radar device, and lidar device.

In some embodiments, the at least one monitoring sensor is configured to further generate a signal indicative of at least one of a load parameter supported by the track system, a strain parameter supported by the track system, a vibration parameter undergone by the track system, and a temperature parameter of the track system.

In some embodiments, the track system controller controls the operation of the at least one actuator in accordance with a predetermined objective.

In some embodiments, the predetermined objective is distributing a load supported by the track system across a surface of a ground engaging segment of the endless track for at least one of reducing soil compaction and improving traction of the endless track.

In some embodiments, there is provided a vehicle comprising first and second track systems as described above, and the track system controller of the first track system is at least indirectly connected to the track system controller of the second track system, and the track system controller of the first track system controls the operation of the at least one actuator of the first track system based on at least one of the state of the second track system and the ground surface condition determined by the at least one monitoring sensor of the second track system.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4A is a front elevation view of the vehicle of FIG. 2 with the left and right track systems having a neutral camber angle;

FIG. 4B is a front elevation view of the vehicle of FIG. 4A, with the vehicle bearing an increased load and the left and right track systems having a positive camber angle;

FIG. 18 is a left side elevation view of the vehicle of FIG. 2 with the track system being a mirror image of the track system of FIG. 1 operatively connected to the left side thereof;

DETAILED DESCRIPTION

Introduction

With reference to FIGS. 1 to 14, an embodiment of the present technology, track system 40, is illustrated. It is to be expressly understood that the track system 40 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where a modification has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple embodiment of the present technology, and that where such is the case it has been presented in this manner as an aid to understanding. As a person skilled in the art would understand, various embodiments of the present technology may be of a greater complexity than what is described herein.

Figure 2:
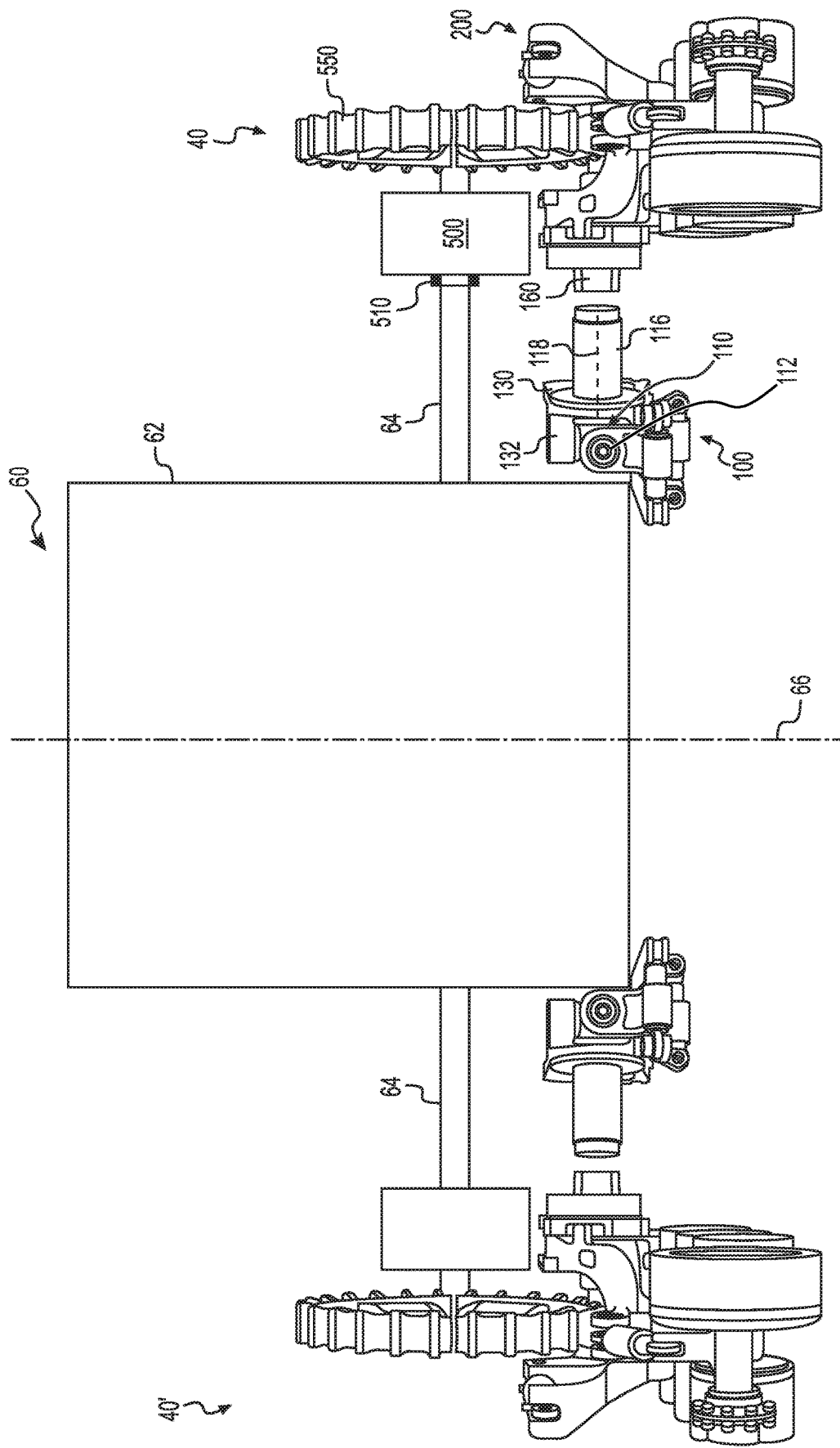
FIG. 2 is a partially exploded, rear elevation view of a vehicle having the track system of FIG. 1 operatively connected to the right side thereof, and another track system being a mirror image of the track system of FIG. 1 operatively connected to the left side thereof.

Referring to FIG. 2, the track system 40 is for use with a vehicle 60 having a chassis 62 and a drive shaft 64 extending laterally outwardly from the chassis 62 for driving the track system 40 (the vehicle 60, the chassis 62 and the drive shaft 64 are schematically shown in FIG. 2). The chassis 62 supports various components of the vehicle 60, such as the cabin, the engine, the gearbox and other drivetrain components (not shown). In this embodiment, the drive shaft 64 is the drivetrain component that transmits the driving force from the engine and gearbox of the vehicle 60 to the track system 40, i.e. the drive shaft 64 is the output shaft of the gearbox.

In the context of the following description, "outwardly" or "outward" means away from a longitudinal center plane 66 of the chassis 62 of the vehicle 60, and "inwardly" or "inward" means towards the longitudinal center plane 66. In addition, in the context of the following description, "longitudinally" means in a direction parallel to the longitudinal center plane 66 of the chassis 62 of the vehicle 60 in a plane parallel to flat level ground, "laterally" means in a direction perpendicular to the longitudinal center plane 66 in a plane parallel to flat level ground, and "generally vertically" means in a direction contained in the longitudinal center plane 66 along a height direction of the track system 40 generally perpendicular to flat level ground. Note that in the accompanying Figures, a "+" symbol is used to indicate an axis of rotation. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be. Moreover, the direction of forward travel of the track system 40 is indicated by an arrow 80 in FIG. 1.

In the present description, the "leading" components are identified with a letter "l" added to their reference numeral (i.e. components towards the front of the vehicle 60 defined consistently with the vehicle's forward direction of travel 80), and the "trailing" components are identified with a letter "t" added to their reference numeral (i.e. components towards the rear of the vehicle 60 defined consistently with the vehicle's forward direction of travel 80). In the following description and accompanying Figures, the track system 40 is configured to be attached to a right side of the chassis 62 of the vehicle 60. A track system 40' (FIG. 2), being another embodiment of the present technology and configured to be connected to a left side of the chassis 62 of the vehicle 60, is a mirror image of the track system 40 with the necessary adaptations, and the components of the track system 40' are identified with a "'" added to their reference numeral. That embodiment will not be further described herein.

General Description of the Track System

Referring to FIGS. 1 to 6, the track system 40 will be generally described. The track system 40 includes an attachment assembly 100 connectable to the chassis 62 of the vehicle 60. The attachment assembly 100 includes a multi-pivot assembly 110 having a longitudinally extending pivot 112. The pivot 112 defines a roll pivot axis 114 of the track system 40. The multi-pivot assembly 110 further has a pivot 116 extending laterally outwardly. The pivot 116 defines a pitch pivot axis 118 of the track system 40.

The track system 40 further includes a frame assembly 200 disposed laterally outwardly from the attachment assembly 100 (FIG. 2) and connected thereto. The frame assembly 200 is a multi-member frame assembly and includes a leading frame member 210*l* pivotably connected to the attachment assembly 100 via the pivot 116 for pivoting about the pitch pivot axis 118 (FIG. 1), and a trailing frame member 210*t* pivotably connected to the attachment assembly 100 via the pivot 116 for pivoting about the pitch pivot axis 118 (FIG. 1) independently from the leading frame member 210*l*. The multi-member frame assembly 200 also includes a leading wheel-bearing frame member 230*l* pivotably connected to a lower portion 222*l* of the leading frame member 210*l*. The leading wheel-bearing frame member 230*l* pivots about a pivot axis 224*l*. The multi-member frame assembly 200 further includes a trailing wheel-bearing frame member 230*t* pivotably connected to a lower portion 222*t* of the trailing frame member 210*t*. The trailing wheel-bearing frame member 230*t* pivots about a pivot axis 224*t*. A trailing support wheel assembly 250 is pivotably connected to the trailing wheel-bearing frame member 230*t* about an axis 252. The track system 40 further includes a damper 300 (in this embodiment a shock absorber) interconnecting the leading frame member 210*l* and the trailing frame member 210*t*.

A leading idler wheel assembly 400*l* is rotatably connected to the leading wheel-bearing frame member 230*l*, and a trailing idler wheel assembly 400*t* is rotatably connected to the trailing wheel-bearing frame member 230*t*. A plurality of support wheel assemblies 410*a*, 410*b*, 410*c* are disposed between the leading idler wheel assembly 400*l* and the trailing idler wheel assembly 400*t*. The support wheel assemblies 410*a*, 410*b*, 410*c* assist in distributing the load born by the track system 40 across the endless track 600 of the track system 40. The support wheel assembly 410*a* is rotatably connected to the leading wheel-bearing frame member 230*l*. The support wheel assemblies 410*b*, 410*c* are rotatably connected to the trailing support wheel assembly 250. In other embodiments, it is contemplated that there could be more or less support wheel assemblies 410*a*, 410*b*, 410*c*.

Still referring to FIGS. 1 to 6, the track system 40 further includes a gearbox 500 (schematically shown in FIG. 2) operatively connected to the drive shaft 64 of the vehicle 60. The drive shaft 64 is operatively connected to the gearbox 500 via a universal joint 510, but could be operatively connected otherwise. The track system 40 further includes a sprocket wheel 550 operatively connected to the gearbox 500. It is noted that in the present embodiment, the drive shaft 64 of the vehicle 60 does not bear a material portion of the weight of the vehicle 60 but only transmits driving forces to the gearbox 500 which does not bear a material portion of the weight of the vehicle 60 either. In other embodiments, the gearbox 500 could be omitted and the drive shaft 64 could be directly connected to the sprocket wheel 550. In such embodiments, the drive shaft 64 could be an axle of the vehicle 60 on which a tire and wheel assembly could be connected should a wheeled configuration be preferred to a configuration with track systems. Other embodiments of the track system 40 could be designed to be used on a vehicle and not be meant to be driven by a drive shaft 64. For example, other embodiments of the track system 40 could be configured to be operatively connected to a towed vehicle, and thus such embodiments of the track system 40 would have no sprocket wheel 550. In such embodiments the track system could have a generally rectangular shape instead of the generally triangular shape of the track system 40 illustrated in the accompanying Figures.

Endless Track

The track system 40 further includes the endless track 600 (FIG. 1) which extends around the sprocket wheel 550, the leading idler wheel assembly 400*l*, the trailing idler wheel assembly 400*t*, and the plurality of support wheel assemblies 410*a*, 410*b*, 410*c*. The endless track 600 is drivable by the sprocket wheel 550.

The endless track 600 is an endless polymeric track. The endless track 600 has an inner surface 602 engaging the leading idler wheel assembly 400*l*, the trailing idler wheel assembly 400*t*, and the plurality of support wheel assemblies 410*a*, 410*b*, 410*c*. Lugs 604 (FIG. 18) are disposed on a central portion of the inner surface 602 and are engageable by the sprocket wheel 550. As such, the track system 40 is a "positive drive" track system. Friction drive track systems are also contemplated as being an alternative to the present embodiment. The idler and support wheel assemblies 400*l*, 400*t*, 410*a*, 410*b*, 410*c* have laterally spaced-apart wheels (FIGS. 5 and 6) engaging the inner surface 602 of the endless track 600 on either side of the lugs 604 to prevent the endless track 600 to slide off. The endless track 600 also has an outer surface 606 with a tread 608 (FIGS. 4A and 4B) selected for ground engagement. The tread 608 varies in different embodiments according to the type of vehicle on which the track system 40 is to be used with and/or the type of ground surface on which the vehicle is destined to travel. It is contemplated that within the scope of the present technology, the endless track 600 may be constructed of a wide variety of materials and structures including metallic components known in track systems.

Figure 7:
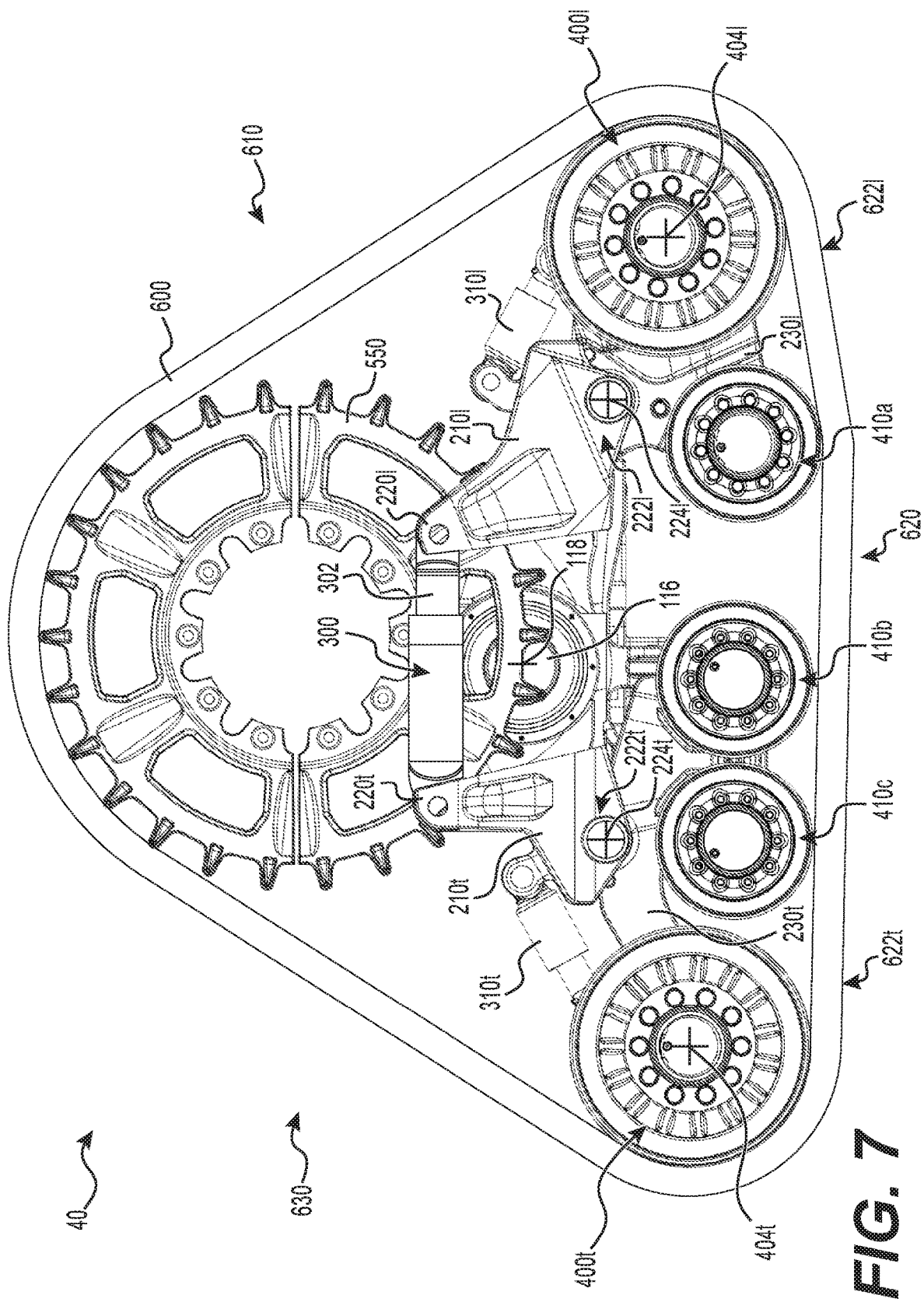
FIG. 7 is a right side elevation view of the track system of FIG. 1, with the leading idler wheel assembly raised.
Figure 8:
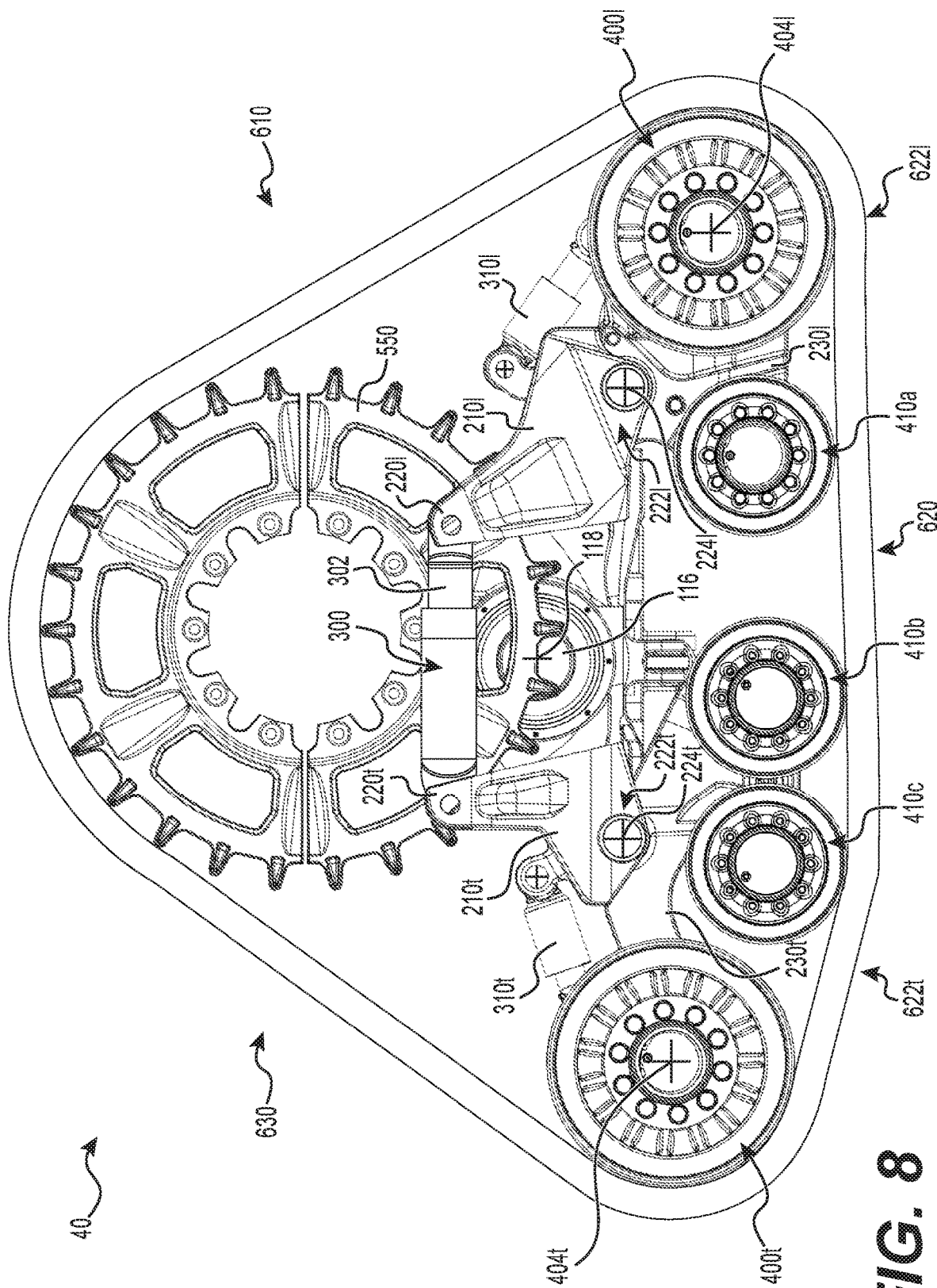
FIG. 8 is a right side elevation view of the track system of FIG. 1, with the trailing idler wheel assembly raised.

Referring to FIGS. 7 and 8, the endless track 600 has a leading segment 610, a ground engaging segment 620 and a trailing segment 630. As mentioned above, the generally triangular shape of the track system 40 causes the endless track 600 to have the segments 610, 620, 630, but as other configurations of the track system 40 are contemplated, the endless track 600 could have more or less segments in other embodiments. Referring to FIGS. 7 and 8 and as will be described below, the pivotal positioning of the leading idler wheel assembly 400*l* relative to the leading frame member 210*l* and the pivotal positioning of the trailing idler wheel assembly 400*t* relative to the trailing frame member 210*t* varies by raising or lowering the leading wheel-bearing frame member 230*l* and the trailing wheel-bearing frame member 230*t* respectively.

When the leading wheel-bearing frame member 230*l* is raised (FIG. 7), the ground engaging segment 620 includes a leading ground-engaging segment 622*l* that extends above ground when the endless track 600 is disposed on flat level ground. The leading ground-engaging segment 622*l* extends below the leading idler wheel assembly 400*l*. It is contemplated that, in certain situations such as when the track system 40 travels on soft ground and compacts the medium forming the ground, the ground-engaging segment 622*l* could engage the ground surface. When the trailing wheel-bearing frame member 230*t* is raised (FIG. 8), the ground engaging segment 620 further includes a trailing ground engaging segment 622*l* that extends above ground when the endless track 600 is disposed on flat level ground. The trailing ground engaging segment 622*l* extends below the trailing idler wheel assembly 400*t*. It is also contemplated that, in certain situations such as when the track system 40 travels on soft ground and compacts the medium forming the ground, the ground-engaging segment 622*t* could engage the ground surface.

Figure 10A:
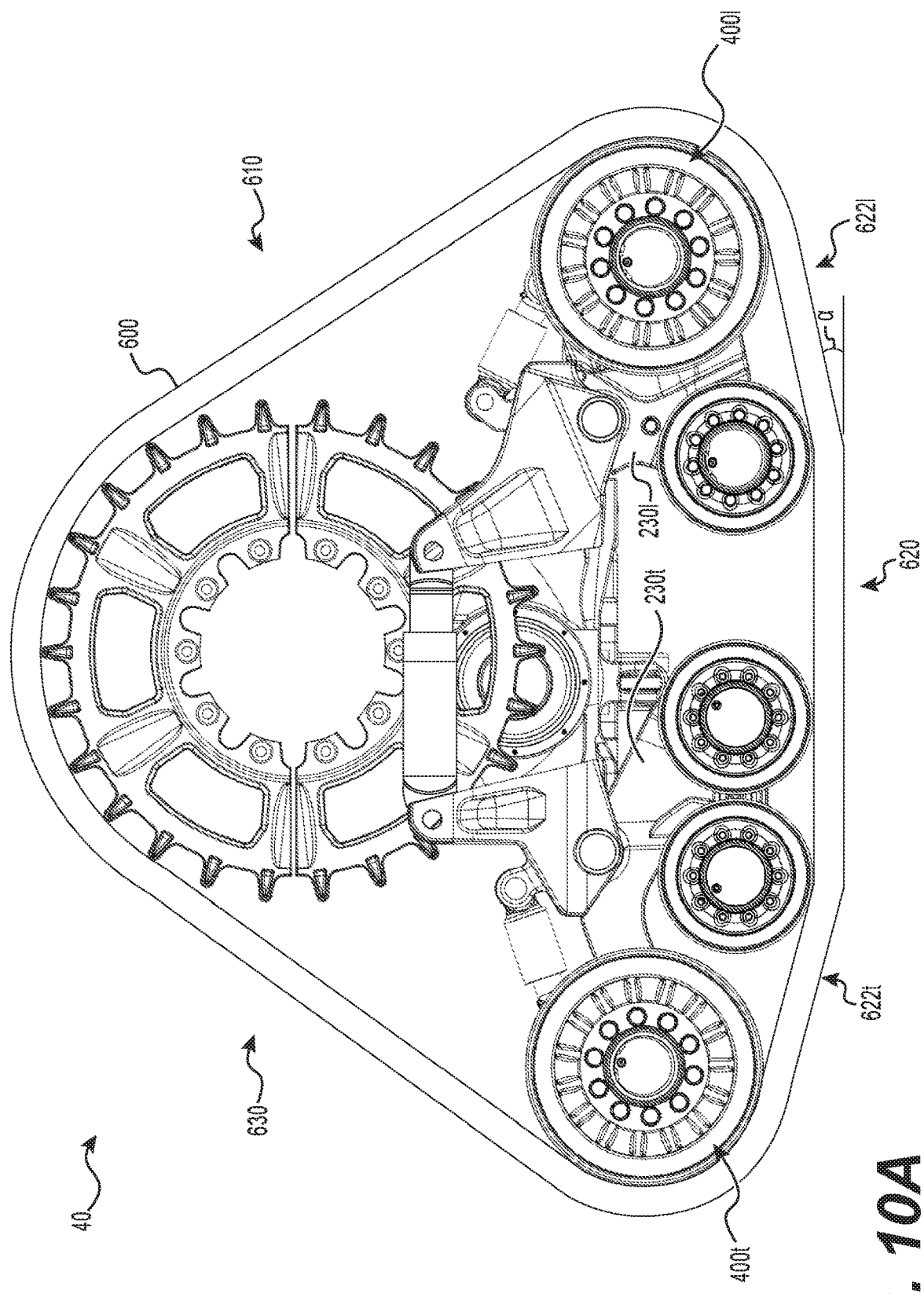
FIG. 10A is a right side elevation view of the track system of FIG. 1, with the leading and trailing idler wheel assemblies raised.

Referring to FIG. 10A, when both the leading wheel-bearing frame member 230*l* and the trailing wheel-bearing frame member 230*t* are raised, the endless track 600 has the leading ground-engaging segment 622*l* and the trailing ground engaging segment 622*t* extending above ground. In this configuration, the ground engaging segment 620 (i.e. the portion of the endless track 600 that engages the ground surface when the endless track 600 is disposed on flat level ground) is shorter compared to the ground engaging segment 620 of the configurations shown in FIGS. 1, 7 and 8.

Attachment Assembly

Figure 5:
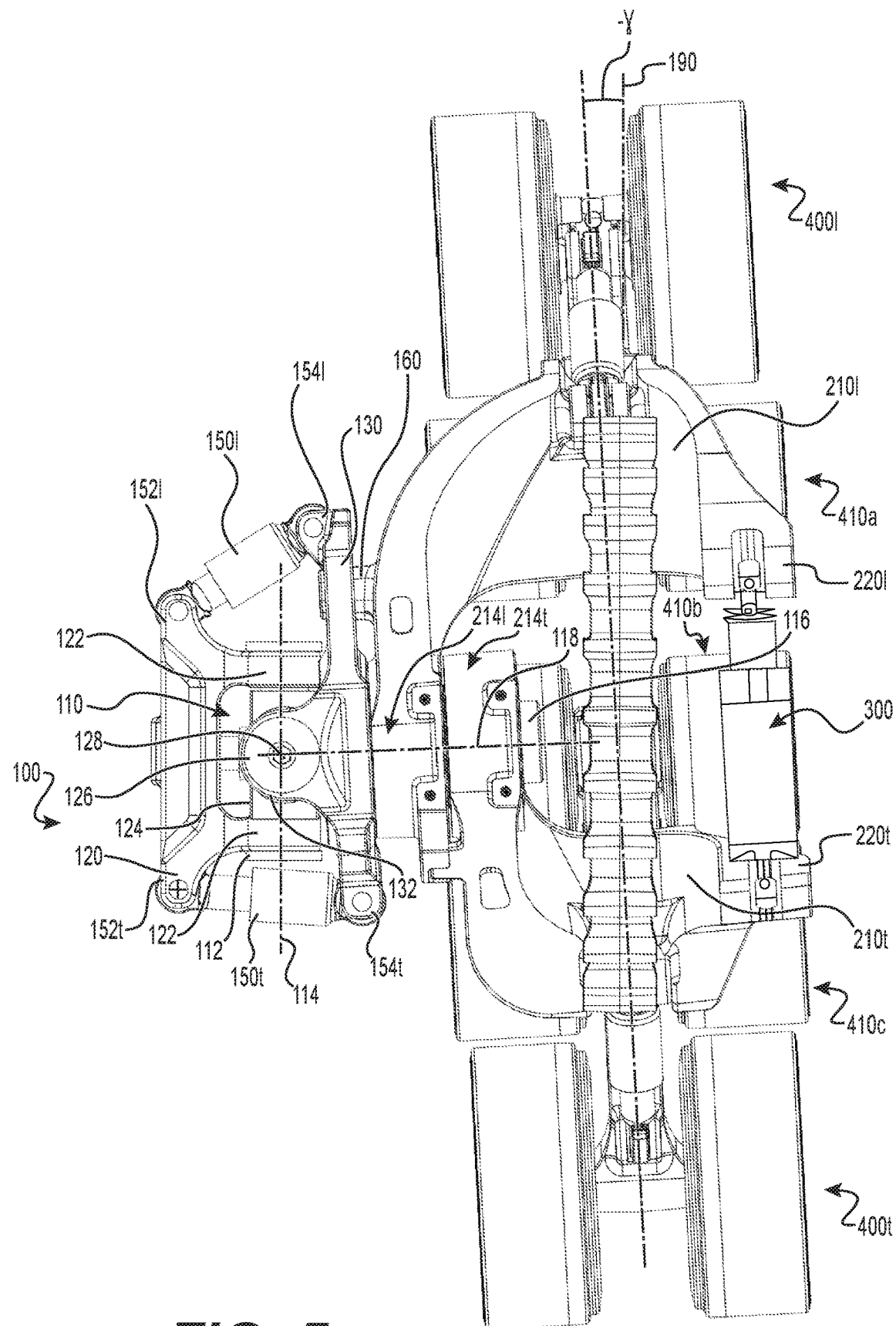
FIG. 5 is a top plan view of the track system of FIG. 1, with the endless track removed, and the frame assembly and wheel assemblies pivoted at a toe-in angle.
Figure 6:
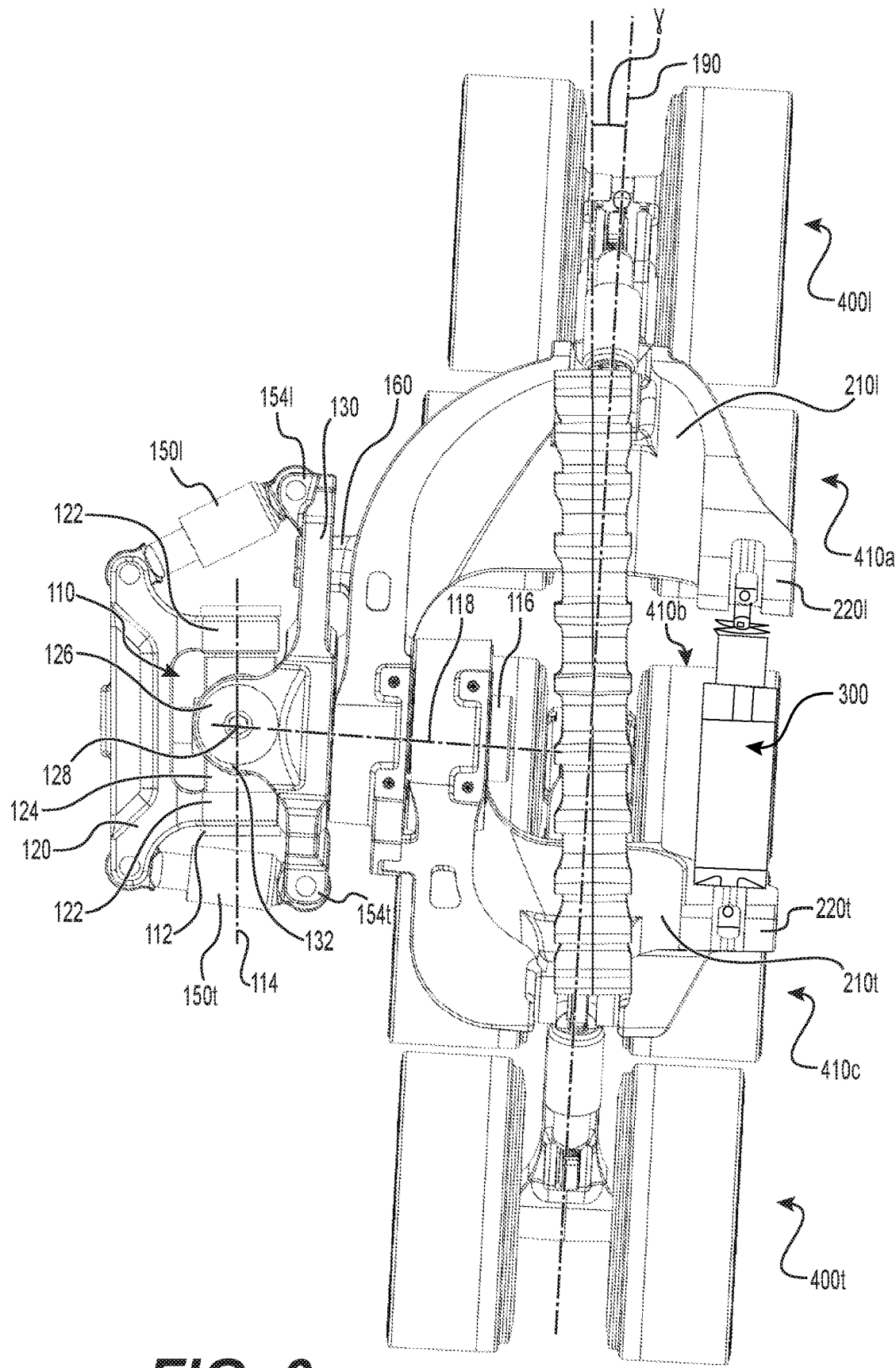
FIG. 6 is a top plan view of the track system of FIG. 5, with the frame assembly and wheel assemblies pivoted at a toe-out angle.

Turning back to FIGS. 2 to 6, the attachment assembly 100 will be described. The multi-pivot assembly 110 has a yoke 120. The yoke 120 is connected to the chassis 62 of the vehicle 60. In the present embodiment, the yoke 120 is connected to an underside of the chassis 62, but could be configured and structured to be connected to the chassis 62 otherwise. The yoke 120 has longitudinally spaced apart tabs 122 (FIGS. 5 and 6). The tabs 122 each define a hole (not shown) through which the longitudinally extending pivot 112 extends. A pivot arm 124 is pivotably connected to the tabs 122 of the yoke 120 by the longitudinally extending pivot 112. The pivot arm 124 is a cruciform member simultaneously connected to the pivot 112 and to a generally vertically extending pivot 126. The pivot 126 defines a yaw pivot axis 128 of the track system 40. The pivot arm 124 is further pivotably connected to a plate 130 having vertically spaced apart tabs 132 (only the top tab 132 is show). The tabs 132 each define a hole (not shown) through which the generally vertically extending pivot 126 extends. Through the pivot 126, the plate 130 is pivotable about the yaw pivot axis 128 relative to the pivot arm 124, and the plate 130 is thus pivotable relative to the yoke 120 about the roll and yaw pivot axes 114, 128. It is to be noted that, in the present embodiment, the yaw pivot axis 128 extends in a direction parallel to the longitudinal center plane 66 and along a height direction of the track system 40 that is perpendicular to flat level ground. In another embodiment, the yaw pivot axis 128 could extend not perpendicularly to flat level ground and could be skewed forward or rearward so as to define a positive or negative caster angle of the track system 40.

Figure 3A:
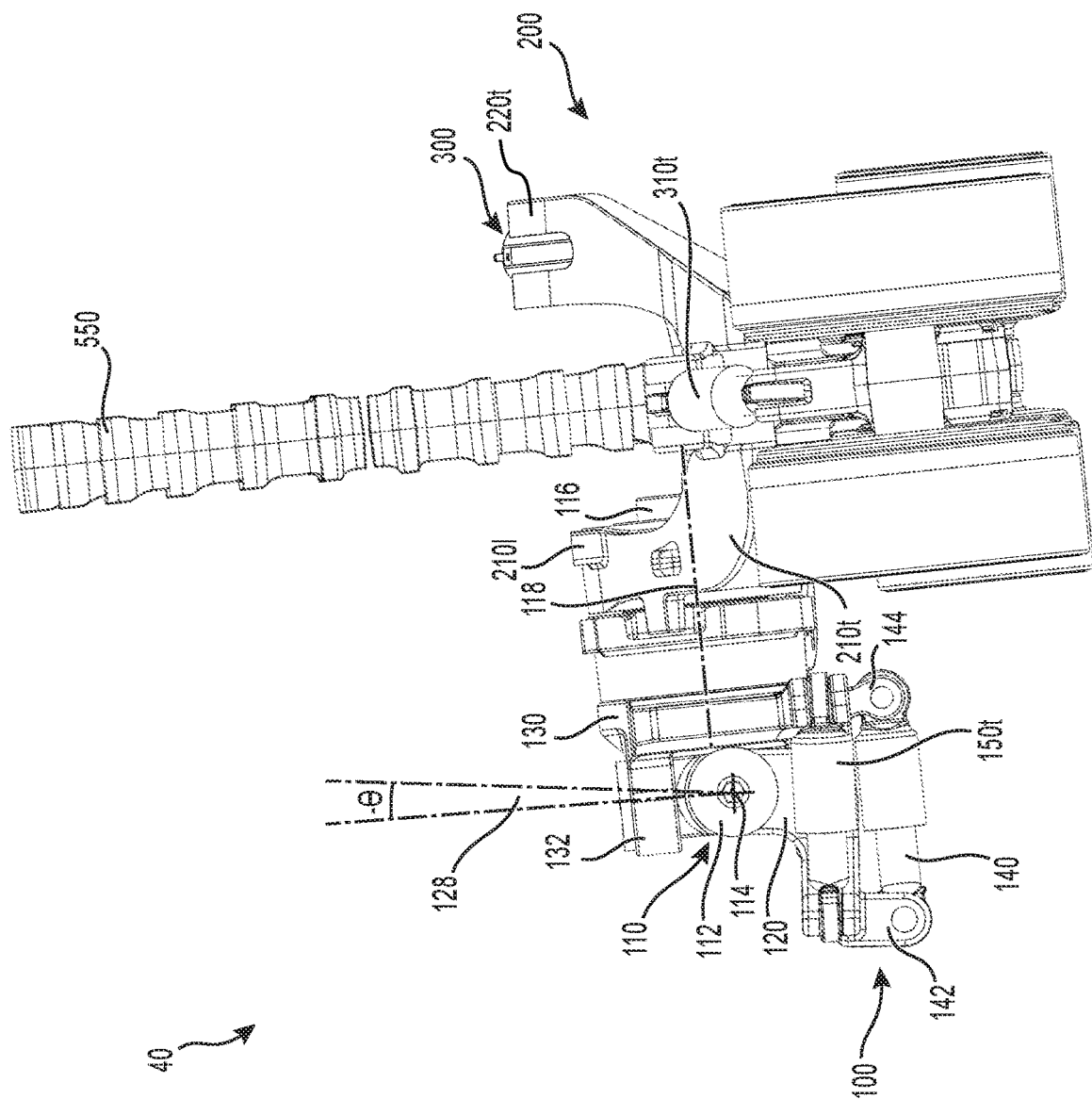
FIG. 3A is a rear elevation view of the track system of FIG. 1, with the endless track removed, and the frame assembly and wheel assemblies pivoted at a negative camber angle.
Figure 3B:
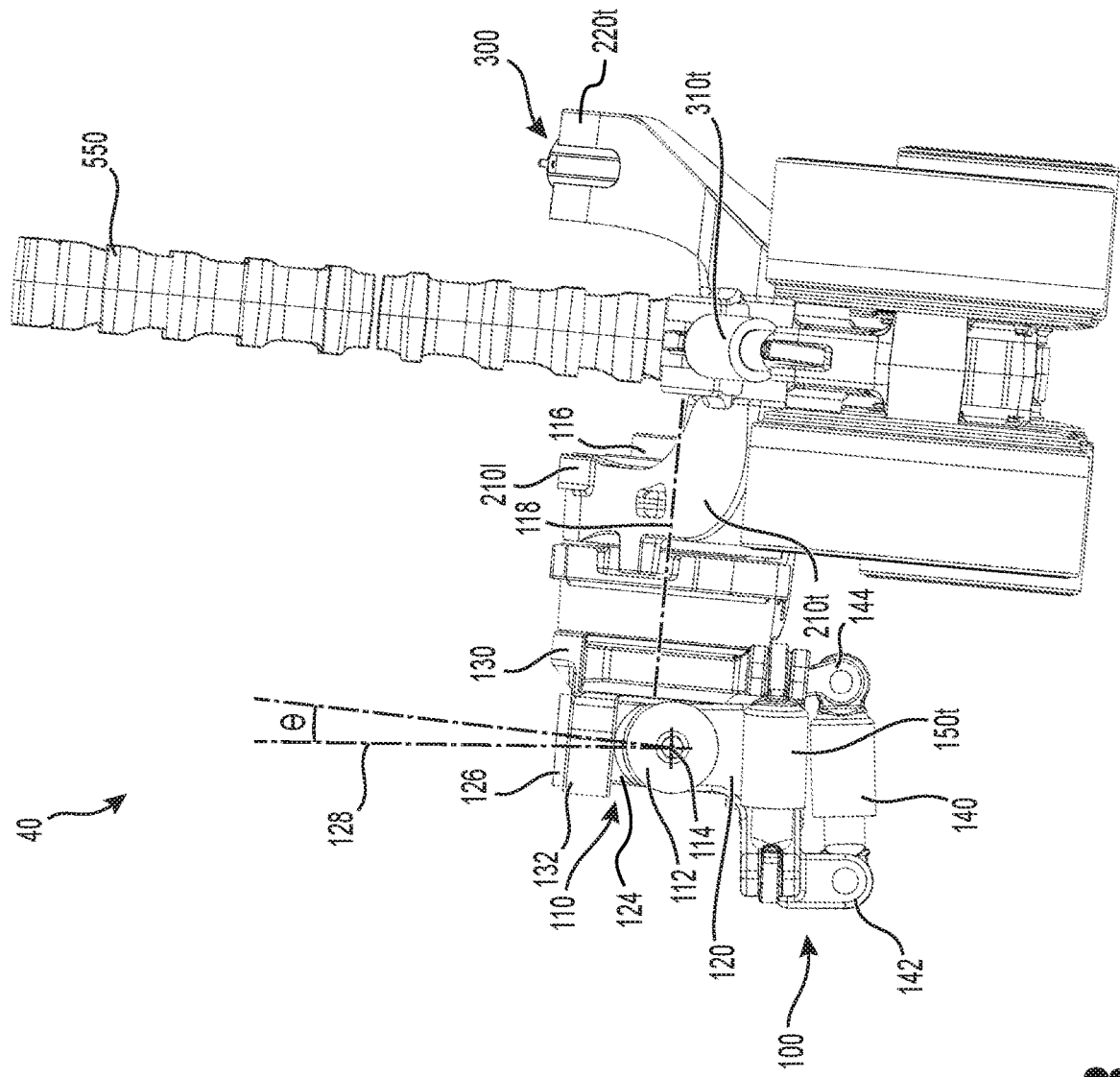
FIG. 3B is a rear elevation view of the track system of FIG. 3A, with the frame assembly and wheel assemblies pivoted at a positive camber angle.

As best seen in FIGS. 2 to 3B, the plate 130 has the pivot 116 projecting therefrom and extending laterally outwardly from the attachment assembly 100. The pivot 116 is connected to the outward face of the plate 130. The pivot 116 can be connected to the plate 130 using fasteners and/or any bonding techniques such as welding. In some embodiments, the pivot 116 is integrally formed with the plate 130. Loads on the chassis 62 of the vehicle 60 (including the vehicle's weight) are transferred to the plate 130 via the yoke 120 when connected to the chassis 62. Loads are then transferred to the pivot 116 and then to the leading and trailing frame members 210*l*, 210*t*, and so on.

As will be described in more details below, the roll, pitch and yaw pivot axes 114, 118, 128 permit degrees of freedom of the track system 40 relative to the chassis 62 of the vehicle 60 that can assist the endless track 600 to better conform to the ground surface on which it travels and in turn distribute more evenly the load on the entire surface of the ground engaging segment 620 of the endless track 600.

Referring to FIGS. 3A to 4B, the attachment assembly 100 further has a camber angle adjusting actuator 140 operatively connected between downwardly projecting tabs 142 of the yoke 120 and downwardly projecting tabs 144 of the plate 130. The camber angle adjusting actuator 140 is thus downwardly offset of the pivot axes 114, 118. The actuator 140 is a telescopic linear actuator. Referring to FIGS. 3A and 3B, retraction and extension of the actuator 140 causes pivoting of the frame assembly 200 and wheels 400*l*, 400*t*, 410*a*, 410*b*, 410*c* about the roll pivot axis 114 so as to adopt a negative camber angle −θ (FIG. 3A) or a positive camber angle θ (FIG. 3B). In some embodiments, the camber angle adjusting actuator 140 can provide for camber angle adjustment of up to about 10 degrees, that is angle θ equals to about 10 degrees, but larger or smaller angles θ are contemplated in different embodiments.

As best seen in FIG. 3A, extension of the actuator 140 causes the track system 40 to adopt a negative camber angle −θ. Conversely and as seen in FIG. 3B, retraction of the actuator 140 causes the track system 40 to adopt a positive camber angle θ. As such, the track system 40 has a range of roll motion about the pivot axis 114 from about −10 degrees to 10 degrees for adjusting the camber angle of the track system 40. The degree of freedom in roll motion about the pivot axis 114 permits the track systems 40, 40' to better conform to a ground surface which is inclined laterally and that defines, for example, a crowned road or a shallow ditch.

As such, the load supported by the frame assembly 200 is more evenly distributed between the inward and outward wheels of the idler and support wheel assemblies 400*l*, 400*t*, 410*a*, 410*b*, 410*c*. This more even distribution of the load can reduce wear of the endless track 600 as a majority of the area of the ground engaging segment 620 is in ground contact, and not just and area below the inward or outward wheels. Wear of the bearings and axle assemblies of each one of the idler and support wheel assemblies 400*l*, 400*t*, 410*a*, 410*b*, 410*c* is also reduced compared to track systems that do not have a degree of freedom in roll motion.

Referring to FIGS. 4A and 4B, the actuator 140 can also be used for selective adjustment of the camber angle θ as a function of the load applied on the track system 40. For example, as a load L of the vehicle 60 increases, for example during harvesting or loading operations, the center portion of the chassis 62 deflects downwards under this increased load L, which would tilt the track systems 40, 40' at a negative camber angle −θ and causing the inward wheels of the wheel assemblies 400*l*, 400*t*, 410*a*, 410*b*, 410*c* to bear more load than the outward wheel assemblies. The actuator 140 can be selectively retracted so that the camber angle θ be adjusted to compensate for this deflection (i.e. θ is equal to about 0 degree, which corresponds to a neutral camber angle). As such, in certain circumstances, the load could be more evenly distributed across the ground engaging segment 620 of the endless track 600. It is to be noted that in FIG. 4B, the camber angle θ is not to scale and is represented for illustrative purposes. Thus, operation of the actuator 140 could allow the track system 40 to have a dynamically changing camber angle θ depending on, for example, ground surface conditions, temperature in certain portions of the endless track 600 and/or the load L born by the vehicle 60.

In other embodiments, the actuator 140 is replaced by a stepper motor or by any other devices capable of adjusting the positional relationship about the roll pivot axis 114 between the attachment assembly 100 and the frame assembly 200. Thus, the actuator 140 could be replaced by a stepper motor which could adjust the positional relationship by rotating the frame assembly 200 relative to the attachment assembly 100 about the roll pivot axis 114. Other suitable motors could be used in other embodiments.

Referring to FIGS. 5 and 6, the attachment assembly 100 further has a leading tracking adjusting actuator 150*l* operatively connected between forwardly projecting tabs 152*l* of the yoke 120 and forwardly projecting tabs 154*l* of the plate 130, and a trailing tracking adjusting actuator 150*t* operatively connected between rearwardly projecting tabs 152*t* of the yoke 120 and rearwardly projecting tabs 154*t* of the plate 130. The leading and trailing tracking adjusting actuators 150*l*, 150*t* are thus longitudinally offset of the pivot axis 118.

Referring to FIG. 5, retraction of the actuator 150*l* and extension of the actuator 150*t* cause pivoting of the track system 40 about the pivot axis 128 so as to adopt a toe-in angle −γ (ie. the leading idler wheel assembly 400*l* is pivoted inwards and towards the chassis 62 of the vehicle 60) relative to a plane 190, which extends parallel to a longitudinal direction of the track system 40, parallel to the center plane 66 of the vehicle 60 and parallel to a height direction of the track system 40. Referring to FIG. 6, extension of the actuator 150*l* and retraction of the actuator 150*t* cause pivoting of the track system 40 about the pivot axis 128 so as to adopt a toe-out angle γ (i.e. the leading idler wheel assembly 400*l* is pivoted outwards and away from the chassis 62 of the vehicle 60) relative to the plane 190.

In some embodiments, the actuators 150*l*, 150*t* can provide for tracking angle adjustment of up to about 10 degrees, that is angle γ equals to about 10 degrees, but larger or smaller angles γ are contemplated in different embodiments. The degree of freedom in yaw motion about the pivot axis 128 permits the track systems 40, 40' to adjust the tracking angle and reduce wear of the endless track 600 in some conditions due to a misalignment of the track systems 40, 40'. Like the camber angle θ, the toe-in/toe-out angle γ can be dynamically changed using the actuators 150*l*, 150*t* when required, depending on, for example, temperature of certain portions of the endless track 600, ground surface conditions and the load L born by the vehicle 60. As such, premature wear of the endless track 600 and other components of the track system 40 is reduced compared to conventional track systems. Furthermore, as mentioned above, the selection of the toe-in/toe-out angle γ may also assist in preserving the integrity of the soil.

In addition, in another embodiment, the actuator 140 is omitted and the camber angle θ is adjustable by simultaneously retracting or extending the actuators 150*l*. 150*t*. For example, in such an embodiment, simultaneously extending the actuators 150*l*, 150*t* causes the track system 40 to adopt a negative camber angle −θ. Conversely, retracting the actuators 150*l*, 150*t* causes the track system 40 to adopt a positive camber angle θ. Thus, in such an embodiment, the actuators 150*l*, 150*t* are operable for selectively adjusting both the camber angle θ and the toe-in/toe-out angle γ of the track system 40.

Moreover, when the track systems 40 is steerable, for example when operatively connected to a steerable component of the chassis 62, the actuators 150*l*, 150*t* could be operatively connected to the steering system of the vehicle 60 so as to provide better steering control under some circumstances. For example, when the vehicle 60 is steered to the right, the actuator 150*l* is extended and the actuator 150*t* is retracted so as to assist the track system 40 to steer the vehicle 60 to the right.

Referring back to FIG. 2, a stop 160 projects inwardly from the leading frame member 210*l* and extends through an aperture 162 (seen in FIG. 10B) defined in the plate 130. In the present embodiment, the stop 160 is integrally formed with the leading frame member 210*t*, but they could be provided as separate components connected together in another embodiment. The stop 160 is structured and dimensioned to limit the pivotal motion of the leading frame member 210*l* about the pitch pivot axis 118. In some embodiments, the aperture 162 is arcuate and the center of the arc of the aperture 162 coincides with the pitch pivot axis 118. The stop 160 and/or the aperture 162 could be configured otherwise and limit the pivotal motion of the leading frame member 210*l* relative to the plate 130 to a lesser or greater extent than the one illustrated.

Leading and Trailing Frame Members

Referring now to FIGS. 3A to 8, the leading and trailing frame members 210*l*, 210*t* will be described. The leading and trailing frame members 210*l*, 210*t* are pivotably connected to the attachment assembly 100 as they are supported by the pivot 116. The leading and trailing frame members 210*l*, 210*t* are disposed laterally outwardly from the attachment assembly 100 (FIGS. 5 and 6). In order to facilitate the pivoting of the leading and trailing frame members 210*l*, 210*t* on the pivot 116, bearings (not shown) are disposed between the pivot 116 and each frame member 210*l*, 210*t*. In some embodiments, bushings or tapper rollers could be used in place of bearings.

In the present embodiment, the leading and trailing frame members 210*l*, 210*t* have apertures defined by loops 214*l*, 214*t* (FIG. 5). The pivot 116 extends through the apertures of the loops 214*l*, 214*t* similar to a pin in a hinge assembly, and provides for pivotable connection of the leading and trailing frame members 210*l*, 210*t* about the pitch pivot axis 118. On the outwards side of the sprocket wheel 550, the damper 300 interconnects an upper portion 220*l* of the leading frame member 210*l* and an upper portion 220*t* of the trailing frame member 210*t*. The damper 300 controls the pivot motion about the pitch pivot axis 118 of the leading and trailing frame members 210*l*, 210*t* one relative to the other. The damper 300 includes a hydro-pneumatic cylinder 302. In some embodiments, the damper 300 further includes a coil spring. In some embodiments, the damper 300 is replaced by a coil spring, an air spring or a hydro-pneumatic spring. When the track system 40 supports the weight of the vehicle 60, damper 300 is deformed (i.e. compressed) and the cylinder 302 provides for a dampened pivotal motion of the leading and trailing frame members 210*l*, 210*t* relative to each other.

The positioning of the damper 300 between the upper portions 220*l*, 220*t* of the leading and trailing frame members 210*l*, 210*t* respectively, allows for a relatively long stroke of the cylinder 302 of the damper 300. As a result, the damping action of the damper 300 is generally more refined than in conventional track systems where the stroke of a damping cylinder is shorter. Such configuration provides for a smoother damping action of the damper 300 and may reduce the risks of fully compressing the damper 300. Under certain conditions, vibrations that are due to the ground surface on which the track system 40 travels and transferred to the leading and trailing frame members 210*l*, 210*t* are dampened by the damper 300. As described above, the stop 160 limits the pivotal motion of the leading frame member 210*l* relative to the plate 130, and the pivotal motion of the trailing frame member 210*t* is limited by the stroke of the cylinder 302.

In some embodiments, the damper 300 has variable damping characteristics as described in commonly owned International Patent Application No. PCT/CA2016/050418, filed Apr. 11, 2016, entitled "Progressive Damping System for a Track System" and published as WO 2016/161527. The content of this application is incorporated herein by reference in its entirety.

Figure 1:
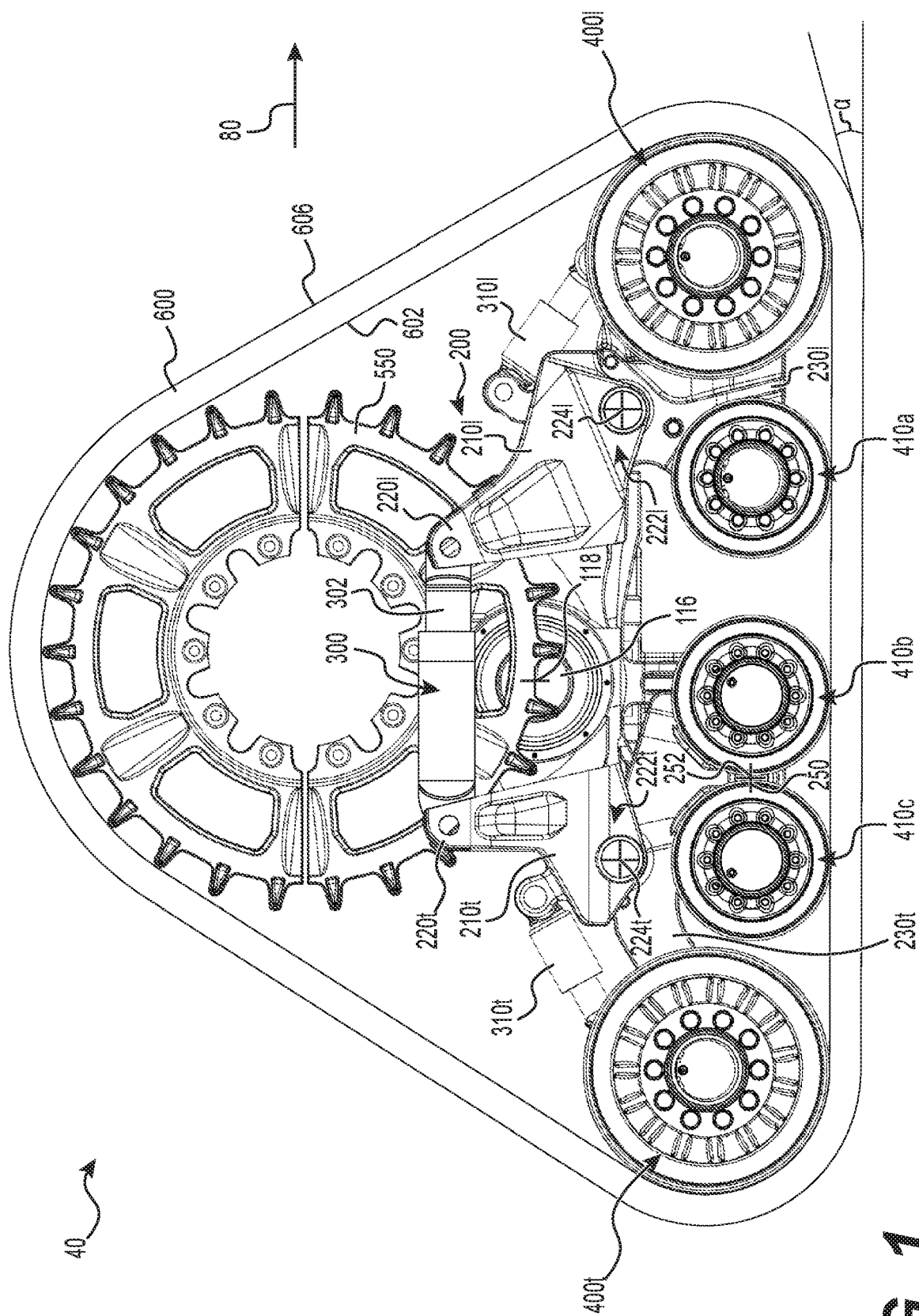
FIG. 1 is a right side elevation view of a track system being an embodiment of the present technology configured to be operatively connected on a right side of a vehicle.
Figure 11:
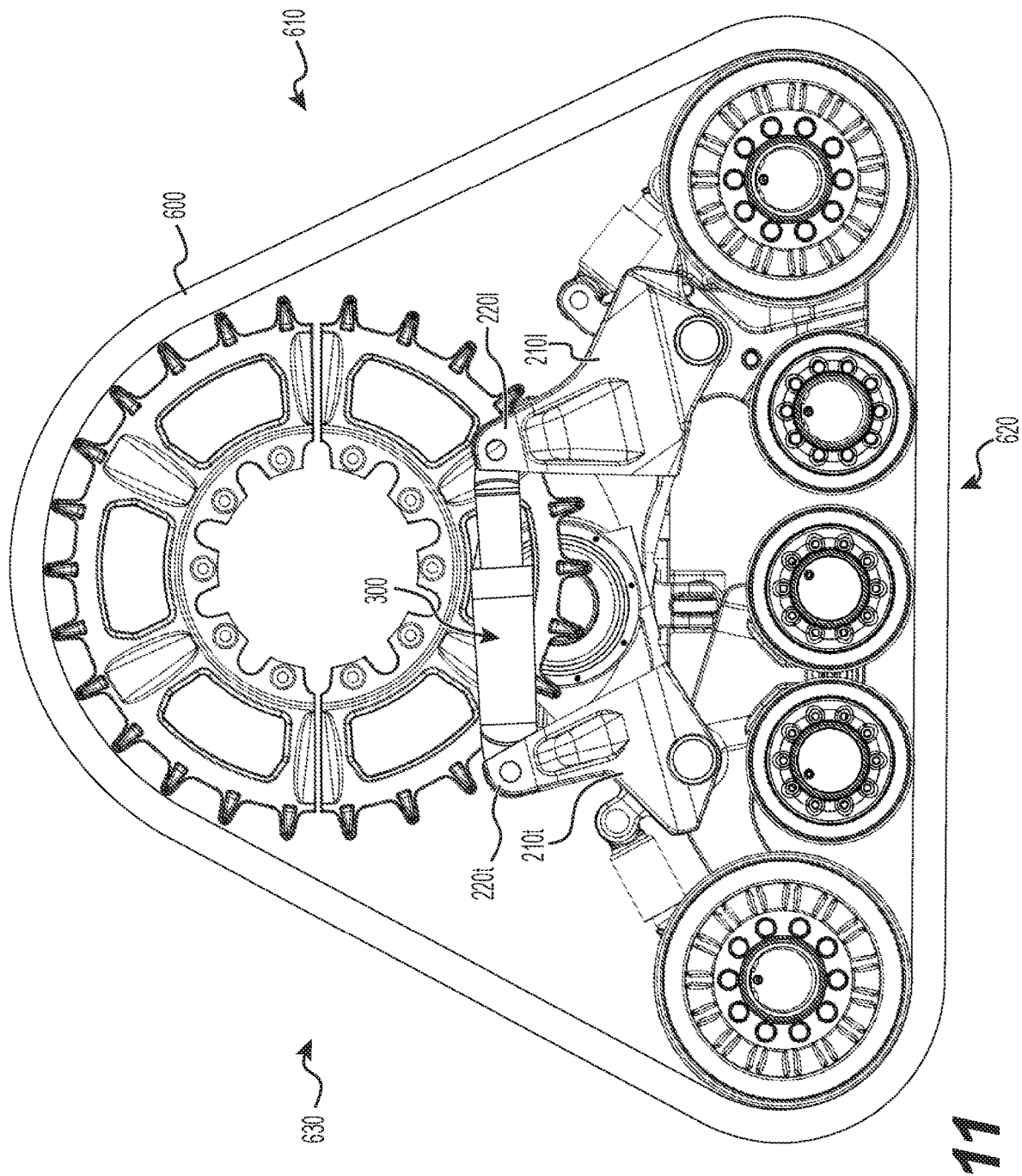
FIG. 11 is a right side elevation view of the track system of FIG. 1, with the damper in the fully extended position.
Figure 12:
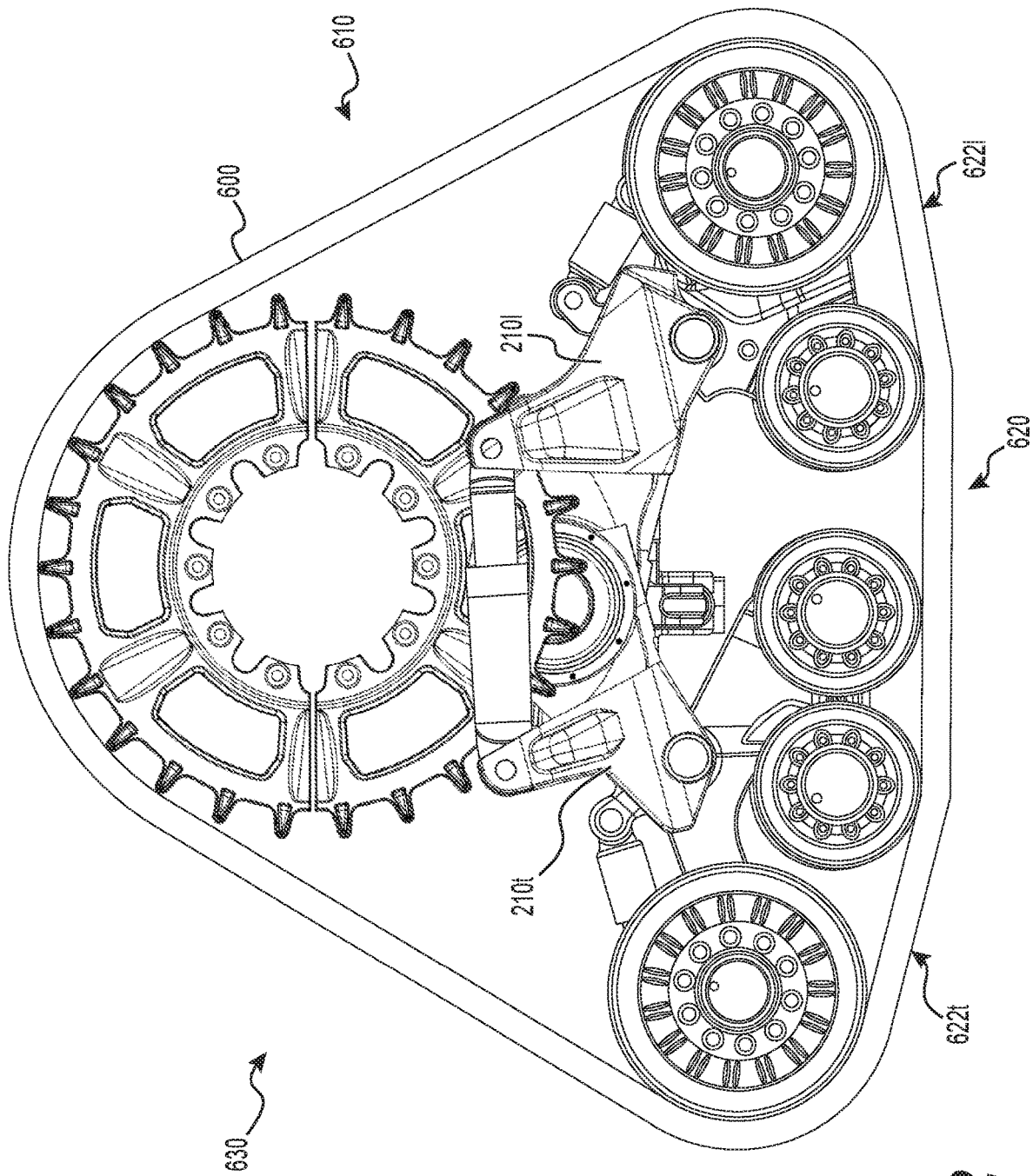
FIG. 12 is a right side elevation view of the track system of FIG. 11, with the leading and trailing idler wheel assemblies raised.
Figure 13:
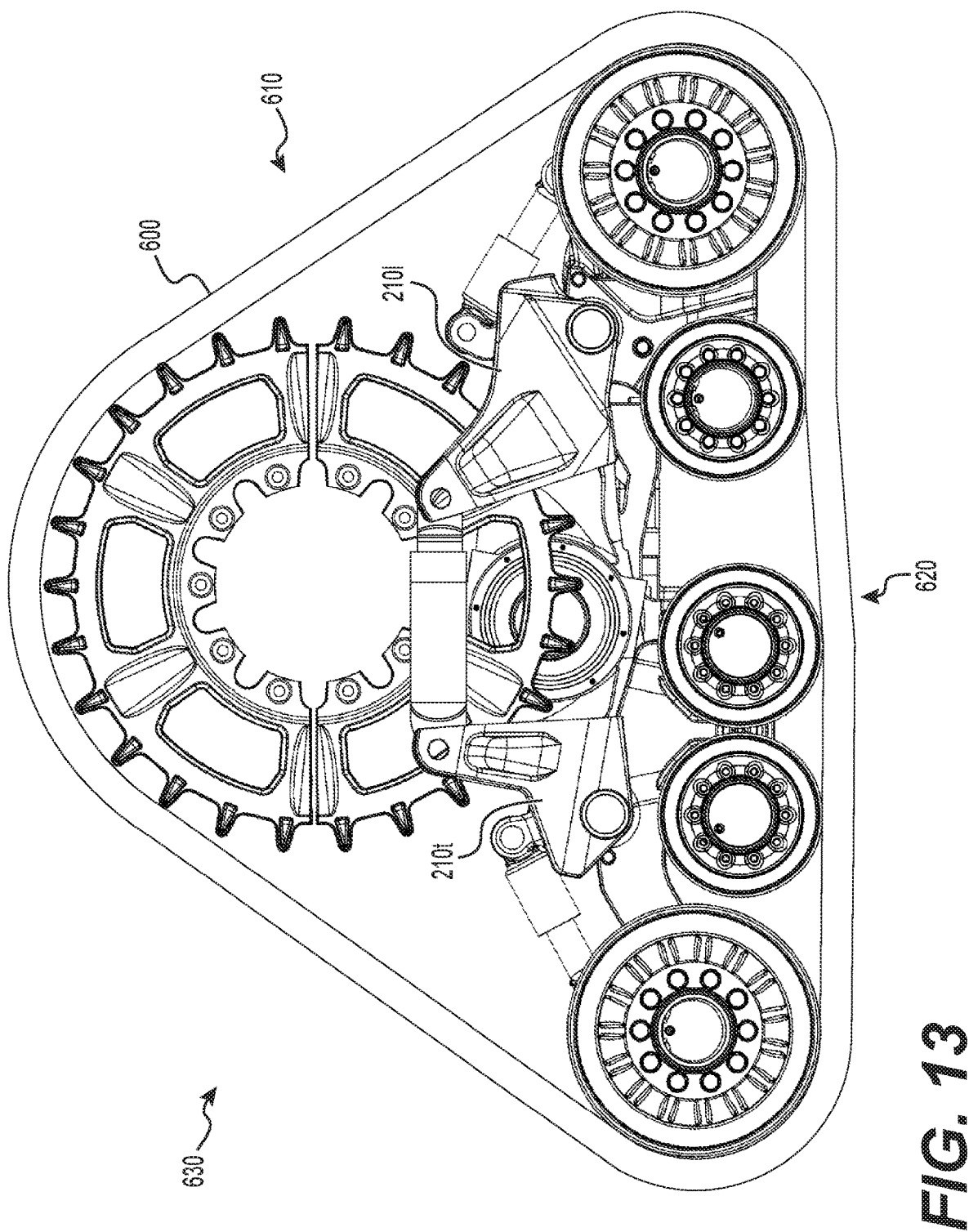
FIG. 13 is a right side elevation view of the track system of FIG. 1, with the damper in the fully compressed position.
Figure 14:
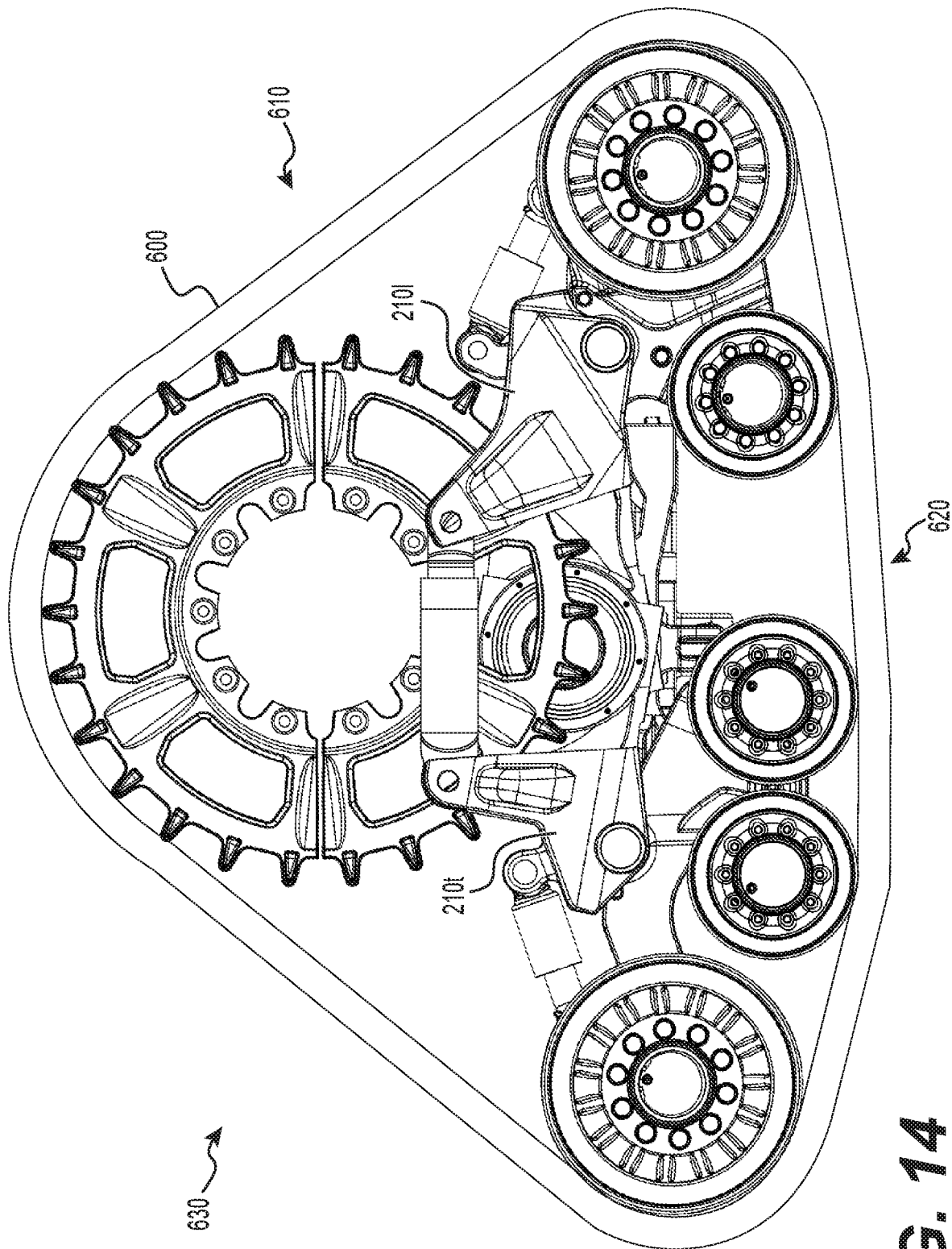
FIG. 14 is a right side elevation view of the track system of FIG. 13, with the leading and trailing idler wheel assemblies raised.

FIGS. 1, 11 and 13 illustrate different configurations of the track system 40 when stationary and with each of the leading and trailing idler and support wheel assemblies 400*l*, 400*t*, 410*a*, 410*b*, 410*c* positioned for the endless track 600 to be in ground contact (i.e. the ground engaging segment 620 extends from below the leading idler wheel assembly 400*l* to below the trailing idler wheel assembly 400*t*). Referring to FIG. 1, the track system 40 is shown in a rest configuration. In this position, the track system 40 supports a nominal load. The nominal load of the track system 40 corresponds to the track system 40 being attached to the vehicle 60 with the track system 40 bearing its ordinary portion of the weight of the vehicle 60 when the vehicle 60 is at its tare weight, with no implements or attachments at the front or rear and no payload in its container or tank. Referring to FIG. 11, the track system 40 is shown with the damper 300 fully extended. Such configuration would be found when the track system 40 supports a load that is smaller than the nominal load. In FIG. 13, the track system 40 is shown with the damper 300 fully compressed. Such configuration would be found when the track system 40 supports a load that is greater than the nominal load.

Still referring to FIGS. 1, 11 and 13, the leading and trailing frame members 210*l*, 210*t* of the track system 40 define a somewhat scissor-like structure, with each frame member 210*l*, 210*t* pivoting about the pivot 116, and the damper 300 interconnected therebetween. Each one of the leading and trailing wheel-bearing members 230*l*, 230*t* is in turn pivotably connected to the leading and trailing frame member 210*l*, 210*t*, respectively. The pivoting of each of these structures, along with the damper 300, may assist in reducing the vertical displacements and vibrations transferred from the track system 40 to the chassis 62 of the vehicle 60 under certain conditions.

In addition, having the track system 40 with such a scissor-like structure has other advantages in certain situations. For example, as the weight of the vehicle 60 increases, for example during harvesting or loading operations, the scissor-like structure can open and a ground-contacting portion of the endless track 600 occurs over an increased surface area (i.e. the ground engaging segment 620 increases in size as the load borne by the track system 40 increases—at least for some increases in load—depending on the design of a specific track system). As a result, in some circumstances, the pressure applied to the ground by the endless track 600 (owing to the weight and load of the vehicle 60) increases at a lower rate than the weight of the vehicle 60. In certain embodiments, this will allow the track system 40 to bear additional loads as compared with conventional track systems.

Leading and Trailing Wheel-Bearing Frame Members and Idler Wheels

Referring to FIG. 7, in the illustrated embodiment of the present technology, the leading wheel-bearing frame member 230*l* is directly pivotably connected to the lower portion 222*l* of the leading frame member 210*l* and pivots about the axis 224*l*. The leading idler wheel assembly 400*l* is rotatably connected to the leading wheel-bearing frame member 230*l* and rotates about an axis 404*l*. A leading idler actuator assembly 310*l* is connected between the leading wheel-bearing frame member 230*l* and the leading frame member 210*l* for adjusting the pivotal positioning of the leading idler wheel assembly 400*l* relative to the leading frame member 210*l*. When the leading idler actuator assembly 310*l* is retracted, as shown in FIG. 7, the leading idler wheel assembly 400*l* pivots about the axis 224*l* (in the counter-clockwise direction in FIG. 7) and is pulled toward the leading frame member 210*l*. When the leading idler actuator assembly 310*l* is retracted, the leading ground engaging segment 622*l* extends above ground (when the track system 40 is disposed on flat level ground) as shown in FIG. 7. In some circumstances, such as when the track system 40 has to travel over a bump or has to get out of a pothole or a ditch, raising the leading idler wheel assembly 400*l* may assist in overcoming the bump or getting the track system 40 out of the pothole or ditch. In addition, raising the leading idler wheel assembly 400*l* using the actuator 310*l* may prevent undesirable soil compaction as the track system 40 gets out of the pothole or the ditch compared to conventional track systems where the leading idler wheel assembly 400*l* would remain lowered. In the present embodiment, the leading idler actuator assembly 310*l* also limits the pivotal motion and provides for a dampened pivotal motion of the leading wheel-bearing frame member 230*l* and the leading frame member 210*l* relative to each other about the axis 224*l*.

Referring to FIG. 8, the trailing wheel-bearing frame member 230*t* is directly pivotably connected to the lower portion 222*t* of the trailing frame member 210*l* and pivots about the axis 224*t*. The trailing idler wheel assembly 400*t* is rotatably connected to the trailing wheel-bearing frame member 230*t* and rotates about an axis 404*t*. A trailing idler actuator assembly 310*t* is connected between the trailing wheel-bearing frame member 230*t* and the trailing frame member 210*t* for adjusting the pivotal positioning of the trailing idler wheel assembly 400*t* relative to the trailing frame member 210*t*. When the trailing idler actuator assembly 310*t* is retracted, as shown in FIG. 8, the trailing idler wheel assembly 400*t* pivots about the axis 224*t* (in the clockwise direction in FIG. 8) and is pulled toward the trailing frame member 210*t*. When the trailing idler actuator assembly 310*t* is retracted, the trailing ground engaging segment 622*l* extends above ground (when the track system 40 is disposed on flat level ground) as shown in FIG. 8. In some circumstances, such as when the track system 40 is travelling backwards over a bump or is getting out of a pothole or a ditch, raising the trailing idler wheel assembly 400*t* may assist in overcoming the bump or getting the track system 40 out of the pothole or the ditch. In the present embodiment, the trailing idler actuator assembly 310*t* also limits the pivotal motion and provides for a dampened pivotal motion of the trailing wheel-bearing frame member 230*t* and the trailing frame member 210*t* relative to each other.

It is also contemplated that, in some conditions, the idler actuator assemblies 310*l*, 310*t* could be deactivated and configured to provide for an unbiased pivotal motion of their respective wheel-bearing frame member relative to their respective frame member.

In other embodiments, the actuator assemblies 310*l*, 310*t* could be replaced by electric motors, such as stepper motors, or any other suitable device operatively connected between the leading frame member 210*l* and the leading wheel-bearing frame member 230*l*, and the trailing frame member 210*t* and the trailing wheel-bearing frame member 230*t* for adjusting the pivotal positioning therebetween.

Figure 9:
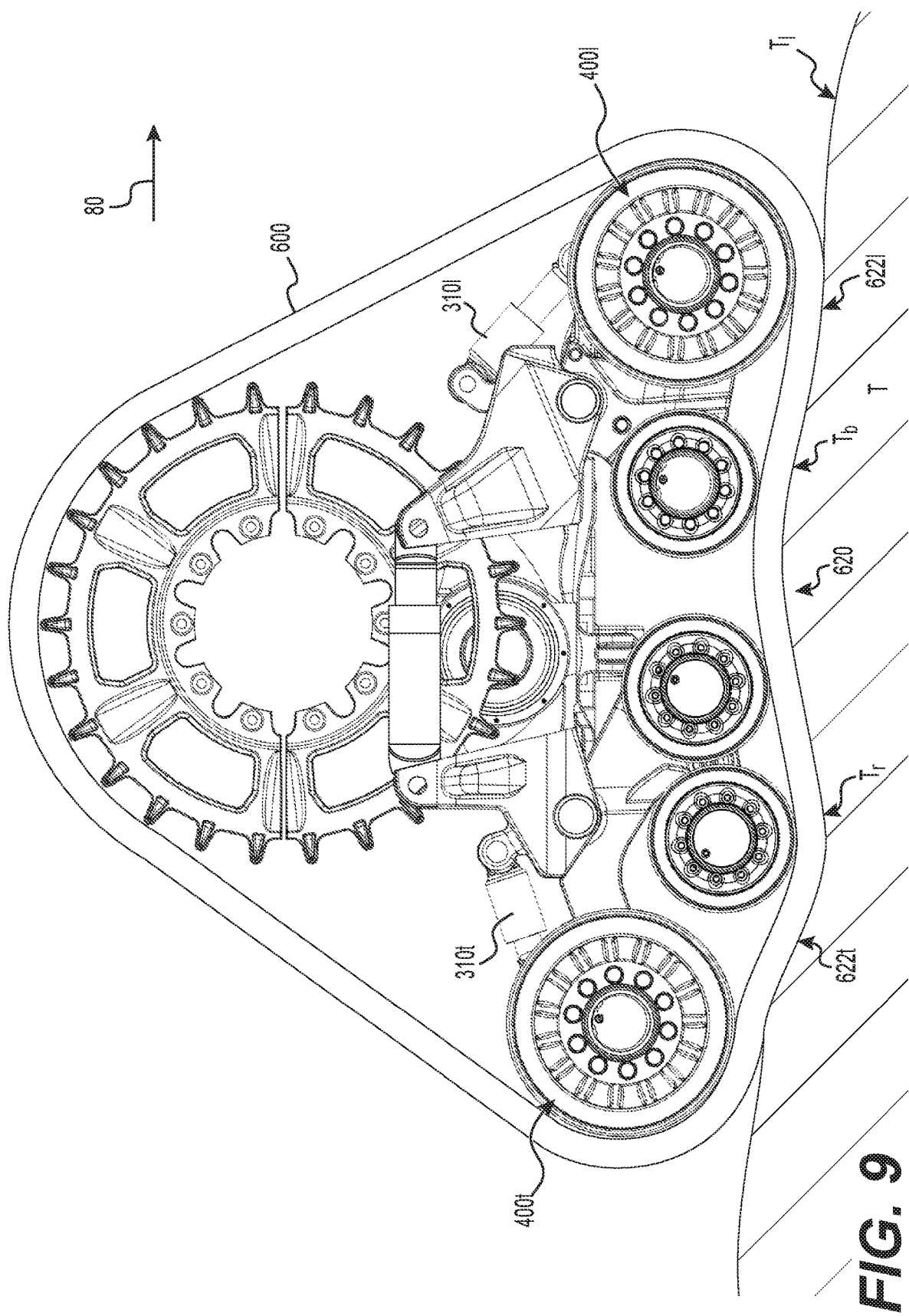
FIG. 9 is a right side elevation view of the track system of FIG. 1 travelling on an uneven terrain, with the trailing actuator retracted and the leading actuator extended.

Referring to FIGS. 7 to 10A, upon extension or retraction of the actuator assemblies 310*l*, 310*t*, the endless track 600 can selectively have the leading ground-engaging segment 622*l* and/or the trailing ground engaging segment 622*l* extending on or above the ground surface. Referring to FIG. 9, the track system 40 is shown travelling in the forward travel direction 80 over an uneven terrain T. When the leading idler wheel assembly 400*l* travels over a downwardly inclined surface Tl and the support wheel assembly 410*a* travels over a bump Tb, the leading actuator assembly 310*l* is passively or actively extended to maintain as much of the leading ground engaging segment 622*l* as possible in contact with the terrain T. As a result, the load born by the track system 40 is distributed over a larger area than if the leading idler wheel assembly 400*l* were raised upon retraction of the actuator assembly 310*l*. Similarly, as the trailing support wheel assemblies 410*b*, 410*c* and the idler wheel assembly 400*t* travel in a recess Tr, the trailing idler actuator 310*t* is passively or actively retracted to maintain as much of the trailing ground engaging segment 622*l* as possible in contact with the terrain T. As a result, the load born by the track system 40 is distributed over a larger area than if the trailing idler wheel assembly 400*t* were lowered upon extension of the actuator assembly 310*t* and pressure is thus more evenly distributed along the ground engaging segment 620 of the endless track 600.

Referring to FIG. 10A, both the leading and trailing actuator assemblies 310*l*, 310*t* are retracted and, as mentioned above, the ground engaging segment 620 is shorter than in the configurations shown in FIG. 1, 7 or 8. The configuration of FIG. 10A can assist in reducing wear of the endless track 600 when travelling over hard ground surfaces, such as a paved road. As the amount of endless track 600 in ground contact is reduced compared to the configurations shown in FIGS. 1, 7 and 8, rolling resistance of the track system 40 and/or wear of the endless track 600 are reduced under some conditions. In addition, when the leading ground engaging segment 6221 extends above ground, an angle of attack a of the endless track 600 when engaging the ground surface is reduced compared to the same angle of attack a in the configuration shown in FIG. 1 where the endless track 600 wraps around the leading idler wheel assembly 400*l* and contacts the ground. The angle of attack a of the endless track 600 shown in FIG. 7 may assist in reducing wear of the tread 608 under some conditions.

Moreover, steering of the track system 40 is facilitated when both the leading and trailing actuator assemblies 310*l*, 310*t* are retracted, and the track system 40 has a behavior that is more akin to a wheel and tire assembly. Thus, under certain conditions such as when the track system 40 travels over hard ground surfaces, configuring the track system 40 as shown in FIG. 10A is advantageous over the configuration shown in FIG. 1 to reduce wear of the endless track 600.

Tensioner

Figure 10B:
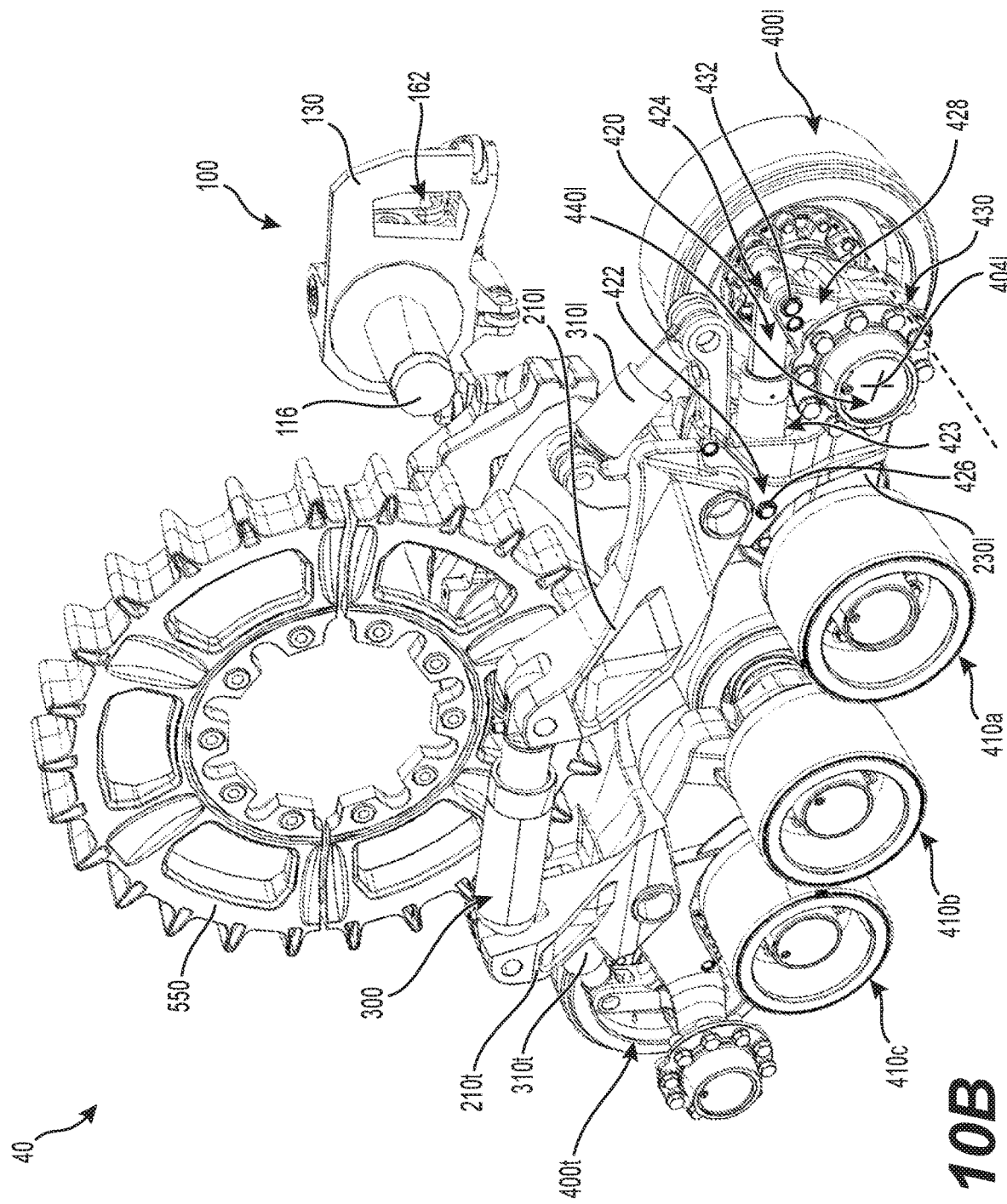
FIG. 10B is a partially exploded, perspective view taken from a front, top right side of the track system of FIG. 1, with the endless track and one idler wheel of the leading and trailing idler wheel assemblies removed.

Referring now to FIG. 10B, the leading wheel-bearing frame member 230*l* includes a tensioner 420 having first and second ends 422, 424 respectively. The first end 422 extends inside a recess 423 of the leading wheel-bearing frame member 230*l* and is rotatably connected to the leading wheel-bearing frame member 230*l* at a proximal tensioning pivot 426. A wheel linkage 428 is rotatably connected to the leading wheel-bearing frame member 230*l* at an axis 430 (shown as a dashed line in FIG. 10B) that is offset from the axis 404*l*. The second end 424 of the tensioner 420 is rotatably connected to the wheel linkage 428 at a distal tensioning pivot 432 which is offset from the axis 404*l*. A leading axle assembly 440*l* is operatively connected to the wheel linkage 428 and defines the axis 404*l*. The distal tensioning pivot 432 and the axis 430 are angularly displaced around the axis 404*l* such that the wheel linkage 428 forms a lever with the axis 430 being the fulcrum thereof.

Figure 15:
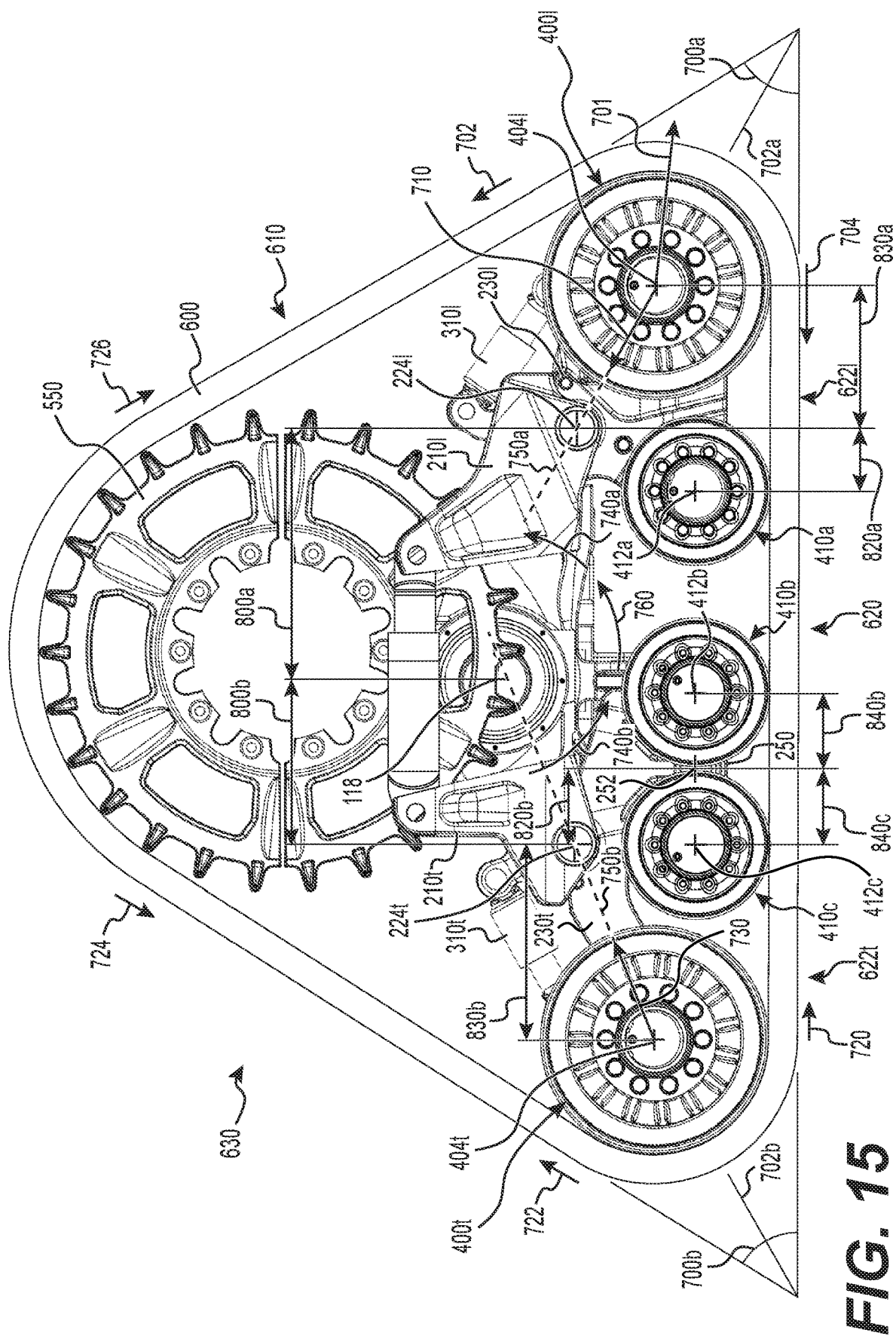
FIG. 15 is a right side elevation view of the track system of FIG. 1 in a rest configuration and stationary.
Figure 16:
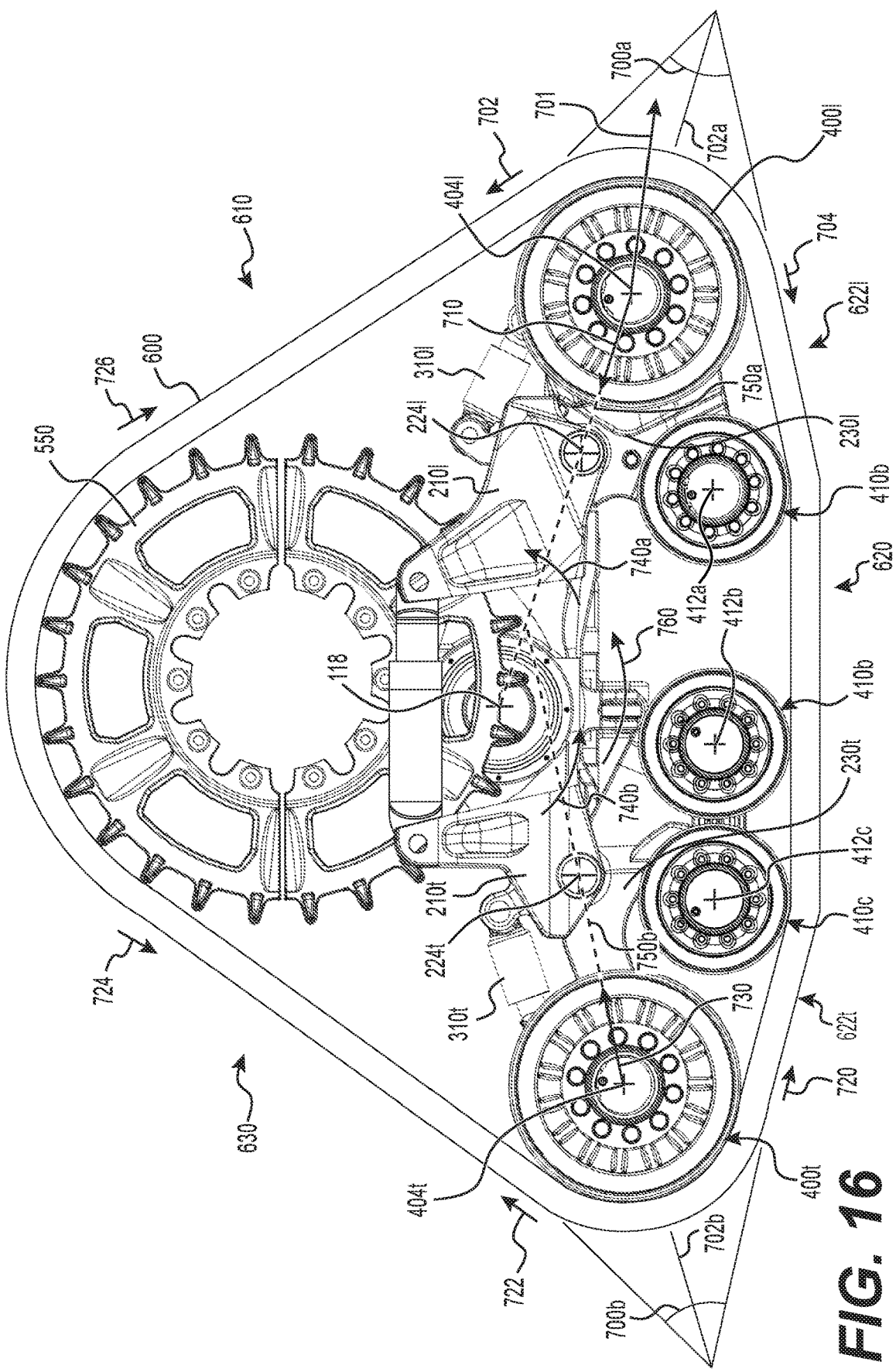
FIG. 16 is a right side elevation view of the track system of FIG. 1, with the leading and trailing idler wheel assemblies raised and stationary.

The action of the tensioner 420 and the wheel linkage 428 bias the leading axle assembly 440*l* forward, and thus the leading idler wheel assembly 400*l* is biased toward the forward end of the track system 40 with a biasing force 701 (FIGS. 15 and 16). The endless track 600 opposes the biasing force 701 provided by the action of the tensioner 420 and the wheel linkage 428. Tensions 702, 704 (FIGS. 15 and 16) appear in the leading segment 610 and the leading ground-engaging segment 6221 of the endless track 600.

In some embodiments, the tensioner 420 is used to reduce the variations in the perimeter of the endless track 600 due to the pivoting of the leading and trailing frame members 210*l*, 210*t* respectively and leading and trailing wheel-bearing frame members 230*l*, 230*t* respectively. In some embodiments, the tensioner 420 is also operatively connected to the leading idler actuator assembly 310*l* and/or the trailing idler actuator assembly 310*t*. When operatively interconnected, for example using a shared hydraulic system, the leading and trailing idler actuator assemblies 310*l*, 310*t* and the tensioner 420 are operated in collaborative, synergistic fashion so as to reduce the variations in the perimeter of the endless track 600 and to prevent damage to the endless track 600 and/or any one of the actuator assemblies 310*l*, 310*t* and the tensioner 420.

In addition and referring to FIG. 9, the tensioner 420 and the leading and trailing idler actuator assemblies 310*l*, 310*t* can be operated in collaborative, synergistic fashion so as to maintain as much of the ground engaging segment 620 as possible in contact with the terrain T while maintaining adequate tension in the endless track 600. This is particularly useful when the terrain T and the bump Tb is sensitive to soil compaction issues. Should the terrain T be a hard ground surface not sensitive to soil compaction issues, the leading and trailing idler actuator assemblies 310*l*, 310*t* and the tensioner 420 could be operated in collaborative, synergistic fashion so as to increase the tension in the endless track to maximum operational tension so that the endless track 600 extends rigidly above the recess Tr (i.e. without conforming to it) and over the bump Tb. In addition, under certain conditions, if debris becomes stuck between one of the wheel assemblies and the endless track 600, the tensioner 420 is configured to apply less biasing force 701 and/or retract so as to reduce variation in the perimeter of the endless track 600. When debris are ejected from the track system 40, the tensioner 420 is configured to apply more biasing force 701 and/or extend to provide for adequate tension forces 702, 704 in the endless track 600. In addition, the tensioner 420 can be operated so as to increase tension in the endless track 600 in some circumstances, such as during a hard braking event. An increased tension in the endless track 600 may reduce the risks of lugs 604 of the endless track 600 skipping on the sprocket wheel 550.

In some embodiments, the tensioner 420 is a dynamic tensioning device as described in commonly owned International Patent Application No. PCT/CA2016/050419, filed Apr. 11, 2016, entitled "Dynamic Tensioner Locking Device for a Track System and Method Thereof", and published as WO 2016/161528. The content of this application is incorporated herein by reference in its entirety.

Support Wheel Assemblies

Referring to FIGS. 15 and 16, the support wheel assembly 410*a* is rotatably connected to the leading wheel-bearing frame member 230*l* and rotates about an axis 412*a*. The support wheel assemblies 410*b*, 410*c* are rotatably connected to the trailing support wheel assembly 250 and rotate about axes 412*b*, 412*c* respectively. The trailing support wheel assembly 250 has a body that is longitudinally elongated and that extends above the lugs 604 of the endless track 600 (the lugs 604 are shown in FIG. 18). The trailing support wheel assembly 250 pivots about the axis 252 with respect to the trailing wheel-bearing frame member 230*t*. As such, the support wheel assemblies 410*b*, 410*c* are indirectly pivotably connected to the trailing wheel-bearing frame member 230*t*.

Material and Manufacturing

The various components of the track system 40 are made of conventional materials (e.g. metals and metal alloys in most cases, such as steel) via conventional manufacturing processes (e.g. casting, molding, etc.). The present technology merely requires that each component be suitable for the purpose for which it is intended and the use to which it is to be put. Any material(s) or method(s) of manufacture which produce such components may be used in the present technology.

Lines and Resultant Forces

FIGS. 15 and 16 illustrate the track system 40 in a plane view that is parallel to the plane 190 (FIGS. 5 and 6). The pivot axis 118 and the axes 2241, 224*t*, 252, 404*l*, 404*t*, 412*a*, 412*b*, 412*c* are perpendicular to the plane 190 and are represented by "+" signs. The pivot axis 118 and the axis 224*l* are spaced apart by a longitudinal distance 800*a* defined in the plane 190. The pivot axis 118 and the axis 224*t* are spaced apart by a longitudinal distance 800*b* defined in the plane 190. In this embodiment, the longitudinal distance 800*a* is greater than the longitudinal distance 800*b*. As a result, the leading frame member 210*l* defines a lever arm between the pivot axis 118 and the axis 224*l* that is greater than the lever arm defined by the trailing frame member 210*t* between the pivot axis 118 and the axis 224*t*. As a portion of the weight of the vehicle 60 is transferred from the chassis 62 to track system 40 via the attachment assembly 100 and to the pivot 116, and in turn to the leading and trailing frame members 210*l*, 210*t*, the trailing frame member 210*t* supports a greater load than the leading frame member 210*l* since the lever arm defined by the trailing frame member 210*t* between the pivot axis 118 and the axis 224*t* is shorter. To support the additional load on the trailing frame member 210*t* and in order to more evenly distribute the weight of the vehicle 60 over the endless track 600, the trailing wheel-bearing frame member 230*t* has more support wheel assemblies indirectly rotatably connected thereto than the leading wheel-bearing frame member 230*l* (namely the support wheel assemblies 410*b*, 410*c* rotatably connected to the trailing support wheel assembly 250).

The axes 412*a*, 224*l* are spaced apart in a longitudinal direction by a longitudinal distance 820*a* defined in the plane 190. The axes 224*l*, 404*l* are spaced apart in a longitudinal direction by a longitudinal distance 830*a* defined in the plane 190. In this embodiment, the distance 820*a* is shorter than the distance 830*a*. A portion of the weight of the vehicle 60 is transferred at the axis 224*l* from the leading frame member 210*l* to the leading wheel-bearing member 230*l*. Since the lever arm defined by the portion of the leading wheel-bearing member 230*l* supporting the leading support wheel assembly 410*a* is shorter than the portion of leading wheel-bearing member 230*l* supporting the leading idler wheel assembly 400*l*, the leading support wheel assembly 410*a* supports more load than the leading idler wheel assembly 400*l*.

The axes 224*t*, 252 are spaced apart in a longitudinal direction by a longitudinal distance 820*b* defined in the plane 190. The axes 224*t*, 404*t* are spaced apart in a longitudinal direction by a longitudinal distance 830*b* defined in the plane 190. In this embodiment, the distance 820*b* is shorter than the distance 830*b*. A portion of the weight of the vehicle 60 is transferred at the axis 224*t* from the trailing frame member 210*t* to the trailing wheel-bearing member 230*t*. Since the lever arm defined by the portion of the trailing wheel-bearing member 230*t* supporting the trailing support wheel assembly 250 is shorter than the portion of the trailing wheel-bearing member 230*t* supporting the trailing idler wheel assembly 400*t*, the trailing support wheel assembly 250 and the support wheel assemblies 410*b*, 410*c* support more load than the trailing idler wheel assembly 400*t*.

The axes 252, 412*b* are spaced apart in a longitudinal direction by a longitudinal distance 840*b* defined in the plane 190. Similarly, the axes 252, 412*c* are spaced apart in a longitudinal direction by a longitudinal distance 840*c* defined in the plane 190. In this embodiment, the distances 840*b*, 840*c* are equal. As such, the trailing support wheel assemblies 410*b*, 410*c* support equal loads.

By using the teachings in the present description and by selecting the dimensions of the various components described herein, a designer of track systems is able to set a distribution of load applied to the endless track 600 by the leading and trailing idler wheel assemblies 400*l*, 400*t* and the support wheel assemblies 410*a*, 410*b*, 410*c* to meet the requirements of a particular application, the track system 40 being in any one of the configurations shown in the accompanying Figures.

In the present embodiment, the distances 800*a*, 800*b*, 820*a*, 820*b*, 830*a*, 830*b*, 840*b*, 840*c*, the diameter and width of the idler and support wheel assemblies 400*t*, 410*a*, 410*b*, 410*c* are selected to distribute equally or close to equally the pressure applied to the endless track 600 by the leading support wheel assembly 410*a*, the trailing support wheel assemblies 410*b*, 410*c* and the trailing idler wheel assembly 400*t*. In this embodiment, the pressure applied to the endless track 600 by the leading idler wheel assembly 400*l* is less than the pressure applied by each one of the leading support wheel assembly 410*a*, the trailing support wheel assemblies 410*b*, 410*c* and the trailing idler wheel assembly 400*t*, at least when the leading idler actuator assembly 310*l* is not actively extended.

Other configurations in other embodiments are contemplated. For instance, the distances 800*a*, 800*b*, 820*a*, 820*b*, 830*a*, 830*b*, 840*b*, 840*c*, the diameter, width, cross-sectional profile and structure of the idler and support wheel assemblies 400*l*, 400*t*, 410*a*, 410*b*, 410*c* could be selected to equalize the pressure applied to the endless track 600 by the support wheel assemblies 410*a*, 410*b*, 410*c*. In yet other embodiments, the distances 800*a*, 800*b*, 820*a*, 820*b*, 830*a*, 830*b*, 840*b*, 840*c*, the diameter and width of the idler and support wheel assemblies 400*l*, 400*t*, 410*a*, 410*b*, 410*c* could be selected to equalize the pressure applied to the endless track 600 by the leading and trailing idler wheel assemblies 400*l*, 400*t*.

Note that in the accompanying Figures, the arrows indicating the tension forces, torques and biasing force are not to scale, they are schematic. Referring to FIGS. 15 and 16 and as described above, the combined actions of the tensioner 420 and the wheel linkage 428 (shown in FIG. 10B) on the leading idler wheel assembly 400*l* generate a biasing force 701 at the axis 404*l*. As a result, opposed tension forces 702, 704 exist in the leading and ground engaging segments 610, 620 of the endless track 600. A resultant force 710 (e.g. the combination of tension forces 702, 704) is applied to the leading idler wheel assembly 400*l* at the axis 404*l* and opposes biasing force 701. The leading and ground engaging segments 600, 620 of the endless track 600 form an angle 700*a*. The resultant force 710 is colinear with a bisector 702*a* of the angle 700*a*.

The leading wheel-bearing frame member 230*l* carries the resultant force 710 to the axis 224*l* along a line 750*a* extending between the axis 404*l* and the axis 224*l*, the line 750*a* being shown as a dashed line in FIGS. 15 and 16. In FIG. 15, the line 750*a* is colinear with the bisector 702*a*, but it could be otherwise in other embodiments as other configurations of the leading wheel bearing frame member 230*l* are contemplated. Having the resultant force 710 passing through the axis 224*l* has the effect of preventing the generation of a torque that is applied to the leading wheel-bearing member 230*l* about the axis 224*l*. The line 750*a* and the bisector 702*a* extend above the pivot axis 118. As the resultant force 710 is applied along the bisector 702*a*, the resultant force 710 passes above the pivot axis 118. Having the resultant force 710 passing above the pivot axis 118 has the effect of generating a torque 740*a* that is applied to the leading frame member 210*l* about the pitch pivot axis 118, inducing a rotation in a counter-clockwise direction referring to FIG. 15. The torque 740*a* also has the effect of decreasing the load supported by the leading idler wheel assembly 400*l*, and increasing the load supported by the support wheel assemblies 410*b*, 410*c* and the trailing idler wheel assembly 400*t*. The load applied to the leading idler wheel assembly 400*l* can be increased by actively extending the leading idler actuator assembly 310*l*. As such, the load applied to the endless track 600 by the leading idler wheel assembly 400*l* and the leading support wheel assembly 410*a* depends at least in part on the biasing force 701 applied by the tensioner assembly 420 and the actuation force exerted by the leading actuator assembly 310*l*.

To oppose the tension forces 704, equally opposed tension forces 720 are applied on the ground-engaging segment 620 of the endless track 600 proximate to the trailing idler wheel assembly 400*t*. Tension forces 722 also appear in the trailing segment 630 of the endless track 600 and oppose tension forces 724, 726 appearing in the endless track 600 adjacent to the sprocket wheel 550. In FIGS. 15 and 16, tension forces 702, 704, 720, 722, 724, 726 are equal in magnitude (when the track system 40 is static and without friction). A resultant force 730 (e.g. the combination of tension forces 720, 722) is applied to the trailing idler wheel assembly 400*t* and the resultant force 730 is applied at the axis 404*t*.

The trailing and ground engaging segments 630, 620 of the endless track 600 form an angle 700*b*. The resultant force 730 is colinear with a bisector 702*b* of the angle 700*b* in FIG. 15. The trailing wheel-bearing frame member 230*t* carries the resultant force 730 to the axis 224*t* along a line 750*b* extending between the axis 404*t* and the axis 224*t*, shown as a dashed line in FIGS. 15 and 16. In FIG. 15, the line 750*b* is colinear with the bisector 702*b*, but it could be otherwise in other embodiments as other configurations of the trailing wheel bearing frame member 230*t* are contemplated. Having the resultant force 730 passing through the axis 224*t* has the effect of preventing the generation of a torque that is applied to the trailing wheel-bearing member 230*t* about the axis 224*t*. The line 750*b* and the bisector 702*b* pass below the pitch pivot axis 118. As the resultant force 730 is applied along the bisector 702*b* in FIG. 15, the resultant force 730 passes below the pivot axis 118, and a torque 740*b* is applied to the trailing frame member 210*t* about the pivot axis 118. From the perspective of FIG. 15, the torque 740*b* has the effect of inducing a counter-clockwise rotation of the trailing frame member 210*t* about the pitch pivot axis 118. The torque 740*b* also has the effect of increasing the load supported by the support wheel assemblies 410*b*, 410*c* and the load supported by the trailing idler wheel assembly 400*t*. The torque 740*b* also has the effect of decreasing the load supported by the leading idler wheel assembly 400*l* and the leading support wheel assembly 410*a*.

In the present embodiment, the magnitude of the force 730 is equal to the resultant force 710, but the magnitude of the torque 740*b* is greater than that of the torque 740*a*. A net torque 760 is applied to the track system 40 in the same direction as torques 740*a*, 740*b*, in the counter-clockwise direction when referring to FIGS. 15 and 16. The damper 300 limits the pivotal motion of the leading and trailing frame members 210*l*, 210*t* about the pivot axis 118 and the net torque 760 has the effect of decreasing the load supported by the leading idler wheel assembly 400*l* and the support wheel assembly 410*a*.

When the track system 40 is driven, additional tension forces appear in the endless track 600 because of the tractive forces applied by the sprocket wheel 550 to the endless track 600. As such, the magnitude of tension forces 724, 722 and 720 increases. Simultaneously, the tensioner 420 is configured to increase its biasing force 701 and maintain adequate tension forces 702, 704 in the endless track 600. These additional tension forces make the magnitude of the resultant force 730 greater when the track system 40 is driven, and the magnitude of the resultant force 730 becomes greater than the magnitude of the resultant force 710.

When the track system 40 is driven, the load applied to the endless track 600 (and hence pressure applied to the ground surface) under the leading idler wheel assembly 400*l* and leading support wheel assembly 410*a* are decreased, and the pressures applied to the endless track 600 under the support wheel assemblies 410*b*, 410*c* and trailing idler wheel assembly 400*t* are increased. As a result, in some conditions, the track system 40 has a reduced tendency to pitch negatively, especially when driven on soft grounds. This tendency can be modulated by actively extending the leading idler actuator assembly 310*l*, if needed.

Moreover, under certain conditions, heat generation and wear of the outer surface 606 (FIG. 1) of the endless track 600 are reduced when comparing the track system 40 to conventional track systems attached to the same vehicle 60 for the following reasons. First, as there is a reduced load applied under the leading idler wheel assembly 400*l*, there is a reduced pressure applied to the endless track 600 as it engages the ground. The tread 608 has improved engagement with the ground before being parallel thereto and being subjected to tractive forces. Second, as the weight of the vehicle 60 increases, the surface area of the endless track 600 in contact with the ground increases due to the scissor-like structure of the track system 40. Thus, as mentioned above, the pressure on the ground increases at a rate that is less than the rate of increase in weight of the vehicle 60.

Referring to FIG. 16 where the leading and trailing idler actuators 310*l*, 310*t* are retracted, the same lines, forces and torques as described in reference to FIG. 15 are reproduced. The leading idler actuator assembly 310*l* limits the pivotal motion between the leading wheel bearing frame member 230*l* and the leading frame member 210*l*. The leading wheel-bearing frame member 230*l* carries the force 710 along the line 750*a*, which is not colinear with the bisector 702*a*. As the line 750*a* passes through the axis 224*l* and the pitch pivot axis 118, the force 710 has the effect of inducing no torque 740*a* to the leading frame member 210*l* about the pivot axis 118.

The trailing idler actuator assembly 310*t* limits the pivotal motion between the trailing wheel bearing frame member 230*t* and the trailing frame member 210*t*. The trailing wheel-bearing frame member 230*t* carries the force 730 along the line 750*b*, which is not colinear with the bisector 702*b*. The line 750*b* passes through the axis 224*t* and below the pitch pivot axis 118, and is further below the pitch pivot axis 118 than the line 750*b* found in the configuration of FIG. 15. From the perspective of FIG. 16, the torque 740*b* has the effect of inducing a counter-clockwise rotation of the trailing frame member 210*t* about the pitch pivot axis 118. The magnitude of the torque 740*b* in the configuration of FIG. 16 is greater than in the configuration of FIG. 15. The torque 740*b* also has the effect of increasing the load supported by the support wheel assemblies 410*b*, 410*c* and the load supported by the trailing idler wheel assembly 400*t* while decreasing the load supported by the support wheel assembly 410*a* and the leading idler wheel assembly 400*l*.

Thus, referring to the configuration shown FIG. 16, the net torque 760 has the effect of reducing the tendency of the track system 40 to pitch negatively, and combined with having the leading ground engaging segment 6221 extending above the ground engaging segment 620, the track system 40 has a configuration that makes it more capable of driving itself out of a ditch, a pothole or to overcome an obstacle, especially when travelling on a soft ground surface.

In summary, the leading and trailing idler actuators 310*l*, 310*t* can be selectively actuated depending on the ground conditions, whether it is to drive the track system 40 out of a ditch, a pothole or to overcome an obstacle, or to distribute more evenly the load on the endless track 600 when travelling on ground which is sensitive to soil compaction issues.

In addition to the reduced tendency of the track system 40 to pitch negatively, when the track system 40 encounters an obstacle such as a bump or a depression along its path of travel, the pivoting of the leading and trailing wheel-bearing members 230*l*, 230*t*, and of the leading and trailing frame members 210*l*, 210*t* has the effect of reducing vertical displacements and vertical acceleration of the pivot 116. Accordingly, vertical displacements and vertical accelerations of the chassis 62 of the vehicle 60 are reduced. Notably, at certain speed regimes, the pivoting of the leading and trailing wheel-bearing members 230*l*, 230*t* alone is sufficient to reduce the vertical displacements of the pivot 116. At other speed regimes, it is the combined action of the pivoting of the leading and trailing wheel-bearing members 230*l*, 230*t* and of the leading and trailing frame members 210*l*, 210*t*, and the damping action of the damper 300 that reduce the vertical displacements and vertical accelerations of the pivot 116.

Track System Controller and Monitoring Sensors

Figure 17A:
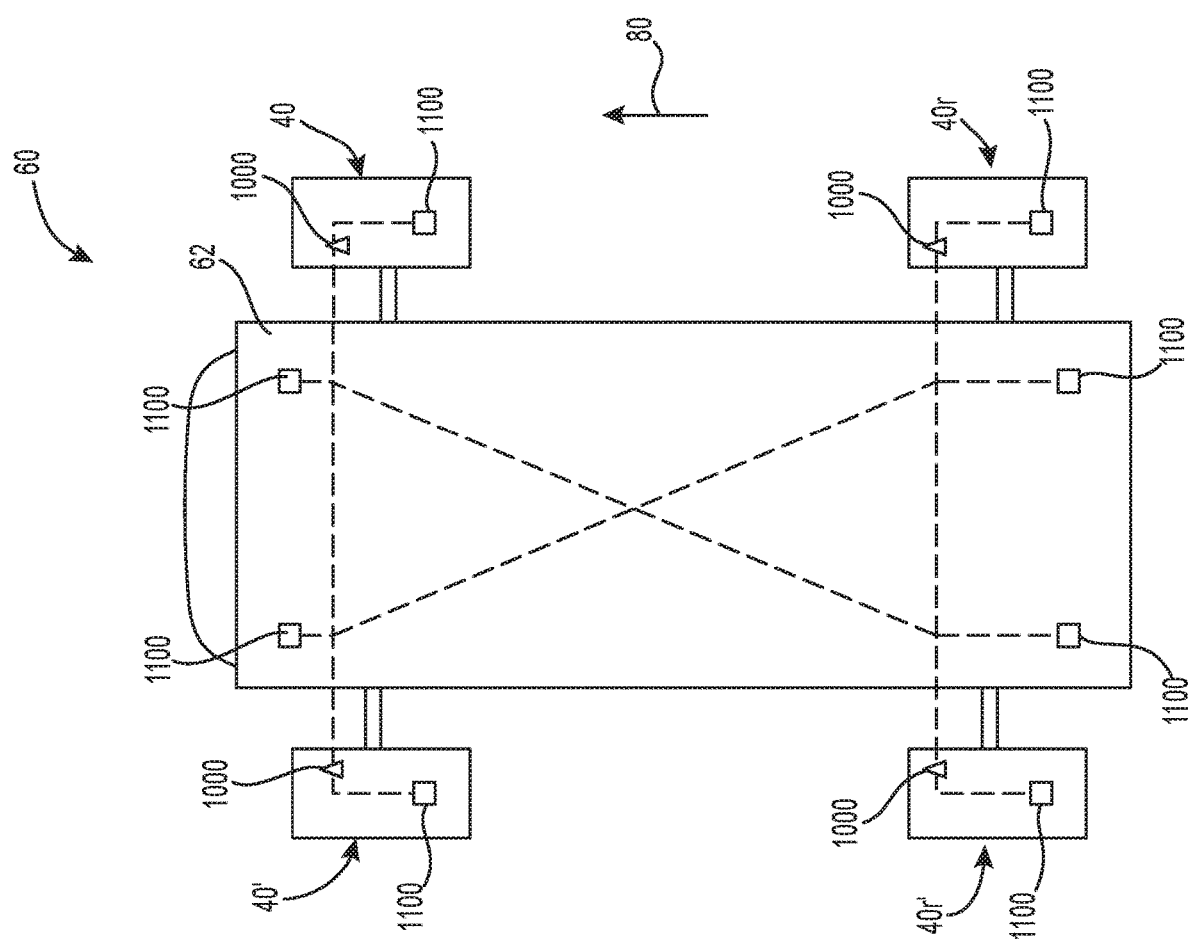
FIG. 17A is a top plan, schematic view of the vehicle of FIG. 2 with track systems operatively connected thereto at each of the four corners.
Figure 17B:
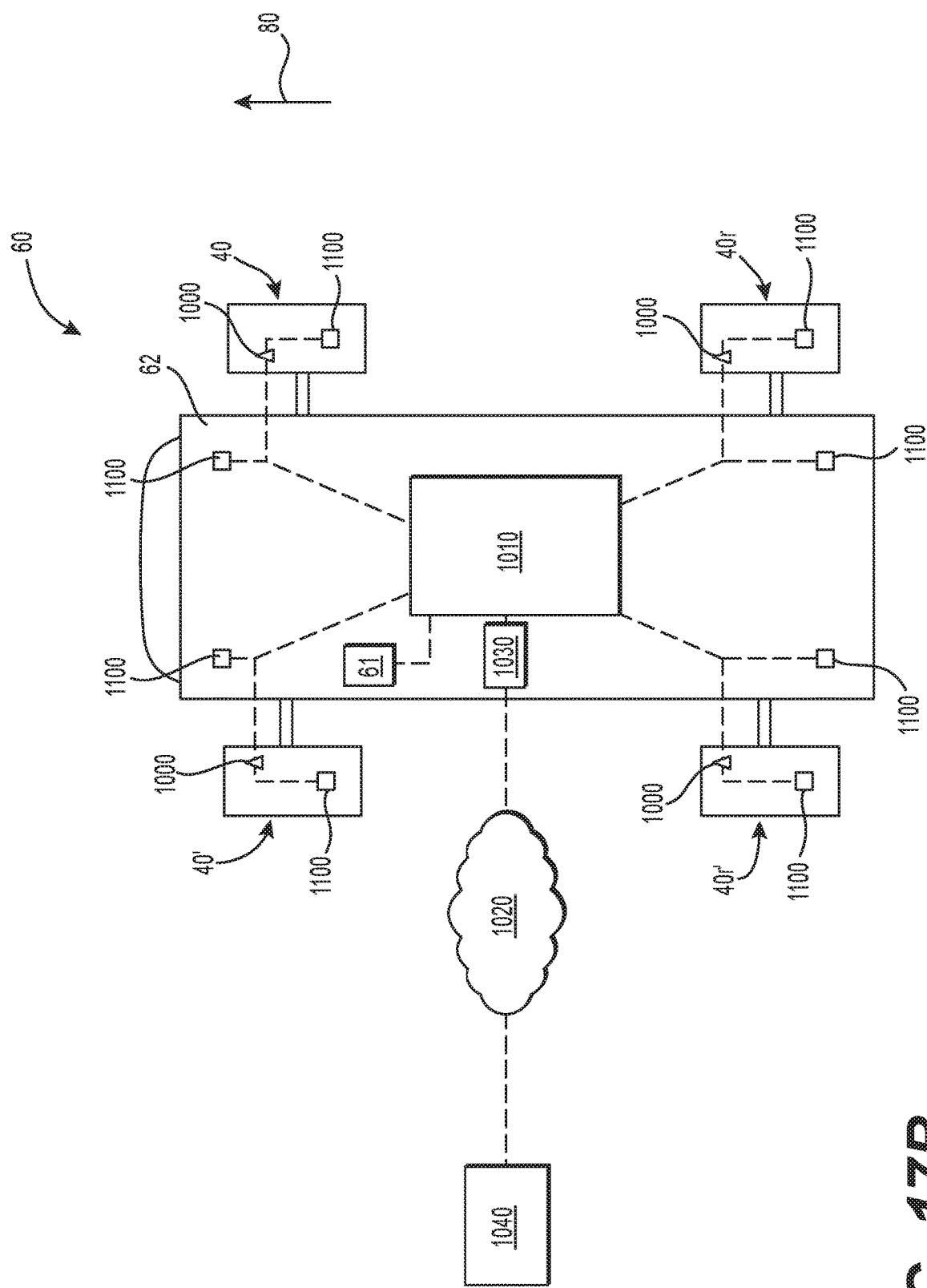
FIG. 17B is a top plan, schematic view of the vehicle of FIG. 17A further including a master control unit and a communication device.
Figure 17C:
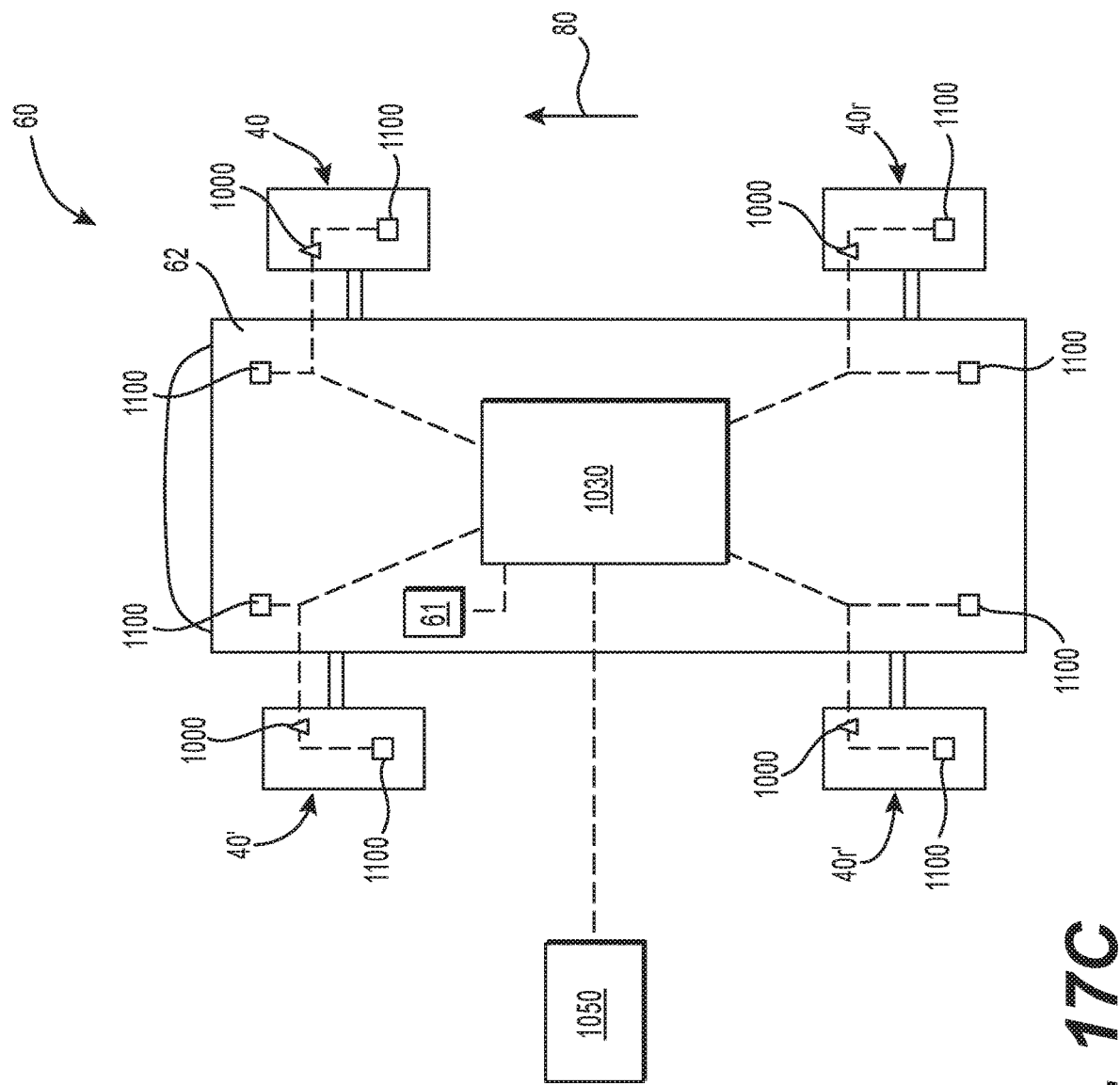
FIG. 17C is a top plan, schematic view of the vehicle of FIG. 17A, further including a communication device and a remote master control unit.

Referring to FIGS. 17A to 17C, the vehicle 60 is schematically represented with a track system 40, according to one embodiment of the present technology, operatively connected at each corner of the vehicle 60. The forward travel direction 80 of the vehicle 60 is also indicated. The track system 40 is operatively connected to the vehicle 60 at the front right corner, the track system 40' is operatively connected to the vehicle 60 at the front left corner, a track system 40*r* is operatively connected to the vehicle 60 at the rear right corner, and a track system 40*r*' is operatively connected to the vehicle 60 at the rear left corner. A track system controller 1000, schematically represented by a triangle in FIGS. 17A to 17C, is operatively connected to each track system 40, 40', 40*r*, 40*r*' and controls the operation of the actuator assemblies 140, 150*l*, 150*t*, 310*l*, 310*t*, 420 for each track system 40, 40', 40*r* and 40*r*'. Each track system controller 1000 is powered by the electrical system of the vehicle 60, and each of the actuator assemblies 140, 150*l*, 150*t*, 310*l*, 310*t*, 420 for each track system 40, 40', 40*r* and 40*r*' is operatively connected to a power source. Each track system controller 1000 includes a non-transient memory and a processing unit communicatively coupled to the non-transient memory and capable of receiving and sending signals. As such, the track system controller 1000 is programmable and capable of running predetermined sequences and actions so as to control the operation of the actuator assemblies 140, 150*l*, 150*t*, 310*l*, 310*t*, 420 automatically as described herein or using manual override. The dashed lines in FIG. 17A indicate that the track system controllers 1000 are operatively interconnected to one another.

As will be described below, each track system controller 1000 controls the operation of the actuator assemblies 140, 150*l*, 150*t*, 310*l*, 310*t*, 420 of its corresponding track system 40, 40', 40*r*, 40*r*' depending on various input signals received from the operator of the vehicle 60 and/or from a plurality of monitoring sensors 1100, schematically represented in FIGS. 17A to 17C as squares. As such, each track system controller 1000 is programmable and capable of running predetermined sequences and actions so as to control the operation of the actuator assemblies 140, 150*l*, 150*t*, 310*l*, 310*t*, 420 its corresponding track system 40, 40', 40*r*, 40*r*' automatically or using manual override in accordance with a predetermined objective.

In the present embodiment, the monitoring sensors 1100 are mounted at various locations on the vehicle 60 and on each one of the track systems 40, 40', 40*r*, 40*r*'. As will be described below, the monitoring sensors 1100 are used for determining at least indirectly a state of each one of the track systems 40, 40', 40*r*, 40*r*' and/or a condition of the ground surface on which the vehicle 60 travels. It is to be understood that the monitoring sensors 1100 can be embedded within, affixed, mounted or connected to any of the suitable components of the vehicle 60 and track systems 40, 40', 40*r*, 40*r*'. The monitoring sensors 1100 may be operatively connected to the track system controllers 1000 via wire or via a wireless connection. The operative connection between the monitoring sensors 1100 and the track system controllers 1000 is shown by the dashed lines in FIGS. 17A to 17C.

In some embodiments, the monitoring sensors 1100 include temperature sensors capable of determining the temperature of different components of the track systems 40, 40', 40*r*, 40*r*'. For example, temperature sensors can be embedded within or disposed proximate the endless tracks 600, the idler and support wheel assemblies 400*l*, 400*t*, 410*a*, 410*b*, 410*c* and/or the actuator assemblies 140, 150*l*, 150*t*, 310*l*, 310*t*, 420 for accurate temperature measurement of certain portions of each component. The temperature sensors could be thermal radiation thermometers, thermocouples, thermistors, or any other suitable type of sensing device capable of sensing temperature. In an embodiment where the temperature sensors are embedded in the endless tracks 600, they are disposed to determine the temperature at various locations on the endless track 600, for example on the inward and/or outward portions of the endless track 600, near or on the inner surface 602, near or on the drive lugs 604 and/or near or on the outer surface 606 of the endless track 600. The collected temperature data is sent as signals to the corresponding track system controller 1000. After processing the temperature data, the track system controller 1000 determines a corresponding output signal related to the actuation of any one of the actuator assemblies 140, 150*l*, 150*r*, 310*l*, 310*t*, 420 based on the signals received from the temperature sensors. In addition, the track system controller 1000 is operable to identify which temperature sensor sends a given signal based on a unique identifier associated with each temperature sensor.

For example, in order to reduce risks of damaging the endless tracks 600 due to excessive heat generation as the endless tracks 600 are driven, the track system controller 1000 of the track system 40 operates each one of the actuator assemblies 140, 150*l*, 150*t*, 310*l*, 310*t*, 420, alone or in combination, to correct the positioning of the frame assembly 200 and the idler and support wheel assemblies 400*l*, 400*t*, 410*a*, 410*b*, 410*c* relative to the chassis 62 and/or the ground surface. In an illustrative scenario, the temperature sensors determine that the inward portions of the endless track 600 have temperature readings that are higher than the temperature readings of the outward portions of the endless track 600, and that the difference in temperature readings is above a predetermined threshold. Based on the signals received from the temperature sensors, the system controller 1000 sends a signal to extend or retract the actuator 140 so as to adjust the camber angle θ of the track system 40 in order to more evenly distribute the load across the ground engaging segment 620 of the endless track 600. A more even load distribution across the ground engaging segment 620 may not only assist in reducing undesirable heat generation in certain portions of the endless tracks 600, but may also reduce soil compaction when driving on soft ground surface. As such, the track system 40 is capable of dynamically adjusting the camber angle θ based on data collected by the monitoring sensors 1100 and processed by the track system controller 1000.

In another illustrative scenario, the inward portions of the endless track 600 of the track system 40 have temperature readings that are higher than the temperature readings of the outward portions of the endless track 600, and that the difference in temperature readings is above a predetermined threshold. Based on the signals received from the temperature sensors, the system controller 1000 of the track system 40 sends a signal to extend or retract the actuators 150*l*, 150*t* so as to adjust the toe-in/toe-out angle γ of the track system 40. Proper alignment of the endless track 600 relative to the chassis 62 of the vehicle 60 may also assist in reducing undesirable heat generation and premature wear in certain portions of the endless track 600. As such, the track system 40 is also capable of dynamically adjusting the toe-in/toe-out angle γ based on data collected by the monitoring sensors 1100 and processed by the track system controller 1000.

In other embodiments, the monitoring sensors 1100 also include, in addition or in replacement of the temperature sensors, load cells (e.g. load transducers). The load cells can be piezoelectric load cells, hydraulic load cells, pneumatic load cells, or any other suitable type of cells capable of sensing a load applied thereto. In some embodiments, the load cells are provided at various locations on the vehicle 60 (as represented in FIGS. 17A to 17C), such as under the tank, container or cargo area, in order to monitor a payload of the vehicle 60 and to determine the location of the centre of gravity of the vehicle 60. In one scenario where the vehicle 60 travels on a laterally inclined ground surface, the track system controllers 1000 collectively determine the location of the centre of gravity of the vehicle 60 using data received from the load cells located on the vehicle 60. The track system controllers 1000 are then capable of sending signals to one another to extend or retract their corresponding actuator 140 so as to adjust the camber angle θ of their corresponding track systems 40, 40', 40*r*, 40*r*' in order to more evenly distribute the load across the ground engaging segment 620 of each of the endless tracks 600. This is another example of the track system 40 being capable of dynamically adjusting the camber angle θ based on data collected by the monitoring sensors 1100 and processed by one or more of the track system controllers 1000.

In some embodiments, additional load cells are disposed in various components of each track system 40, 40', 40*r*, 40*r*'. For example, in embodiments where load cells are embedded within the endless track 600 in the inward and outward portions thereof, the load data of each load cell is sent as signals to the corresponding track system controller 1000. In situations where the inward portion of the endless track 600 have load readings that are higher than the load readings of the outward portions of the endless track 600, and that the difference in load readings is above a predetermined threshold, the system controller 1000 sends a signal to extend or retract the actuator 140 so as to adjust the camber angle θ of the corresponding track system 40, 40', 40*r*, 40*r*' in order to more evenly distribute the load across the ground engaging segment 620. This way, soil compaction issues could be reduced compared to conventional track systems as the track system controllers 1000 dynamically adjust the position of the track systems 40, 40', 40*r*, 40*r*' relative to the chassis 62 of the vehicle 60 (i.e. adjusting the camber angle θ and/or the toe-in/toe-out angle γ) so as to more evenly distribute the load born by each track system across the ground engaging segment 620 of its respective endless track 600.

In other embodiments where each damper 300 is also operatively connected to its corresponding track system controller 1000, the load readings sent as signals by the load sensors located on the vehicle 60 to the track system controller 1000 also enable to dynamically adjust certain properties of the damper 300, such as the damping ratio, as a function of the load of the vehicle 60. As such, certain properties of the damper 300 of each track system 40, 40', 40*r*, 40*r*' are dynamically modified depending on the load readings.

In yet other embodiments, the monitoring sensors 1100 also include strain gauges. The strain gauges could be located, for example, at the pivot joints connecting the actuator assemblies 140, 150*l*, 150*t*, 310*l*, 310*t*, 420 to the frame assembly 200, or at the pivot joints of the frame assembly 200. In an illustrative scenario, a strain gauge is located at the pivot axis 224*l* of the track system 40, the track system 40 is initially in the configuration shown in FIG. 1, travels in the forward travel direction 80 and starts sinking down in a recess composed of soft soil. When a driving torque is applied to the sprocket wheel 550, the strain gauge has a reading that is above a certain threshold and sends a signal to the track system controller 1000. The track system controller 1000 also receives a signal from the vehicle 60 that a driving torque is applied to the drive shaft 64 for turning the sprocket wheel 550 and that the speed of the vehicle 60 does not increase. The track system controller 1000 sends a signal to retract the actuator assemblies 310*l*, 310*t* so as to change the configuration of the track system 40 from the one shown in FIG. 1 to the one shown for example in FIGS. 10A and 16. As described above, the configuration shown in FIGS. 10A and 16 benefits from an increased torque 760 and the track system 40 has a reduced tendency to pitch negatively, which can assist the track system 40 to drive itself out of the recess where it might be otherwise bogged down should the track system 40 have remained in the configuration shown in FIG. 1.

In some embodiments, the monitoring sensors 1100 include accelerometers. The accelerometers could be located, for example, on the attachment assembly 100 of each track system 40, 40', 40*r*, 40*r*'. In such an embodiment, the accelerometers detect the vibrations that have not been dampened or not dampened to a sufficient amount by the track systems 40, 40', 40*r*, 40*r*'. The accelerometers measure the vertical acceleration to which the attachment assembly 100 is subjected and send this data as signals to the corresponding track system controller 1000. Upon reception of the vertical acceleration signals, the track system controller 1000 processes this data and sends a signal to a cabin-mounted suspension assembly 1200 schematically represented in FIG. 18. The cabin-mounted suspension assembly 1200 is capable of moving the seat and/or the entire cabin that the operator occupies to subject it to vertical accelerations that have frequencies and amplitudes adapted to cancel out or reduce the vertical accelerations that the track systems 40, 40', 40*r*, 40*r*' experience and that are conducted to the cabin. As a result of the cooperation between the track systems 40, 40', 40*r*, 40*r*' and the cabin-mounted suspension assembly 1200, an operator located in the cabin receives less vibrations from the track systems 40, 40', 40*r*, 40*r* and would therefore feel more comfortable than if the vehicle 60 was equipped with conventional track systems.

In yet other embodiments, the accelerometers are capable of detecting vibrations in the proximity of various components of the track systems 40, 40', 40r, 40r'. Signals generated by the accelerometers are sent to the track system controller 1000 which determines over time the usage and wear of the components of the track systems 40, 40', 40r, 40r'. This may be useful to obtain general information related to the condition of various components of the track systems 40, 40', 40r, 40r', perform an analysis of the frequencies of the acceleration data and/or perform at the right time predictive maintenance operations to reduce risks of component failures. For example, the acceleration and vibration data related to bearings, pivot pins, seals and the gearbox 500 could be analyzed in real time and/or populate a database that could be analyzed to determine early signs of excessive wear or failure of components of the track systems 40, 40', 40r, 40r'.

In some embodiments, the monitoring sensors 1100 include inclinometers. The inclinometers could be located, for example, on the components of the frame assembly 200 and could be configured to send signals to the track system controller 1000 indicative of the camber angle θ of the axle assemblies connecting the idler and support wheel assemblies 400l, 400t, 410a, 410b, 410c to the frame assembly 200 relative to the plane 190 (FIGS. 5 and 6). Similar to what has been described above, the signals generated by the inclinometers are provided to the track system controller 1000 which operates the actuator assembly 140 to adjust the positioning of the frame assembly 200 and the idler and support wheel assemblies 400l, 400t, 410a, 410b, 410c relative to the chassis 62 and/or the ground surface in accordance with a predetermined objective. In some embodiments, the signals provided by the inclinometers could be used by the track system controller 1000 to assess and calibrate the operation of the actuator assembly 140 and/or to assess the wear of the tread 606 of the endless track 600.

In some embodiments, the monitoring sensors 1100 include fluid property sensors. The fluid property sensors could be located, for example, within the axle assemblies connecting the idler and support wheel assemblies 400l, 400t, 410a, 410b, 410c to the frame assembly 200. The fluid property sensors assess various properties and characteristics of the fluid contained within axle assemblies, such as viscosity, density, dielectric constant, temperature, presence of water, presence of suspended contaminants and wear debris. The data collected from the fluid property sensors could assist the track system controller 1000 to determine the condition and wear of some of the components of the track systems 40, 40', 40r, 40r'.

In some embodiments, the monitoring sensors 1100 could include actuator assembly position sensors. The actuator assembly position sensors could include linear displacement transducers connected to one or more of the actuator assemblies 140, 150l, 150t, 310l, 310t, 420 that could send signals to the track system controller 1000 indicative of the position and/or length of the corresponding actuator assembly 140, 150l, 150t, 310l, 310t, 420. Using the signals provided by the linear displacement transducers, the track system controller 1000 could assess the status of extension/retraction of the actuator assemblies 140, 150l, 150t, 310l, 310t, 420 and assist in determining how to operate them. The actuator assembly position sensors could also include inclinometers connected to, for example, the leading and trailing idler actuator assemblies 310l, 310t. Using references and baselines, the inclinometers could send signals to the track system controller 1000 indicative of the position and/or length of the corresponding actuator assembly 310l, 310t. These signals could also assist the track system controller 1000 to assess the status of extension/retraction of the actuator assemblies 310l, 310t and assist in determining how to operate them.

In some embodiments, the monitoring sensors 1100 include position sensors capable of assessing a geographical location of each one of the track systems 40, 40', 40r, 40r'. The assessment of the geographical location may be useful for the track system controllers 1000 which could record data related to, for example, strain at pivot joints and vertical acceleration to which the track systems 40, 40', 40r, 40r' are subjected in conjunction with the geographical location. External sources of information could also be stored in the memory of the track system controllers 1000, such as detailed road plans, topography data and agricultural field terrain data. As such, in some embodiments, the track system controller 1000 learns optimal configurations of each of the track systems 40, 40', 40r, 40r' for each particular geographic location of the vehicle. In some embodiments, the track system controller 1000 is configured to prime and/or configure in real-time the actuator assemblies 140, 150l, 150t, 310l, 310t, 420 so that each of the track systems 40, 40', 40r, 40r' has the more appropriate configuration for the ground surface on which it travels. In some embodiments, the track system controller 1000 is configured to prime the track systems 40, 40', 40r, 40r' for each given geographical location by adjusting one or more of the actuator assemblies 140, 150l, 150t, 310l, 310t, 420 thereof just before the track systems 40, 40', 40r, 40r' reach each given geographical location. In some cases, and for some types of terrain, this allows the track system controller 1000 to distribute the vehicle's weight relatively more evenly across the track systems 40, 40', 40r, 40r' and/or more evenly into the terrain across each ground engaging segment 620 of each of the endless tracks 600 of each of the track systems 40, 40', 40r, 40r'. In some cases, and for some types of terrain, this allows reducing soil compaction. In other words, in embodiments where the monitoring sensors 1100 include position sensors, the track systems 40, 40', 40r, 40r' become location-aware devices and they are capable of adapting their configuration accordingly. In some embodiments, the monitoring sensors 1100 do not include position sensors and the tack system controller 1000 receives the geographical location of the vehicle 60 that is provided by a position sensor (such as a GPS device) of the vehicle 60.

For example, in a situation where the track system controller 1000 determines that the geographical location of the track system 40 corresponds to a paved road, the track system controller 1000 sends a signal to retract the actuator assemblies 310l, 310t so that the track system 40 be configured as illustrated in FIG. 10A, for example. In another situation where the track system controller 1000 determines that the geographical location of the track system 40 corresponds to an agricultural field having soil sensitive to ground compaction, the track system controller 1000 sends a signal to extend the actuator assemblies 310l, 310t so as to distribute the load born by then track system 40 over a greater ground engaging segment 620.

Moreover, as each of the track systems 40, 40', 40r, 40r can have its geographical location monitored by the position sensors, the track system controllers 1000 of the front-mounted track systems 40, 40' are capable of communicating with the track system controllers 1000 of the rear-mounted track systems 40r, 40r' so that they adjust their configuration based on the data collected by the monitoring sensors 1100 of the front-mounted track systems 40, 40'. In an illustrative scenario, the vehicle 60 travels in a straight line, the track systems 40, 40r are initially in the configuration shown in FIG. 1 and the track system 40 is driven into a pothole. The geographical location of that pothole is recorded by the track system controller 1000 of the track system 40 and sent to the track system controller 1000 of the track system 40r. The leading and trailing idler actuators 310l, 310t of the track system 40 are retracted as shown in FIG. 10B so that the track system 40 is configured to drive itself out of the pothole, as described above. As the vehicle 60 travels forward, the track system controller 1000 of the track system 40r monitors the geographical location thereof and before the track system 40r is driven in the same pothole, the track system controller 1000 of the track system 40r sends a signal to retract the leading and trailing idler actuators 310l, 310t of the track system 40r as shown in FIG. 10B. Thus, when the track system 40r is driven into the pothole, the track system 40r is already configured so that driving out of that same pothole is facilitated.

In some embodiments, the track system controller 1000 is configured to adjust the configuration of each of the track systems 40, 40', 40r, 40r based on the data collected by the monitoring sensors 1100 in time for the track systems 40, 40', 40r, 40r arriving at particular terrain conditions, such that the configuration of each of the track systems 40, 40', 40r, 40r is optimized for the particular terrain conditions. In an illustrative scenario, the vehicle 60 at one point in time was travelling at a given speed and a given direction monitored by the track system controller 1000 and traveled over a pothole with the front right track system 40. At that time, the track system controller 1000 had detected the existence and the geographic location of the pothole, and stored this data in its memory. The next time when the vehicle 60 travels proximate the geographic location of the pothole, the track system controller 1000 may determine that the vehicle 60 will drive over the pothole again, but this time with its front left track system 40'. In such a case, the track system controller 1000 may determine a particular time associated with the impending driving over the pothole by the front left track system 40' using the geographic location of the front left track system 40' derived as described above, and the speed and direction of the vehicle 60. The track system controller 1000 may then retract the leading idler actuator 310l of the front left track system 40' just before the front left track system 40' reaches the pothole, and may thereby reduce the impact that the front left track system 40' will experience upon entering the pothole. In some embodiments, the track system controller 1000 may also retract the trailing idler actuator 310t of the front left track system 40'. In some cases this may assist the front left track system 40' in driving out of the pothole.

Once the front left track system 40' exits the pothole, the track system controller 1000 may extend the leading idler actuator 310l and/or the trailing idler actuator 310t of the front left track system 40' to the "pre-pothole" position(s). In some embodiments, the track system controller 1000 is further configured to adjust the leading idler actuator 310l and/or the trailing idler actuator 310t while a given one of the track systems 40, 40', 40r, 40r' is engaged with a pothole or other obstacle in order to improve traction.

In some embodiments, the monitoring sensors 1100 also include ground surface sensors. The ground surface sensors can include devices such as sonars, hygrometers, penetrometers, ultrasonic, microwave-based, radar and lidar devices capable of generating an accurate representation of the ground on which the vehicle 60 travels or is about to travel. The sonars, hygrometers and penetrometers could provide data related to, for example, composition of the soil, moisture content, air content, etc., and the ultrasonic, microwave-based, radar and lidar devices could provide an accurate representation of the ground surface profile and potential hazards. The data of the ground surface sensors is sent as signals to the track system controllers 1000 which then determine the more appropriate configuration of the track systems 40, 40', 40r, 40r' based on the assessed representation of the ground surface. For example, in a situation where the ground surface sensors and the track system controllers 1000 determine that the ground surface is relatively hard and bumpy, the track system controllers 1000 send signals to retract the actuator assemblies 310l, 310t to configure the track systems 40, 40', 40r, 40r' in the configuration shown in FIG. 10A. In another situation where the ground surface sensors and the track system controllers 1000 determine that the ground surface is relatively moist and soft and composed of loosely packed particles, the track system controllers 1000 send signals to extend the actuator assemblies 310l, 310t to configure the track systems 40, 40', 40r, 40r in the configuration shown in FIG. 1.

Based on the above description, it is understood that in certain embodiments the monitoring sensors 1100 could include all of the above-described sensors, and that in other embodiments, only a subset of the above-described sensors would be included. The monitoring sensors 1100 could thus enable the track systems 40, 40', 40r, 40r' to anticipate the properties of the ground surface on which they are about to travel and/or anticipate obstacles to overcome, and permit the modification of the configuration of the track systems 40, 40', 40r, 40r' accordingly.

As described above, the monitoring sensors 1100 are thus capable of determining a state of the track system 40 and/or a ground surface condition of the ground on which the track system 40 travels. Determining a state of the track system 40 includes, and is not limited to, (i) determining the temperature of different components and/or portions of the track system 40, (ii) determining the load supported by different components and/or portions of the track system 40, (iii) determining the strain undergone by different components and/or portions of the track system 40, (iv) determining the vibration undergone by different components and/or portions of the track system 40, (v) determining wear of different components and/or portions of the track system 40, (vi) determining the inclination of different components and/or portions of the track system 40, (vii) determining the status of extension/retraction of the actuator assemblies 140, 150l, 150t, 310l, 310t, 420, and (viii) determining the location of different components and/or portions of the track system 40. Determining a ground surface condition of the ground on which the track system 40 travels includes, and is not limited to, (i) determining whether the ground surface is a paved road or an agricultural field having soil sensitive to ground compaction, (ii) determining the hazards and the profile of the ground surface, and (iii) determining at least one of a composition, a moisture content, and an air content of the soil.

In summary and as described in more details above, the track system controllers 1000 and the monitoring sensors 1100 could assist in, among other things, (i) planning predictive maintenance operations, (ii) recording relevant data related to the properties of the ground surface on which the track systems 40, 40', 40r, 40r' travel (for mapping purposes for example), (iii) maintaining an appropriate tension in the endless tracks 600 depending on the properties of the ground surface, (iv) increase the comfort of the operator of the vehicle 60 should the vehicle 60 be equipped with a cabin mounted suspension assembly 1200 operatively connected to one or more track systems 40, 40', 40r, 40r', (v) reducing soil compaction issues on sensitive ground surfaces, and (vi) improving traction of the endless track 600 of each of the track systems 40, 40', 40r, 40r'.

Referring to FIG. 17B, a master control unit 1010 is provided on the vehicle 60 and operatively connected to control systems 61 of the vehicle 60. The track system controllers 1000 of the track systems 40, 40', 40r, 40r' and at least some of the monitoring sensors 1100 are operatively connected to the master control unit 1010. The master control unit 1010 includes a processing unit, a memory, is programmable and is configured to send and receive signals from/to the track system controllers 1000 and the vehicle 60. As the master control unit 1010 is simultaneously operatively connected to the track system controllers 1000 and to the vehicle 60, data provided by the control systems 61 of the vehicle 60 is taken into account by the master control unit 1010 and supplemented to the signals received from the monitoring sensors 1100 so as to have a more complete representation of the status of the vehicle 60 and track systems 40, 40', 40r, 40r'.

In certain situations, the master control unit 1010 can override the track control systems 1000 in controlling the operation of the actuator assemblies 140, 150l, 150t, 310l, 310t, 420 in accordance with a predetermined objective. In some circumstances, the master control unit 1010 is connected to a remote network 1020 via a communication device 1030, and data provided by the track system controllers 1000 and/or the control systems 61 of the vehicle 60 are collected by the master control unit 1010, uploaded to the remote network 1020 by the communication device 1030 and processed by a remote processing unit 1040 using, in some instances, supplemental data related to, for example, weather records, soil condition, etc. Processed data and/or control signals for the track system controllers 1000 obtained from the remote processing unit 1040 are downloaded to the master control unit 1010 via the remote network 1020 and communication device 1030 so that the master control unit 1010 controls the track system controllers 1000 according to this processed data and/or control signals.

Referring to FIG. 17C, the communication device 1030 is provided on the vehicle 60 and is operatively connected to the control systems 61 of the vehicle 60, to at least some of the monitoring sensors 1100 and to the track system controllers 1000 of the track systems 40, 40', 40r, 40r'. The communication device 1030 is in operative communication with a remote master control unit 1050 which is at a remote location of the vehicle 60. As such, in this embodiment, the master control unit 1050 is not onboard the vehicle 60 and thus, the processing of the data is performed remotely. Processed data and/or control signals for the track system controllers 1000 obtained from the master control unit 1050 are communicated to the communication device 1030 so that the track system controllers 1000 is operated according to this processed data and/or control signals.

Monitoring Sensors Connected to Components of the Track System

Referring now to FIGS. 19 to 23, there will be described in more details some embodiments of the track system 40 having at least some of the monitoring sensors 1100 connected to components of the track system 40. For illustrative purposes and referring to FIGS. 19 to 21, several monitoring sensors 1100 are operatively connected to the leading wheel-bearing frame member 230l. As will be discussed below, other components of the track system 40 could have monitoring sensors 1100 operatively connected thereto.

The monitoring sensors 1100 may be installed during manufacture of the leading wheel-bearing frame member 230l, and may be installed in such a way as to impede or prevent removal. The monitoring sensors 1100 may also be installed after manufacture of the leading wheel-bearing frame member 230l and/or in such a way that permits their removal, servicing and replacement.

Figure 19:
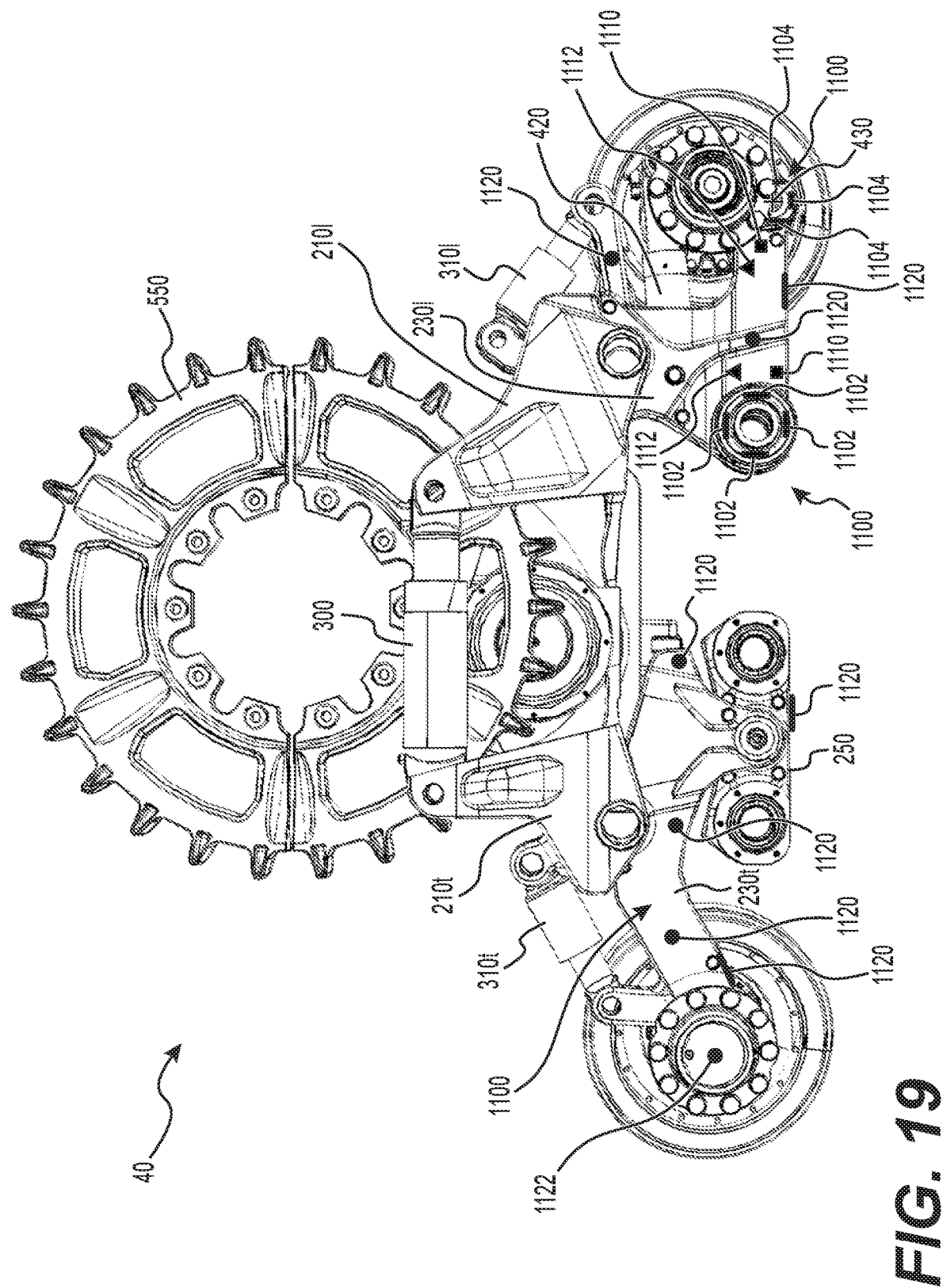
FIG. 19 is a right side elevation view of the track system of FIG. 1, with the endless track and one idler wheel of the leading and trailing idler wheel assemblies and the support wheel assemblies removed, and further including a plurality of monitoring sensors connected to several components of the track system.
Figure 20:
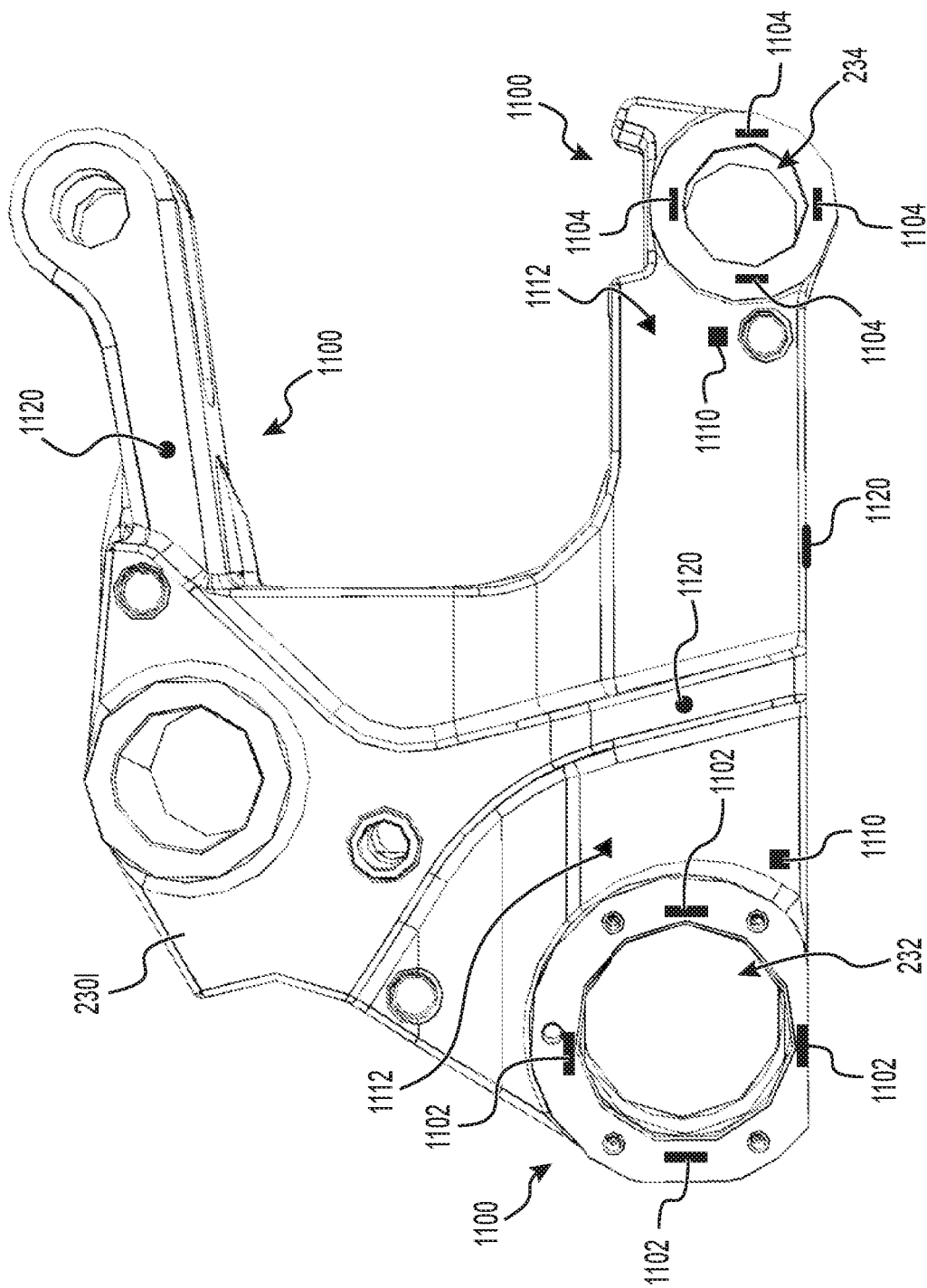
FIG. 20 is a right side elevation view of the leading wheel-bearing frame member of the track system of FIG. 19.
Figure 21:
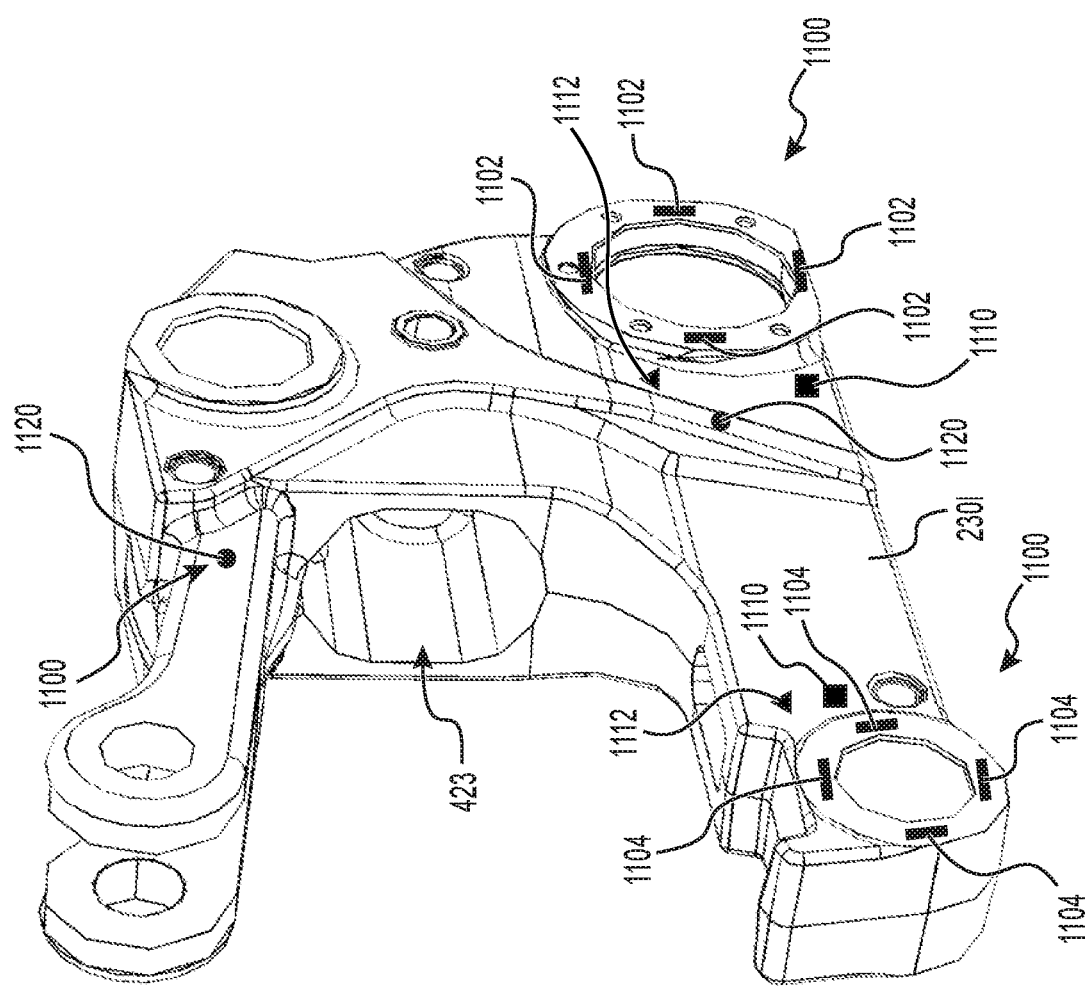
FIG. 21 is a perspective view taken from a front, top left side of the leading wheel-bearing frame member of FIG. 20.

In the embodiment shown in FIGS. 19 to 21, one of the monitoring sensors 1100 is composed of an array of sensors 1102 located proximate to an aperture 232 defined in the leading wheel-bearing frame member 230l for receiving the axle assembly supporting the support wheel assembly 410a. In the present embodiment, the array of sensors 1102 is composed of four strain gauges (schematically represented as solid rectangles in the accompanying Figures). It is contemplated that more or less sensors (i.e. strain gauges) 1102 could be used in different embodiments. The strain gauges 1102 are affixed to the leading wheel-bearing frame member 230l such that as it deforms, the strain gauges 1102 are also deformed causing them to emit a signal to any one of the track system controller 1000, the master control unit 1010 and the remote master control unit 1050 indicative of a strain parameter. The strain parameter may be representative of an instantaneous strain response, an average strain response over a period of time, a peak strain response or any other suitable strain-related data. As seen in FIGS. 20 and 21, the strain gauges 1102 are affixed to the leading wheel-bearing frame member 230l on both the outward face (seen in FIG. 20) and the inward face (seen in FIG. 21) thereof.

In the present embodiment, the positioning and configuration of the strain gauges 1102 is selected such that loads transferred from the leading wheel-bearing frame member 230l to the support wheel assembly 410a, and opposed by the endless track 600 and the ground surface, induce strain responses in the leading wheel-bearing frame member 230l that are recorded by the strain gauges. As the geometrical configuration and the materials properties of the leading wheel-bearing frame member 230l are known, a load parameter acting on the support wheel assembly 410a, and thus on the portion of the endless track 600 on which it rotates, can be estimated from the strain parameter recorded by the strain gauges 1102. The load parameter may be representative of an instantaneous load, an average load supported over a period of time, a peak load or any other suitable load-related data.

In some embodiments, the estimation of the load parameter is performed in conjunction with data from finite element analysis of the leading wheel-bearing frame member 230L The data is stored in the memory of any one of the track system controller 1000, the master control unit 1010 and the remote master control unit 1050 described above. The data also takes also takes into account the position and configuration of the strain gauges 1102. As a result, the estimation of the load parameter acting on the support wheel assembly 410a has improved accuracy and provides the track system controller 1000, the master control unit 1010 and/or the remote master control unit 1050 with a more accurate representation of the load parameter supported by the support wheel assembly 410a. In addition, since the strain gauges 1102 are installed on the inward and outward faces of the leading wheel-bearing frame member 230l, the signals indicative of the strain parameters along the inward and outward faces can be used by the track system controller 1000, the master control unit 1010 and/or the remote master control unit 1050 to determine the load parameter supported by the inward and outward support wheels of the support wheel assembly 410*a*.

Referring to FIG. 19, another monitoring sensor 1100 is composed of an array of sensors 1104 (also schematically represented as solid rectangles in the accompanying Figures) located proximate to an aperture 234 defined in the leading wheel-bearing frame member 230*l* for receiving the axle assembly pivotably connecting the wheel linkage 428 (FIG. 10B) to the leading wheel-bearing frame member 230*l*. The sensors 1104 are also strain gauges configured and positioned such that the strain response they record is indicative of the load parameter supported by the leading idler wheel assembly 400*l*. The array of sensors 1104 functions in a manner similar to the array of sensors 1102, and so it will not be described again.

In response to the signals indicative of the strain response of each of the strain gauges 1102, 1104, the track system controller 1000, the master control unit 1010 and/or the remote master control unit 1050 operate each one of the actuator assemblies 140, 150*l*, 150*t*, 310*l*, 310*l*, 420, alone or in combination, so as to adjust the positioning of the frame assembly 200 and the idler and support wheel assemblies 400*l*, 400*t*, 410*a*, 410*b*, 410*c* relative to the chassis 62 and/or the ground surface in accordance with a predetermined objective, which can be in certain conditions to more evenly distribute the load across the ground engaging segment 622 of the endless track 600.

For example, in an illustrative scenario, one of the track system controller 1000, the master control unit 1010 and the remote master control unit 1050 receives and processes signals from the strain gauges 1102, 1104 indicative that the load parameter supported by the inward wheels is greater than the load parameter supported by the outward wheels and that the difference between the load parameters is above a predetermined threshold. The one of the track system controller 1000, the master control unit 1010 and the remote master control unit 1050 operates the actuator assembly 140 so as to change the camber angle θ in accordance with the predetermined objective of, for example, more evenly distributing the load across the ground engaging segment 622 of the endless track 600. The one of the track system controller 1000, the master control unit 1010 and the remote master control unit 1050 continues receiving and processing the signals from the strain gauges 1102, 1104 indicative of the load parameter supported by the wheels until the difference between the load parameters supported by the inward and outward wheels is below the predetermined threshold.

In another illustrative scenario, one of the track system controller 1000, the master control unit 1010 and the remote master control unit 1050 receives and processes the signals from the strain gauges 1102, 1104 indicative that the load parameter supported by the leading idler wheel assembly 400*l* is smaller than the load parameter supported by the support wheel assembly 410*a* and that the difference between the load parameters is above a predetermined threshold. The one of the track system controller 1000, the master control unit 1010 and the remote master control unit 1050 operates the leading actuator assembly 310*l* so as to lower the leading idler wheel assembly 400*l* in accordance with the predetermined objective of, for example, more evenly distributing the load across the ground engaging segment 622 of the endless track 600. The one of the track system controller 1000, the master control unit 1010 and the remote master control unit 1050 continues receiving and processing signals from the strain gauges 1102, 1104 indicative of the load parameters supported by each of the wheel assemblies 400*l*, 410*a* until the difference between the load parameters supported by the leading idler wheel assembly 400*l* and the support wheel assembly 410*a* is below the predetermined threshold.

It is contemplated that additional strain gauges could be operatively connected to the other structural components of the track system 40, such as the components of the attachment assembly (i.e. yoke 120, plate 130, pivot 116, etc.) and the components of the frame assembly 200 (i.e. the leading and trailing frame members 210*l*, 210*t*, the trailing wheel-bearing frame member 230*t*, and the trailing support wheel assembly 250) so as to estimate different load parameters applied to the other components of the track system 40. The additional strain gauges could also be connected to any suitable face or portion of the structural components of the track system 40 that would provide relevant strain responses to estimate the load parameter applied. As described above, the signals provided by the additional strain gauges to the track system controller 1000, the master control unit 1010 and/or the remote master control unit 1050 trigger operation of the actuator assemblies 140, 150*l*, 150*t*, 310*l*, 310*l*, 420, alone or in combination, to adjust the positioning of the frame assembly 200 and the idler and support wheel assemblies 400*l*, 400*t*, 410*a*, 410*b*, 410*c* relative to the chassis 62 and/or the ground surface in accordance with a predetermined objective.

Still referring to FIGS. 19 to 22, the leading wheel-bearing frame member 230*l* has additional monitoring sensors 1100 connected thereto, and the additional monitoring sensors 1100 are accelerometers 1110 (schematically represented by solid squares in the accompanying Figures). The accelerometers 1110 are affixed to the leading wheel-bearing frame member 230*l* proximate the apertures 232, 234. The accelerometers 1110 are configured to send signals to the track system controller 1000, the master control unit 1010 and/or the remote master control unit 1050. The signals are indicative of a vibration parameter undergone by the axle assemblies connecting the wheel assemblies 400*l*, 410*a* to the leading wheel-bearing frame member 230*l*. The vibration parameter may be representative of an instantaneous frequency and amplitude of vibration, an average frequency and amplitude of vibration over a certain period of time, a peak acceleration undergone by the leading wheel-bearing frame member 230*l*, or any other suitable vibration-related data.

As described above, the signals generated by the accelerometers 1110 are sent to the track system controller 1000, the master control unit 1010 and/or the remote master control unit 1050. The signals indicative of the vibration parameter are processed and analyzed to assist in determining the usage and wear of the components of the track system 40. As such, the vibration parameters obtained from the accelerometers 1110 may be useful to obtain general information related to the condition of various components of the track system 40, perform an analysis of the frequencies of the vibration data and/or perform at a more appropriate time predictive maintenance operations to reduce downtime and risks of component failures. For example, the acceleration and vibration data related to the bearings of the axle assemblies connecting the wheel assemblies 400*l*, 410*a* to the leading wheel-bearing frame member 230*l* could populate a database that could be analyzed to determine early signs of excessive wear or failure of components of the track system 40.

Still referring to FIGS. 19 to 22, the leading wheel-bearing frame member 230*l* has additional monitoring sensors 1100 connected thereto, and the additional monitoring sensors 1100 are inclinometers 1112 (schematically represented as solid triangles in the accompanying Figures). The inclinometers 1112 are affixed to the leading wheel-bearing frame member 230*l* proximate to the apertures 232, 234. The inclinometers 1112 are configured to send signals to the track system controller 1000, the master control unit 1010 and/or the remote master control unit 1050 that are indicative of the camber angle θ of the axle assemblies connecting the wheel assemblies 400*l*, 410*a* to the leading wheel-bearing frame member 230*l* relative to the plane 190 (FIGS. 5 and 6). Similar to what has been described above, the signals generated by the inclinometers 1112 are provided to the track system controller 1000, the master control unit 1010 and/or the remote master control unit 1050 which operate the actuator assembly 140 to adjust the positioning of the frame assembly 200 and the idler and support wheel assemblies 400*l*, 400*t*, 410*a*, 410*b*, 410*c* relative to the chassis 62 and/or the ground surface in accordance with a predetermined objective. In some embodiments, the signals provided by the inclinometers 1112 could be used by the track system controller 1000, the master control unit 1010 and/or the remote master control unit 1050 to assess and calibrate the operation of the actuator assembly 140 and/or to assess the wear of the tread 606 of the endless track 600. In some embodiments, additional inclinometers 1112 are affixed to one or more of the actuator assemblies 140, 150*l*, 150*t*, 310*l*, 310*l*, 420, and the signals provided by the inclinometers 1112 could be used by the track system controller 1000, the master control unit 1010 and/or the remote master control unit 1050 to assess and calibrate the operation of the actuator assemblies 140, 150*l*, 150*t*, 310*l*, 310*t*, 420.

Referring now to FIGS. 19 to 23, the track system 40 further includes additional monitoring sensors 1100 that are temperatures sensors 1120 (schematically represented as solid circles in the accompanying Figures). In the present embodiment, the temperature sensors 1120 are thermal radiation thermometers affixed to the inward, outward and downward faces of the leading wheel-bearing frame member 230*l*, the trailing wheel-bearing frame member 230*t* and the trailing support wheel assembly 250. Other types of temperature sensors, such as the ones described above, could be used and affixed to other regions of the components of the track system 40. The temperature sensors 1120 are configured to send signals to the track system controller 1000, the master control unit 1010 and/or the remote master control unit 1050 that are indicative of a temperature parameter of a surface of each wheel of the wheel assemblies 400*l*, 400*t*, 410*a*, 410*b*, 410*c* and the inner surface 602 of the endless track 600. The temperature parameter may be representative of an instantaneous temperature, an average temperature over a certain period of time, a peak temperature or any other suitable temperature-related data.

In the present embodiment, the temperature sensors 1120 have the capability of measuring with sufficient accuracy the temperature of a component from a distance. In order to obtain sufficiently accurate temperature readings, the temperature sensors 1120 are located in regions of the inward, outward and downward faces of the leading wheel-bearing frame member 230*l*, the trailing wheel-bearing frame member 230*t* and the trailing support wheel assembly 250 that are proximate and in line of sight with their respective target area (i.e. the surfaces of the track system 40 from which temperature readings as desired). In other embodiments, temperature sensors 1120 are located in at least one of the inward, outward and downward faces of the leading wheel-bearing frame member 230*l*, the trailing wheel-bearing frame member 230*t* and the trailing support wheel assembly 250.

In response to the signals indicative of the temperature parameter of each of the temperature sensors 1120, the track system controller 1000, the master control unit 1010 and/or the remote master control unit 1050 operate each one of the actuator assemblies 140, 150*l*, 150*t*, 310*l*, 310*t*, 420, alone or in combination, so as to adjust the positioning of the frame assembly 200 and the idler and support wheel assemblies 400*l*, 400*t*, 410*a*, 410*b*, 410*c* relative to the chassis 62 and/or the ground surface in accordance with a predetermined objective, which can be in certain conditions to more evenly distribute the load across the ground engaging segment 622 of the endless track 600.

For example, in an illustrative scenario, the track system controller 1000, the master control unit 1010 and/or the remote master control unit 1050 receives and processes signals from the temperature sensors 1120 indicative that the temperature parameter of the inward wheels is greater than the temperature parameter of the outward wheels, and that the difference between the temperature parameters is above a predetermined threshold. The track system controller 1000, the master control unit 1010 and/or the remote master control unit 1050 operate the actuator assembly 140 so as to change the camber angle θ in accordance with the predetermined objective of, for example, more evenly distributing the load across the ground engaging segment 622 of the endless track 600. The track system controller 1000, the master control unit 1010 and/or the remote master control unit 1050 continues receiving and processing the signals from the temperature sensors 1120 indicative of the temperature parameter of the wheels until the difference between the temperature parameters of the inward and outward wheels is below the predetermined threshold.

In another illustrative scenario, the temperature parameters of different portions of the inner surface 602 of the endless track 600 (i.e. the inward portion, the drive lugs 604, the outward portion, the portion of the inner surface 602 extending below the leading wheel-bearing frame member 230*l*, the portion of the inner surface 602 extending below the trailing wheel-bearing frame member 230*t*, etc.) can be used by the track system controller 1000, the master control unit 1010 and/or the remote master control unit 1050 in conjunction with other temperature parameters to adjust the positioning of the frame assembly 200 and the idler and support wheel assemblies 400*l*, 400*t*, 410*a*, 410*b*, 410*c* relative to the chassis 62 and/or the ground surface. Thus, using the signals indicative of the temperature parameter of different portions of the inner surface 602 of the endless track 600, the camber angle θ and/or the toe-in/toe-out angle γ could be adjusted synergistically in accordance with a predetermined objective.

Still referring to FIGS. 19 to 23, the track system 40 further includes additional temperatures sensors 1122 (also schematically represented as solid circles in the accompanying Figures). In the present embodiment, the temperature sensors 1122 are thermocouples affixed to the leading and trailing frame members 210*l*, 210*t*, the trailing support wheel assembly 250, and the outward cap of each axle assemblies connecting the idler and support wheel assemblies 400*l*, 400*t*, 410*a*, 410*b*, 410*c*. Other types of temperature sensors, such as the ones described above, could be used and affixed to other regions of the components of the track system 40. The temperature sensors 1122 are configured to send signals to the track system controller 1000, the master control unit 1010 and/or the remote master control unit 1050 that are indicative of a temperature parameter of a region of the component to which they are operatively connected. Thus, in a situation where the temperature parameter in a region of the leading frame member 210*l* proximate the axis 224*l* is above a predetermined threshold, the signals sent by the corresponding temperature sensor 1122 could be analyzed to assist in determining the usage and wear of the pivot joint pivotably connecting the leading wheel-bearing frame member 230*l* to the leading frame member 210*t*. Similarly, in a situation where the temperature parameter of the cap of the leading axle assembly 404*l* (FIG. 22) is above a predetermined threshold, the signals sent by the corresponding temperature sensor 1122 could be analyzed to assist in determining the usage and wear of the leading axle assembly 404*l*.

Figure 22:
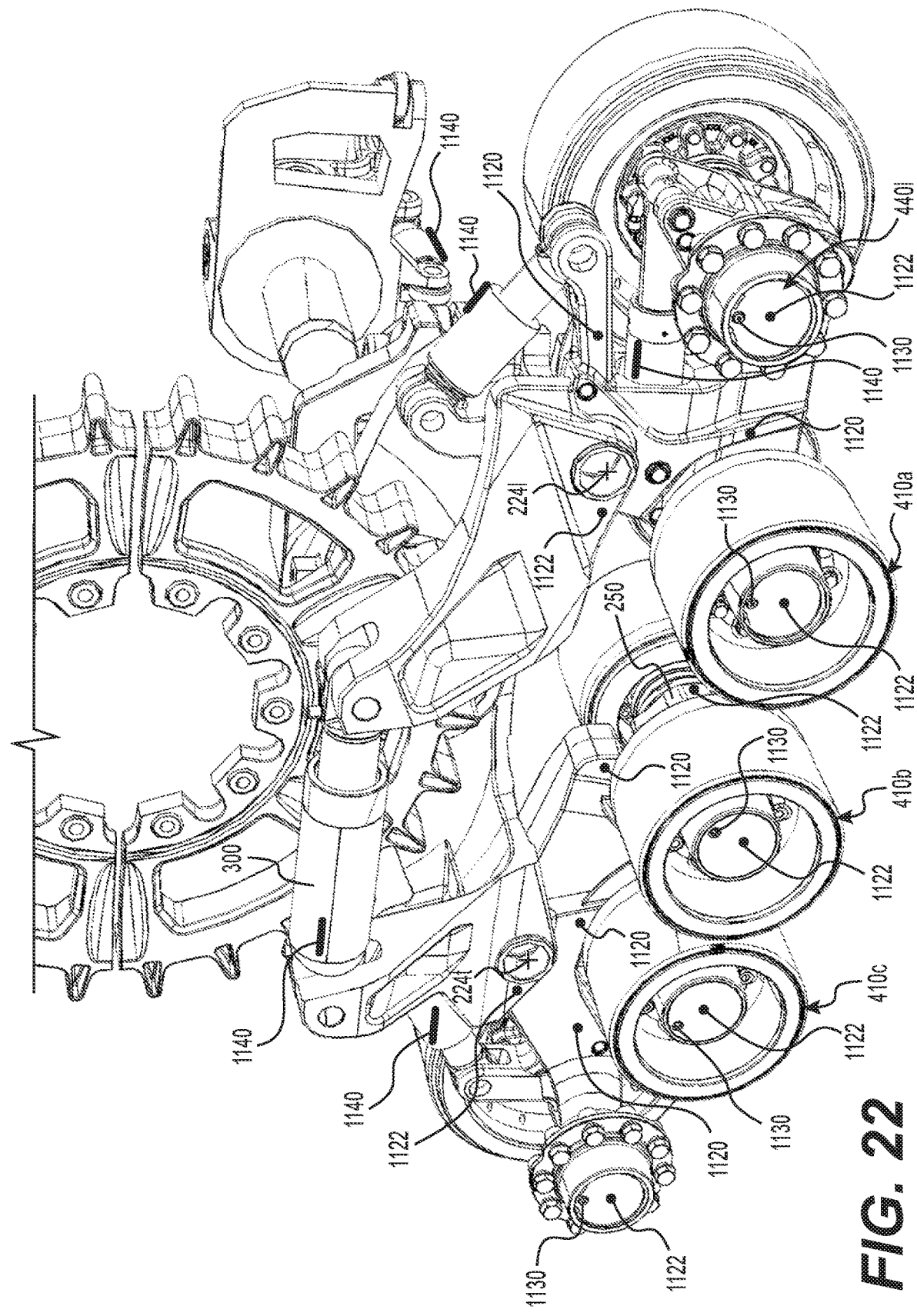
FIG. 22 is a perspective view taken from a front, top right side of the track system of FIG. 1, with the endless track and one idler wheel of the leading and trailing idler wheel assemblies removed, an further including a plurality of monitoring sensors.
Figure 23:
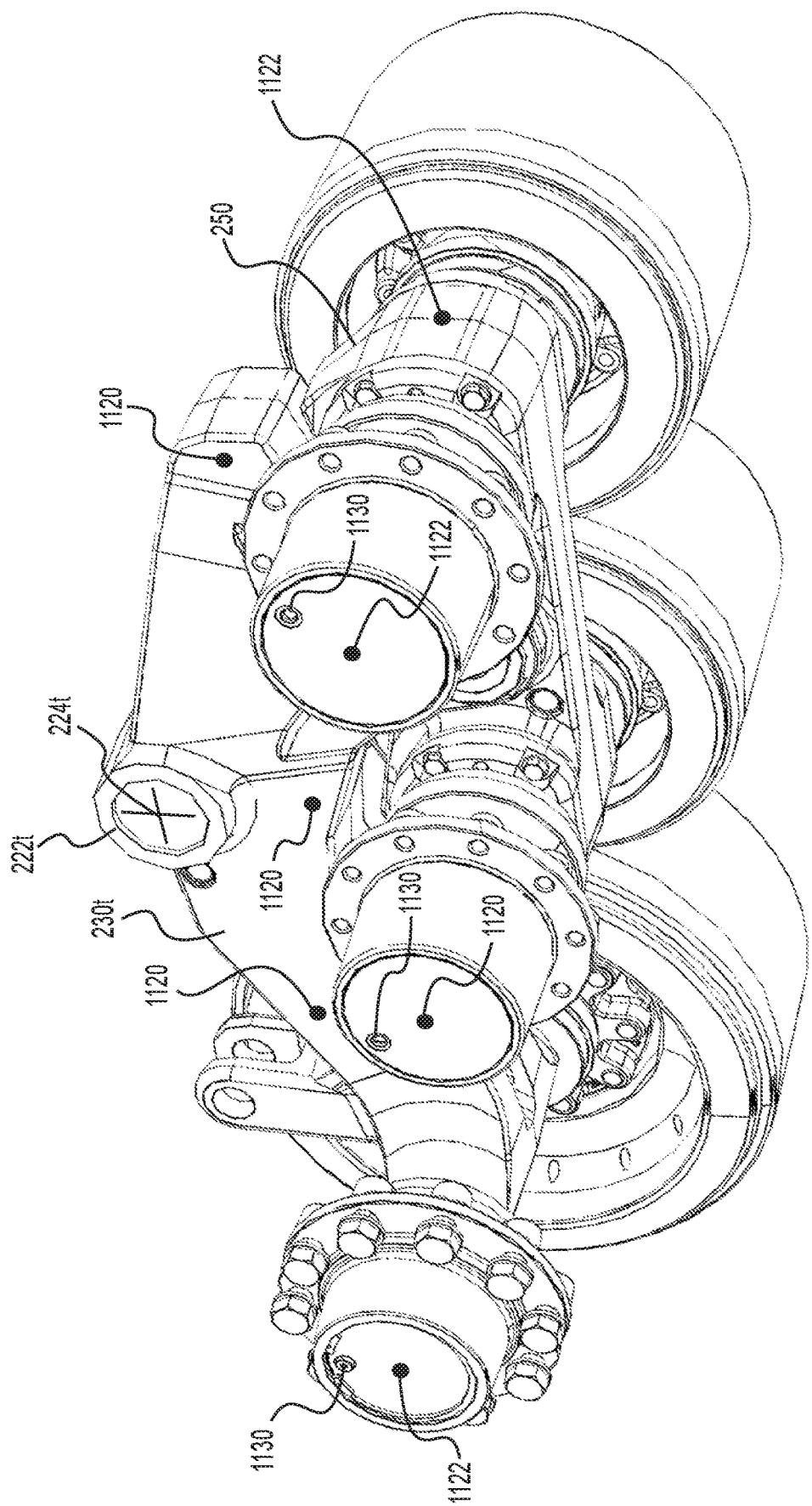
FIG. 23 is a perspective view taken from a front, bottom, right side of the trailing wheel assembly of the track system of FIG. 1, with one idler wheel of trailing idler wheel assemblies removed and two support wheels removed.

Referring to FIG. 22, the track system 40 further includes additional monitoring sensors 1100 that are fluid property sensors 1130. In the present embodiment, the fluid property sensors 1130 are affixed to the outward cap of each axle assemblies connecting the idler and support wheel assemblies 400*l*, 400*t*, 410*a*, 410*b*, 410*c*. The fluid property sensors 1130 are configured to send signals to the track system controller 1000, the master control unit 1010 and/or the remote master control unit 1050 that are indicative of different fluid properties of the fluid, for instance oil, contained in the axle assemblies, such as viscosity, density, dielectric constant, temperature, presence of water, presence of suspended contaminants and wear debris. The data collected from the fluid property sensors 1130 could assist the track system controller 1000, the master control unit 1010 and/or the remote master control unit 1050 to determine the condition and wear of the axle assemblies of the track system 40. In other embodiments, fluid property sensors 1130 are operatively connected to one or more of the actuator assemblies 140, 150*l*, 150*t*, 310*l*, 310*t*, 420 and the damper 300 so as to assess different fluid properties of the fluid contained therein.

Still referring to FIG. 22, the track system 40 further includes additional monitoring sensors 1100 that are actuator assembly position sensors 1140. The actuator assembly position sensors 1140 are linear displacement transducers connected to each of the actuator assemblies 140, 150*l*, 150*t*, 310*l*, 310*t*, 420 and to the damper 300. The actuator assembly position sensors 1140 send signals to the track system controller 1000, the master control unit 1010 and/or the remote master control unit 1050 indicative of the position and/or length of the corresponding actuator assembly 140, 150*l*, 150*t*, 310*l*, 310*t*, 420 or the damper 300. Using the signals provided by the linear displacement transducers, the track system controller 1000, the master control unit 1010 and/or the remote master control unit 1050 assess the status of extension/retraction of the actuator assemblies 140, 150*l*, 150*t*, 310*l*, 310*t*, 420 and the damper 300 and assist in determining how to operate them in accordance with a predetermined objective.

Track System Controller and Monitoring Sensors in the Wheels

Figure 24:
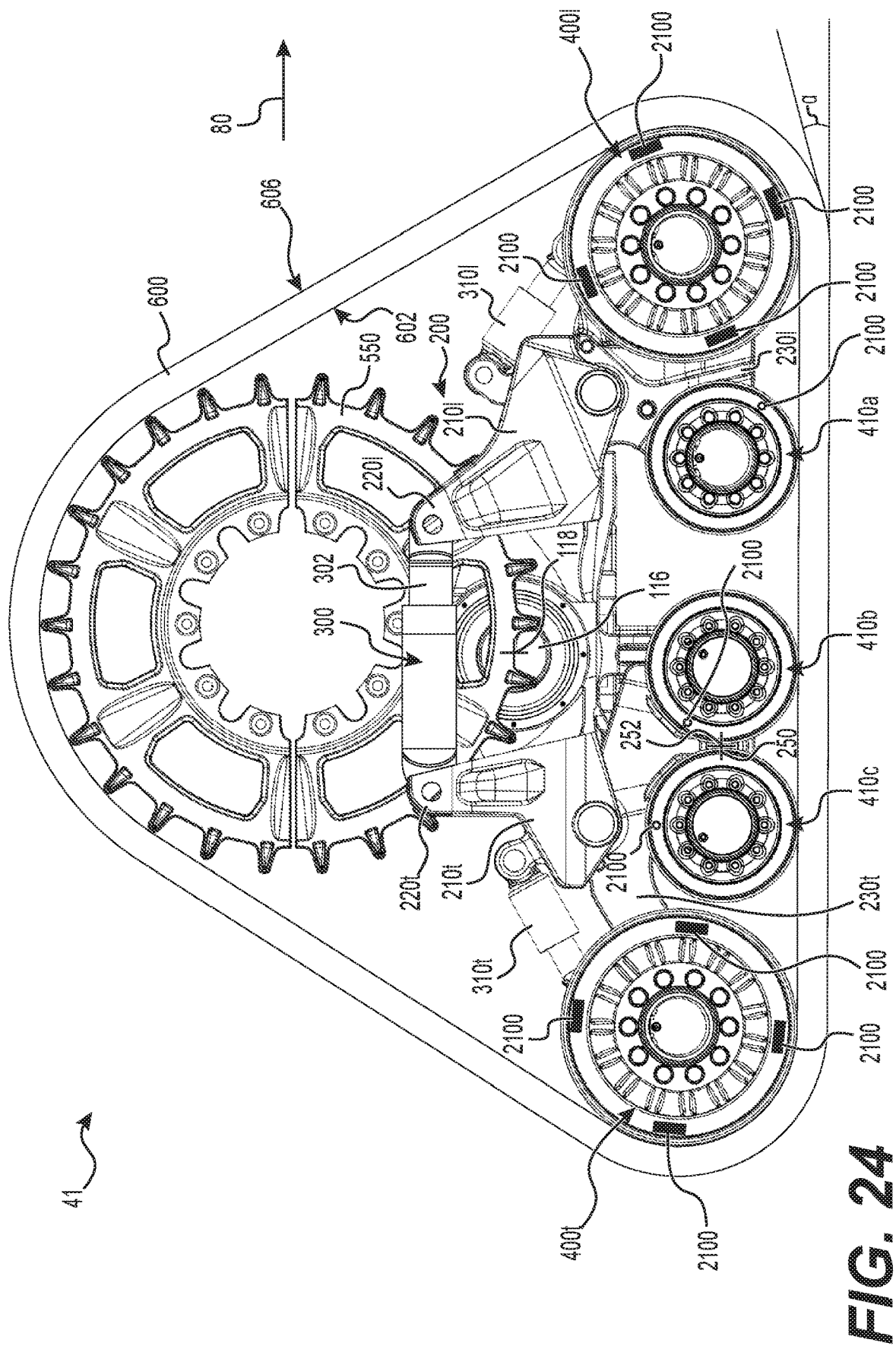
FIG. 24 is a right side elevation view of the track system of FIG. 1, with a plurality of monitoring sensors connected to some of the wheels of the wheel assemblies of the track system.
Figure 25A:
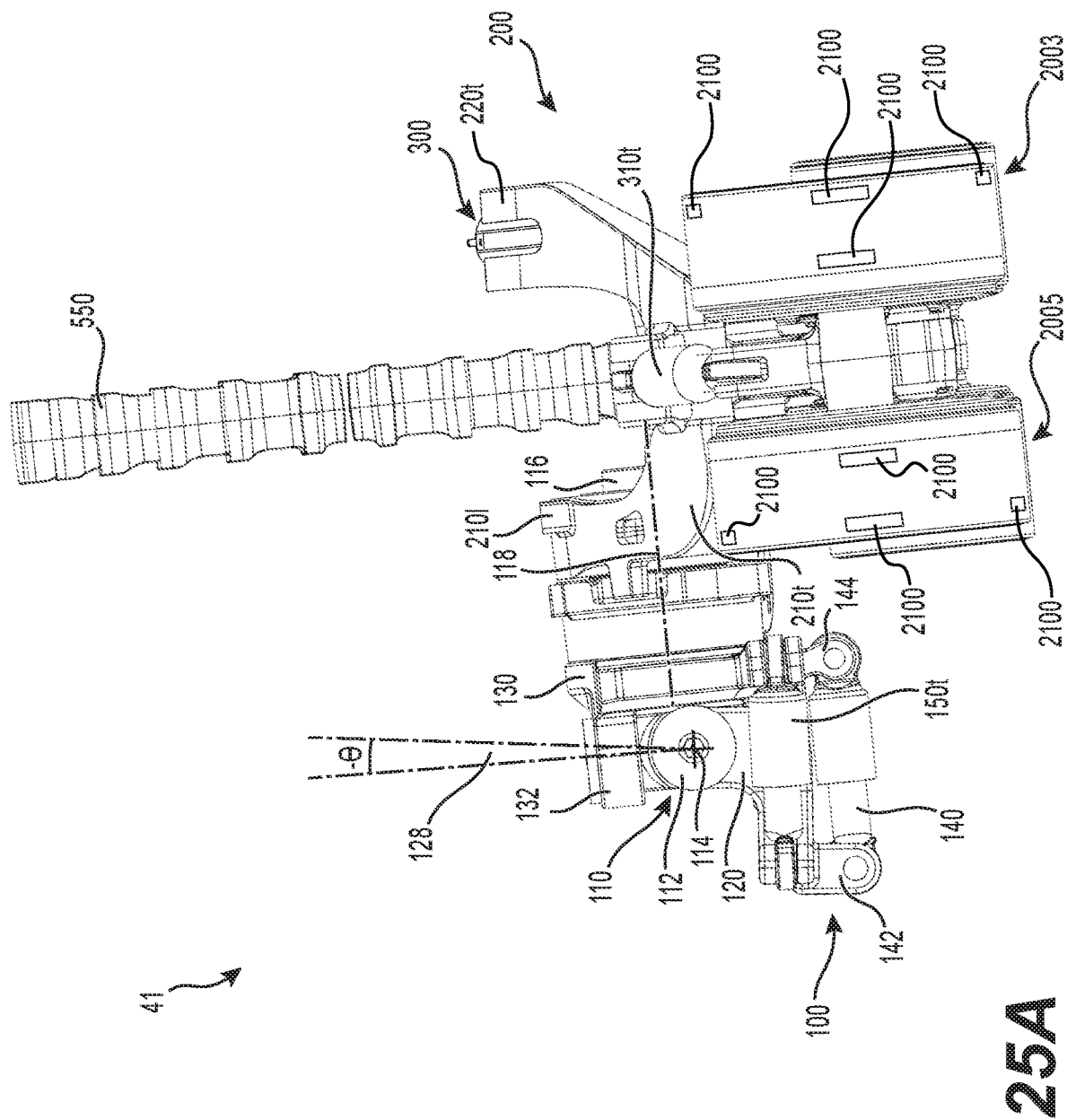
FIG. 25A is a rear elevation view of the track system of FIG. 24, with the endless track removed, and the frame assembly and wheel assemblies pivoted at a negative camber angle.
Figure 25B:
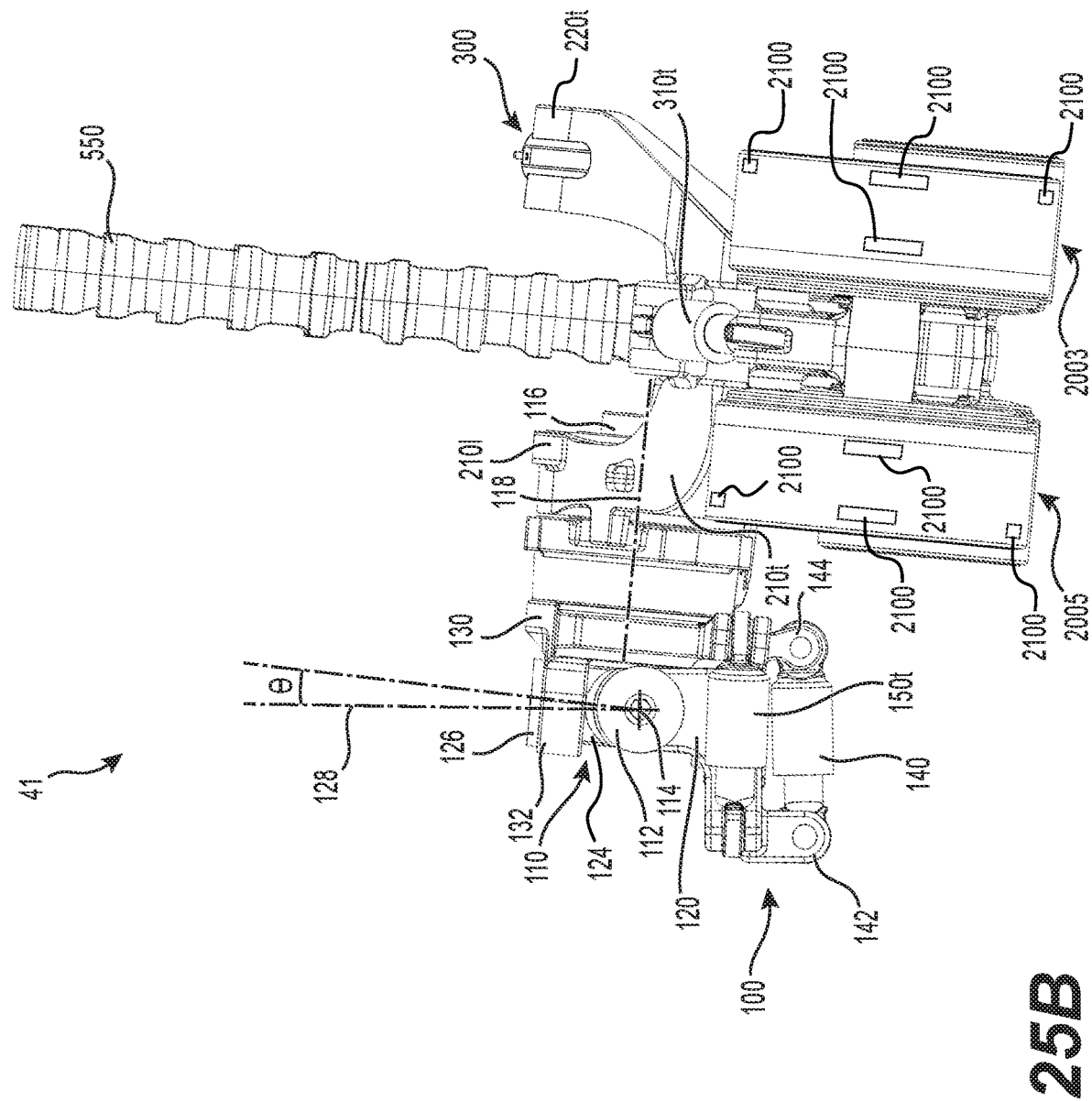
FIG. 25B is a rear elevation view of the track system of FIG. 24, with the endless track removed, and the frame assembly and wheel assemblies pivoted at a negative camber angle.
Figure 26:
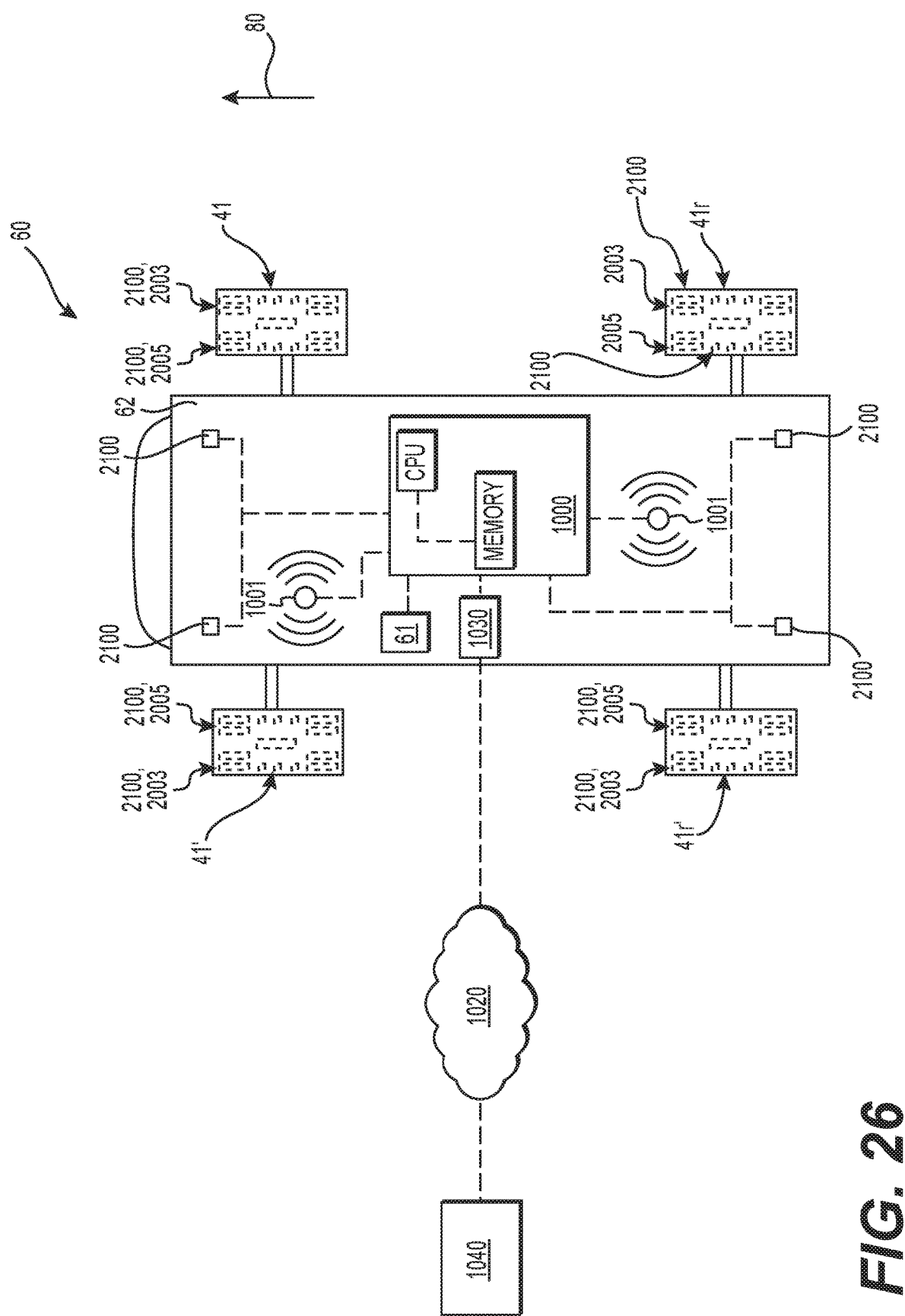
FIG. 26 is a top plan, schematic view of the vehicle of FIG. 2 with track systems according to FIG. 24 operatively connected thereto at each of the four corners and with monitoring sensors in the support wheels of the track systems being shown in dashed lines.

Referring now to FIGS. 24 to 26, another embodiment of the track system 41 will be described. The track system 41 has same or similar components as the track system 40, and therefore the components of the track system 41 that have the same reference numerals and names as the ones described above with respect to the track system 40 will not be described again in detail.

In this embodiment, the track system 41 and the vehicle 60 have monitoring sensors 2100 being the same or equivalent to the monitoring sensors 1100 described above. Those of the monitoring sensors 2100 mounted on the vehicle 60 are operatively connected to the track system controller 1000 via wire as shown. It is contemplated that the wired connections could be wireless connections. In this embodiment, those of the monitoring sensors 2100 that are part of the track systems 41, 41', 41*r*, 41*r*' are operatively connected to the track system controller 1000 via respective wireless connections. In this embodiment, the wireless connections are provided via two wireless transceivers 1001 mounted on the vehicle 60 and corresponding wireless transceivers 1001 mounted on the track systems 41, 41', 41*r*, 41*r*' (not shown). It is contemplated that the wireless connections could be provided via a different suitable known wireless and/or wired system.

The track system 41 has monitoring sensors 2100 that are mounted to wheels of the leading idler wheel assembly 400*l*, the trailing idler wheel assembly 400*t* and the support wheel assemblies 410*a*, 410*b*, 410*c*. In one embodiment, the monitoring sensors 2100 are temperature sensors 2100 and each wheel (inward and outward) of the trailing idler wheel assemblies 400*t* of the track systems 41, 41', 41*r*, 41*r* includes four temperature sensors 2100. In some embodiments, each wheel of the support wheel assemblies 410*b* contains one sensor. Other amounts of sensors in the wheels are contemplated. Data from the sensors 2100 is sent to the track system controller 1000. After processing the temperature data, the track system controller 1000 determines a corresponding output signal related to the actuation of one or more of the actuator assemblies 140, 150*l*, 150*t*, 310*l*, 310*t*, 420 based on the signals received from the temperature sensors 2100. In addition, the track system controller 1000 is operable to identify which temperature sensor 2100 sends a given signal based on a unique identifier associated with each temperature sensor 2100. It is contemplated that, in other embodiments, the track system controller 1000 could be supplemented or replaced by a master control unit 1010 and/or a remote master control unit 1050 as described above.

The temperature sensors 2100 could be thermocouples, thermistors, or any other suitable type of sensing device capable of sensing temperature. The temperature sensors 2100 in outer wheels 2003 of the idler and support wheel assemblies 400*l*, 400*t*, 410*a*, 410*b*, 410*c* of the track systems 41, 41', 41*r*, 41*r*' could be thermocouples, thermistors, or any other suitable type of sensing device capable of sensing temperature. The sensors 2100 in inner wheels 2005 of the idler and support wheel assemblies 400*l*, 400*l*, 410*a*, 410*b*, 410*c* of the track systems 41, 41', 41*r*, 41*r*' could also be thermocouples, thermistors, or any other suitable type of sensing device capable of sensing temperature. In other embodiments, the sensors 2100 are, in replacement of being a temperature sensor, one or a combination of accelerometers, inclinometer, load sensors, GPS sensors, and other sensors measuring one or more, respectively, of acceleration, inclination, load, location, and other metrics associated with each of the respective wheels of the idler and support wheel assemblies 400*l*, 400*t*, 410*a*, 410*b*, 410*c*.

For example, in order to reduce risks of damaging the endless tracks 600 due to excessive heat generation as the endless tracks 600 are driven, the track system controller 1000 operates the actuator assemblies 140, 150*l*, 150*t*, 310*l*, 310*t*, 420, alone or in combination, to correct the positioning of the frame assembly 200 and the idler and support wheel assemblies 400*l*, 400*t*, 410*a*, 410*b*, 410*c* relative to the chassis 62 and/or the ground surface.

In some embodiments, using the sensors 2100, the track system controller 1000 monitors the temperature of the outer wheels 2003 of the idler and support wheel assemblies 400*l*, 400*t*, 410*a*, 410*b*, 410*c* of the track systems 41, 41', 41*r*, 41*r'*. In some embodiments, in response to detecting that one or more of the wheels of the track systems 41, 41', 41*r*, 41*r'* experiences a temperature exceeding a pre-determined threshold, the track system controller 1000 operates one or more of the actuator assemblies 140, 150*l*, 150*t*, 310*l*, 310*t*, 420 of the respective one or more of the track systems 41, 41', 41*r*, 41*r'* to reduce load and/or friction experienced by the one or more of the wheels. As a result, in some cases the one or more of the wheels of the track systems 41, 41', 41*r*, 41*r'* may experience a stabilization and/or a reduction in temperature.

In some embodiments, the sensors 2100 are load cells, and the track system controller 1000 monitors lateral loads applied by the endless tracks 600 to the wheels of the track systems 41, 41', 41*r*, 41*r'*. The load cells are placed in outer wheels 2003 and the inner wheels 2005 of the idler and support wheel assemblies 400*l*, 400*t*, 410*a*, 410*b*, 410*c* of the track systems 41, 41', 41*r*, 41*r'*. In some embodiments, the track system controller 1000 determines the differences between the lateral loads applied to inner ones of the wheels of the track systems 41, 41', 41*r*, 41*r'* and the outer ones of the wheels of the track systems 41, 41', 41*r*, 41*r'*. In some embodiments, when the differences exceed pre-determined thresholds, the track system controller 1000 operates the actuator assemblies 140, 150*l*, 150*t*, 310*l*, 310*t*, 420 of the respective one or more track system 41, 41', 41*r*, 41*r'* to correct alignment of the endless track 600 relative to the wheels of the track systems 41, 41', 41*r*, 41*r'* and/or camber of the track systems 41, 41', 41*r*, 41*r'* until the lateral load differences are below the predetermined thresholds.

In an illustrative scenario, the track system controller 1000 may determine through one of the sensors 2100 that the laterally inward portion of the endless track 600 of a given one of the track systems 41, 41', 41*r*, 41*r'* is subject to a higher lateral load than the outward portion of the endless track 600 of the given track system 41, 41', 41*r*, 41*r'*, and that the difference in lateral load is above a predetermined threshold. Based on the signals received from the load sensors 2100, the system controller 1000 sends a signal to extend or retract the actuator 140 so as to adjust the camber angle θ of the track system 40 in order to more evenly distribute the load across the ground engaging segment 620 of the endless track 600. In other embodiments, the load sensors 2100 may be replaced by temperature sensors to send signals to the system controller 1000. A more even load distribution across the ground engaging segment 620 may not only assist in reducing undesirable heat generation in certain portions of the endless tracks 600, but may also reduce soil compaction when driving on soft ground surface. As such, each of the track systems 41, 41', 41*r*, 41*r'* is capable of dynamically adjusting its camber angle θ based on data collected by the monitoring sensors 2100 and processed by the track system controller 1000.

In another illustrative scenario, the inward portions of the endless track 600 of the track system 40 have load readings that are higher than the load readings of the outward portions of the endless track 600, and that the difference in load readings is above a predetermined threshold. Based on the signals received from the load sensors, the system controller 1000 of one of the track systems 41, 41', 41*r*, 41*r'* sends a signal to extend or retract the actuators 150*l*, 150*t* so as to adjust the toe-in/toe-out angle γ of the corresponding track system 41, 41', 41*r*, 41*r'*. Proper alignment of the endless track 600 relative to the chassis 62 of the vehicle 60 may also assist in reducing undesirable heat generation and premature wear in certain portions of the endless track 600. As such, the track systems 41, 41', 41*r*, 41*r'* are also capable of dynamically adjusting the toe-in/toe-out angle γ based on data collected by the monitoring sensors 2100 and processed by the track system controller 1000.

In some embodiments, the monitoring sensors 2100 include accelerometers. The accelerometers are capable of detecting vibrations in the proximity of each wheel of each of the track systems 41, 41', 41*r*, 41*r'*. Signals generated by the accelerometers are sent to the track system controller 1000 which logs the vibration profiles of each of the wheels over time. In some embodiments, the track system controller 1000 logs geographic location and the speed of the vehicle over the same time periods as the track system controller 1000 logs the signals generated by the accelerometers of the monitored wheels of the track systems 41, 41', 41*r*, 41*r'*. In some embodiments, this data is collected while the track systems 41, 41', 41*r*, 41*r'* are known to be new and in a "to-spec" working condition. In some embodiments, this data is collected for a sufficiently long period of time and for a sufficiently wide range of different driving locations in a given geographic area in order for the data to become statistically relevant and/or statistically reliable to a given desired degree of confidence. In some embodiments, this collected data is used to generate vibration profile maps for each monitored wheel. The vibration profile maps indicate for each given monitored wheel, the geographic location of the vehicle and speed of the vehicle, what that wheel's vibration profile should be when the track systems 41, 41', 41*r*, 41*r'* are in "to-spec" working order. In some embodiments, known interpolation and/or extrapolation techniques are used to enrich and/or expand the generated vibration profile maps for each given geographic region. In some embodiments, known interpolation and/or extrapolation techniques are used to extrapolate from the generated vibration profile maps to generate additional vibration profile maps for additional geographic regions.

In some embodiments, the vibration profile maps are stored in the non-transient memory of the track system controller 1000. In some embodiments, the vibration profile maps are stored as data structures. In use then, the track system controller 1000 monitors signals generated by the accelerometers of the monitored wheels of the track systems 41, 41', 41*r*, 41*r'* and for each monitored wheel, the track system controller 1000 determines and optionally logs in the non-transient memory an in-use vibration profile in real time. In some embodiments, the track system controller 1000 also monitors the vehicle's geographic location and stores the vehicle's geographic locations in the non-transient memory. For each monitored wheel, the track system controller 1000 inputs the geographic location of the vehicle, in real time, into the vibration profile map corresponding to the monitored wheel and to the given real-time geographic location and speed of the vehicle, and thereby determines a "to-spec" vibration profile that the given wheel should be experiencing. The track system controller 1000 compares the real-time "to-spec" vibration profile of each monitored wheel to the actual vibration experienced by that wheel, as determined via the accelerometer(s) of that wheel.

In some embodiments, the track system controller 1000 is configured to output a warning signal and/or message in response to a detected mismatch in a given wheel's real-time "to-spec" and real-time actual vibration profiles. In some cases, the warning signal and/or message is configured to contain an indication of which particular wheel it relates to. In some cases, the warning signal and/or message is outputted to an operator of the vehicle 60 via suitable means to indicate that a potential problem exists with respect to the given wheel and/or related sub-systems of the corresponding one of the track systems 41, 41', 41r, 41r'. In some embodiments, the track system controller 1000 is configured to adjust one or more of the corresponding one of the track systems' 41, 41', 41r, 41r' actuator assemblies 140, 150l, 150t, 310l, 310t, 420 while continuing to monitor the vibration being experienced by the given wheel. In some cases, the track system controller 1000 is thereby able to alter the vibration experienced by the given wheel to more closely approximate the "to-spec" vibration profile thereof.

In some cases, the track system controller 1000 may record the resulting data in its non-transient memory, for later use. In some cases, the collected data, including in some cases the warning signal and/or message generated as per above, may allow to identify potential issues with one or more of the track systems 41, 41', 41r, 41r' and/or pinpoint the particular component(s) of the track systems 41, 41', 41r, 41r' associated with the potential issues. In some cases, the data could be analyzed to determine early signs of excessive wear or impending failure of components of the track systems 41, 41', 41r, 41r'.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for use with a vehicle having a chassis, the track system comprising:
   an attachment assembly connectable to the chassis of the vehicle, the attachment assembly including a multi-pivot assembly having at least one of
      a first pivot extending longitudinally and defining a roll pivot axis of the track system,
      a second pivot extending laterally and defining a pitch pivot axis of the track system, and
      a third pivot extending vertically and defining a yaw pivot axis of the track system;
   a frame assembly disposed laterally outwardly from the attachment assembly and connected to the attachment assembly, the frame assembly including at least one wheel-bearing frame member;
   a leading idler wheel assembly at least indirectly connected to the at least one wheel-bearing frame member;
   a trailing idler wheel assembly at least indirectly connected to the at least one wheel-bearing frame member;
   at least one support wheel assembly at least indirectly connected to the at least one wheel-bearing frame member and disposed between the leading idler wheel assembly and the trailing idler wheel assembly;
   an endless track extending around the leading idler wheel assembly, the trailing idler wheel assembly, and the at least one support wheel assembly;
   at least one actuator connected between the attachment assembly and the frame assembly for pivoting the frame assembly about at least one of the roll pivot axis and the yaw pivot axis;
   at least one monitoring sensor for determining, at least indirectly, at least one of a state of the track system and a ground surface condition; and
   a track system controller communicating with the at least one monitoring sensor for receiving a signal indicative of the at least one of the state of the track system and the ground surface condition, the track system controller being configured to connect to and to control the operation of the at least one actuator based on the at least one of the state of the track system and the ground surface condition.

2. The track system of claim 1, wherein:
   the at least one actuator is a first actuator for pivoting the frame assembly about the roll pivot axis, and
   the track system controller is configured to connect to and to control the first actuator so as to adjust a positioning of the leading idler wheel assembly, the trailing idler wheel assembly, and the at least one support wheel assembly relative to the attachment assembly.

3. The track system of claim 1, wherein:
   the at least one actuator is a first, second and third actuators,
   the first actuator is operable for pivoting the frame assembly about the roll pivot axis,
   the second and third actuators are operable for pivoting the frame assembly about the yaw pivot axis, and
   the track system controller is configured to connect to and to control the first, second and third actuators so as to adjust a positioning of the leading idler wheel assembly, the trailing idler wheel assembly, and the at least one support wheel assembly relative to the attachment assembly.

4. The track system of claim 3, wherein the second actuator is a leading tracking actuator located forward of the third pivot, and the third actuator is a trailing tracking actuator located rearward of the third pivot.

5. The track system of claim 1, wherein the at least one monitoring sensor is disposed in at least one wheel of at least one of the leading idler wheel assembly, the trailing idler wheel assembly, and the at least one support wheel assembly.

6. The track system of claim 5, wherein the at least one monitoring sensor is a plurality of monitoring sensors, and at least one monitoring sensor of the plurality of monitoring sensors is disposed in each wheel of the leading idler wheel assembly, the trailing idler wheel assembly, and the at least one support wheel assembly.

7. The track system of claim 5, wherein:
   the at least one monitoring sensor is a first plurality of monitoring sensors and a second plurality of monitoring sensors,
   the first plurality of monitoring sensors is disposed in an inner wheel of the at least one wheel of at least one of the leading idler wheel assembly, the trailing idler wheel assembly, and the at least one support wheel assembly, and
   the second plurality of monitoring sensors is disposed in an outer wheel of the at least one wheel of at least one of the leading idler wheel assembly, the trailing idler wheel assembly, and the at least one support wheel assembly.

8. The track system of claim 7, wherein the track system controller controls the operation of the at least one actuator based on a difference between the at least one of the state of the track system and the ground surface condition determined by the first plurality of monitoring sensors, and the at least one of the state of the track system and the ground surface condition determined by the second plurality of monitoring sensors.

9. A vehicle comprising first and second track systems as claimed in claim 5, wherein the track system controller of the first track system is at least indirectly connected to the track system controller of the second track system for receiving the at least one signal indicative of the at least one of the state of the track system and the ground surface condition determined by the at least one monitoring sensor of the second track system.

10. The track system of claim 1, wherein the at least one monitoring sensor is operatively connected to at least one of the attachment assembly, the frame assembly and the at least one wheel-bearing frame member.

11. The track system of claim 10, wherein:
the at least one monitoring sensor is a first plurality of monitoring sensors and a second plurality of monitoring sensors;
the first plurality of monitoring sensors is operatively connected to an inward face of the at least one of the attachment assembly, the frame assembly and the at least one wheel-bearing frame member; and
the second plurality of monitoring sensors is operatively connected to an outward face of the at least one of the attachment assembly, the frame assembly and the at least one wheel-bearing frame member.

12. The track system of claim 11, wherein:
the at least one monitoring sensor further includes a third plurality of monitoring sensors; and
the third plurality of monitoring sensors is operatively connected to a downward face of the at least one of the attachment assembly, the frame assembly and the at least one wheel-bearing frame member.

13. The track system of claim 1, further comprising at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact, and the track system controller is further configured to connect to and to control the operation of the at least one idler actuator based on the at least one of the state of the track system and the ground surface condition.

14. The track system of claim 1, wherein the at least one monitoring sensor includes at least one of a load sensor, temperature sensor, accelerometer, strain gauge, fluid property sensor, inclinometer, geographical location sensor, hygrometer, penetrometer, sonar device, ultrasonic device, microwave-based device, radar device, and lidar device.

15. The track system of claim 1, wherein the at least one monitoring sensor is configured to further generate a signal indicative of at least one of a load parameter supported by the track system, a strain parameter supported by the track system, a vibration parameter undergone by the track system, and a temperature parameter of the track system.

16. The track system of claim 1, wherein the track system controller controls the operation of the at least one actuator in accordance with a predetermined objective.

17. The track system of claim 16, wherein the predetermined objective is distributing a load supported by the track system across a surface of a ground engaging segment of the endless track for at least one of reducing soil compaction and improving traction of the endless track.

18. A vehicle comprising first and second track systems as claimed in claim 10, wherein the track system controller of the first track system is at least indirectly connected to the track system controller of the second track system, and the track system controller of the first track system controls the operation of the at least one actuator of the first track system based on at least one of the state of the second track system and the ground surface condition determined by the at least one monitoring sensor of the second track system.

* * * * *